United States Patent
Tabata et al.

(10) Patent No.: US 7,101,305 B2
(45) Date of Patent: Sep. 5, 2006

(54) PLANETARY-GEAR-TYPE MULTIPLE-STEP TRANSMISSION FOR VEHICLE

(75) Inventors: Atsushi Tabata, Okazaki (JP); Akira Hoshino, Nishikamo-gun (JP); Terufumi Miyazaki, Toyota (JP); Atsushi Honda, Seto (JP); Akiharu Abe, Toyota (JP); Hirofumi Ota, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 249 days.

(21) Appl. No.: 10/845,151

(22) Filed: May 14, 2004

(65) Prior Publication Data
US 2004/0242368 A1    Dec. 2, 2004

(30) Foreign Application Priority Data
May 27, 2003 (JP) .............................. 2003-149926
Aug. 7, 2003 (JP) .............................. 2003-289464

(51) Int. Cl.
*F16H 3/62*    (2006.01)
*F16H 3/44*    (2006.01)

(52) U.S. Cl. ..................... 475/296; 475/275; 475/330

(58) Field of Classification Search ........ 475/275–296, 475/311, 313, 317, 319, 323, 325, 330
See application file for complete search history.

(56) References Cited

U.S. PATENT DOCUMENTS

| | | | | |
|---|---|---|---|---|
| 4,709,594 A | * | 12/1987 | Maeda .................... | 475/280 |
| 4,754,664 A | * | 7/1988 | Dick ....................... | 475/81 |
| 5,254,053 A | * | 10/1993 | Taniguchi et al. ...... | 475/276 |
| 5,378,208 A | * | 1/1995 | Hall, III ................. | 475/276 |
| 6,634,980 B1 | | 10/2003 | Ziemer | |
| 6,960,149 B1 | * | 11/2005 | Ziemer .................... | 475/276 |

FOREIGN PATENT DOCUMENTS

| | | |
|---|---|---|
| DE | 101 15 983 | 10/2002 |
| JP | 8-105496 | 4/1996 |
| JP | 2956173 | 7/1999 |
| JP | 2000-199549 | 7/2000 |
| JP | 2000-266138 | 9/2000 |
| JP | 2001-82555 | 3/2001 |
| JP | 2001-182785 | 7/2001 |
| JP | 2002-206601 | 7/2002 |

(Continued)

*Primary Examiner*—Tisha Lewis
(74) *Attorney, Agent, or Firm*—Oblon, Spivak, McClelland, Maier & Neustadt, P.C.

(57) ABSTRACT

A planetary-gear-type multiple-step transmission including a stationary member, an input rotary member, an output rotary member, and first and second transmission units. The first transmission unit transmits a rotary motion from an input rotary member to the second transmission unit through first and second intermediate transmitting paths such that a speed of the rotary motion transmitted through the second intermediate transmitting path is lower than that of the rotary motion transmitted through the first intermediate transmitting path. The second transmission unit constitutes first, second, third, fourth and fifth rotary elements, each of which is provided by at least one of sun gears, carriers and ring gears of three planetary gear sets. The first rotary element is selectively connected to the second intermediate transmitting path, while being selectively connected to the stationary member. The second rotary element is selectively connected to the first intermediate transmitting path. The third rotary element is selectively connected to the first intermediate transmitting path, while being selectively connected to the stationary member. The fourth rotary element is connected to the output rotary member. The fifth rotary element is selectively connected to the second intermediate transmitting path.

45 Claims, 41 Drawing Sheets

FOREIGN PATENT DOCUMENTS

| | | |
|---|---|---|
| JP | 2002-227940 | 8/2002 |
| JP | 2002-295609 | 10/2002 |
| JP | 2002-323098 | 11/2002 |

* cited by examiner

|  | C1 | C2 | C3 | C4 | B1 | B2 | RATIOS | RATIO STEPS |
|---|---|---|---|---|---|---|---|---|
| 1st | ○ |  |  |  |  | ○ | 3.550 |  |
| 2nd | ○ |  |  |  | ○ |  | 2.456 | 1.445 |
| 3rd | ○ | ○ |  |  |  |  | 1.818 | 1.351 |
| 4th-1 | ○ |  | ○ |  |  |  | 1.349 | 1.348 |
| 5th |  |  | ○ | ○ |  |  | 1.000 | 1.349 |
| 6th |  | ○ |  | ○ |  |  | 0.792 | 1.263 |
| 7th |  |  | ○ | ○ |  |  | 0.632 | 1.254 |
| 8th |  |  | ○ |  | ○ |  | 0.526 | 1.200 |
| R |  | ○ |  |  |  | ○ | 2.597 | RATIO SPREAD 6.745 |

|   | C1 | C2 | C3 | C4 | B1 | B2 | RATIOS | RATIO STEPS |
|---|---|---|---|---|---|---|---|---|
| 1st | O |  |  |  |  | O | 3.550 |  |
| 2nd | O |  |  |  | O |  | 2.456 | 1.445 |
| 3rd | O | O |  |  |  |  | 1.818 | 1.351 |
| 4th-1 | O |  | O |  |  |  | 1.349 | 1.348 |
| 5th |  |  | O | O |  |  | 1.000 | 1.349 |
| 6th |  | O |  | O |  |  | 0.792 | 1.263 |
| 7th |  |  | O | O |  |  | 0.632 | 1.254 |
| 8th |  |  | O |  | O |  | 0.526 | 1.200 |
| R |  | O |  |  |  | O | 2.597 | RATIO SPREAD 6.745 |

|  | C1 | C2 | C3 | C4 | B1 | B2 | RATIOS | RATIO STEPS |
|---|---|---|---|---|---|---|---|---|
| 1st | O |  |  |  |  | O | 3.550 |  |
| 2nd | O |  |  | O |  |  | 2.456 | 1.445 |
| 3rd | O | O |  |  |  |  | 1.818 | 1.351 |
| 4th-1 | O |  | O |  |  |  | 1.349 | 1.348 |
| 5th |  |  | O | O |  |  | 1.000 | 1.349 |
| 6th |  | O |  | O |  |  | 0.792 | 1.263 |
| 7th |  |  | O | O |  |  | 0.632 | 1.254 |
| 8th |  |  | O |  | O |  | 0.526 | 1.200 |
| R |  | O |  |  |  | O | 2.597 | RATIO SPREAD 6.745 |

|  | C1 | C2 | C3 | C4 | B1 | B2 | RATIOS | RATIO STEPS |
|---|---|---|---|---|---|---|---|---|
| 1st | O |  |  |  |  | O | 3.550 |  |
| 2nd | O |  |  |  | O |  | 2.456 | 1.445 |
| 3rd | O | O |  |  |  |  | 1.818 | 1.351 |
| 4th-1 | O |  |  | O |  |  | 1.349 | 1.348 |
| 5th |  |  | O | O |  |  | 1.000 | 1.349 |
| 6th |  | O |  | O |  |  | 0.792 | 1.263 |
| 7th |  |  |  | O | O |  | 0.632 | 1.254 |
| 8th |  |  | O | O |  |  | 0.526 | 1.200 |
| R |  | O |  |  |  | O | 2.597 | RATIO SPREAD 6.745 |

|  | C1 | C2 | C3 | C4 | B1 | B2 | RATIOS | RATIO STEPS |
|---|---|---|---|---|---|---|---|---|
| 1st | O |  |  |  |  | O | 3.550 | |
| 2nd | O |  |  |  | O |  | 2.456 | 1.445 |
| 3rd | O | O |  |  |  |  | 1.818 | 1.351 |
| 4th-1 | O |  |  | O |  |  | 1.300 | 1.399 |
| 5th |  |  | O | O |  |  | 1.000 | 1.300 |
| 6th |  | O |  | O |  |  | 0.792 | 1.263 |
| 7th |  |  |  | O | O |  | 0.632 | 1.254 |
| 8th |  |  | O |  | O |  | 0.526 | 1.200 |
| R |  | O |  |  |  | O | 2.597 | RATIO SPREAD 6.745 |

|     | C1 | C2 | C3 | C4 | B1 | B2 | RATIOS | RATIO STEPS |
|-----|----|----|----|----|----|----|--------|-------------|
| 1st | O  |    |    |    |    | O  | 3.550  |             |
| 2nd | O  |    |    |    | O  |    | 2.456  | 1.445       |
| 3rd | O  | O  |    |    |    |    | 1.818  | 1.351       |
| 4th-1 | O |   |    | O  |    |    | 1.349  | 1.348       |
| 5th |    |    | O  | O  |    |    | 1.000  | 1.349       |
| 6th |    | O  |    | O  |    |    | 0.792  | 1.263       |
| 7th |    |    |    | O  | O  |    | 0.632  | 1.254       |
| 8th |    |    | O  |    | O  |    | 0.526  | 1.200       |
| R   |    | O  |    |    |    | O  | 2.597  | RATIO SPREAD 6.745 |

|  | C1 | C2 | C3 | C4 | B1 | B2 | RATIOS | RATIO STEPS |
|---|---|---|---|---|---|---|---|---|
| 1st | O |  |  |  |  | O | 3.550 |  |
| 2nd | O |  |  |  | O |  | 2.456 | 1.445 |
| 3rd | O | O |  |  |  |  | 1.818 | 1.351 |
| 4th-1 | O |  |  | O |  |  | 1.300 | 1.399 |
| 5th |  |  | O | O |  |  | 1.000 | 1.300 |
| 6th |  | O |  | O |  |  | 0.792 | 1.263 |
| 7th |  |  |  | O | O |  | 0.632 | 1.254 |
| 8th |  |  | O |  | O |  | 0.526 | 1.200 |
| R |  | O |  |  |  | O | 2.597 | RATIO SPREAD 6.745 |

|  | C1 | C2 | C3 | C4 | B1 | B2 | RATIOS | RATIO STEPS |
|---|---|---|---|---|---|---|---|---|
| 1st | ○ |  |  |  |  | ○ | 3.550 |  |
| 2nd | ○ |  |  |  | ○ |  | 2.456 | 1.445 |
| 3rd | ○ | ○ |  |  |  |  | 1.818 | 1.351 |
| 4th-1 | ○ |  |  | ○ |  |  | 1.300 | 1.399 |
| 5th |  |  | ○ | ○ |  |  | 1.000 | 1.300 |
| 6th |  | ○ |  | ○ |  |  | 0.792 | 1.263 |
| 7th |  |  |  | ○ | ○ |  | 0.632 | 1.254 |
| 8th |  |  | ○ |  | ○ |  | 0.526 | 1.200 |
| R |  | ○ |  |  |  | ○ | 2.597 | RATIO SPREAD 6.745 |

| | C1 | C2 | C3 | C4 | B1 | B2 | RATIOS | RATIO STEPS |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | | ○ | | | 1.349 | 1.348 |
| 5th | | | ○ | ○ | | | 1.000 | 1.349 |
| 6th | | ○ | | ○ | | | 0.792 | 1.263 |
| 7th | | | ○ | | ○ | | 0.632 | 1.254 |
| 8th | | | | ○ | | ○ | 0.526 | 1.200 |
| R | | ○ | | | | ○ | 2.597 | RATIO SPREAD 6.745 |

| | C1 | C2 | C3 | C4 | B1 | B2 | RATIOS | RATIO STEPS |
|---|---|---|---|---|---|---|---|---|
| 1st | O | | | | | O | 3.550 | |
| 2nd | O | | | | O | | 2.456 | 1.445 |
| 3rd | O | O | | | | | 1.818 | 1.351 |
| 4th-1 | O | | | O | | | 1.30 | 1.398 |
| 5th | | | O | O | | | 1.000 | 1.300 |
| 6th | | O | | O | | | 0.792 | 1.263 |
| 7th | | | | O | O | | 0.632 | 1.254 |
| 8th | | | O | | O | | 0.526 | 1.200 |
| R | | O | | | | O | 2.597 | RATIO SPREAD 6.745 |

|      | C1 | C2 | C3 | C4 | B1 | B2 | RATIOS | RATIO STEPS |
|------|----|----|----|----|----|----|--------|-------------|
| 1st  | O  |    |    |    |    | O  | 3.550  | 1.445       |
| 2nd  | O  |    |    |    | O  |    | 2.456  | 1.351       |
| 3rd  | O  | O  |    |    |    |    | 1.818  | 1.348       |
| 4th-1| O  |    |    | O  |    |    | 1.349  | 1.349       |
| 5th  |    |    | O  | O  |    |    | 1.000  | 1.263       |
| 6th  |    | O  |    | O  |    |    | 0.792  | 1.254       |
| 7th  |    |    |    | O  | O  |    | 0.632  | 1.200       |
| 8th  |    |    | O  |    | O  |    | 0.526  |             |
| R    |    | O  |    |    |    | O  | 2.597  | RATIO SPREAD 6.745 |

| | C1 | C2 | C3 | C4 | B1 | B2 | RATIOS | RATIO STEPS |
|---|---|---|---|---|---|---|---|---|
| 1st | O | | | | | O | 3.550 | |
| 2nd | O | | | | O | | 2.456 | 1.445 |
| 3rd | O | O | | | | | 1.818 | 1.351 |
| 4th-1 | O | | | O | | | 1.300 | 1.398 |
| 5th | | | O | O | | | 1.000 | 1.300 |
| 6th | | O | | O | | | 0.792 | 1.263 |
| 7th | | | | O | O | | 0.632 | 1.254 |
| 8th | | | O | | O | | 0.526 | 1.200 |
| R | | O | | | | O | 2.597 | RATIO SPREAD 6.745 |

| | C1 | C2 | C3 | C4 | B1 | B2 | RATIOS | RATIO STEPS |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | ○ | | | | 1.349 | 1.348 |
| 5th | | | ○ | ○ | | | 1.000 | 1.349 |
| 6th | | ○ | | ○ | | | 0.792 | 1.263 |
| 7th | | | | ○ | ○ | | 0.632 | 1.254 |
| 8th | | | ○ | | ○ | | 0.526 | 1.200 |
| R | | ○ | | | | ○ | 2.597 | RATIO SPREAD 6.745 |

| | C1 | C2 | C3 | C4 | B1 | B2 | RATIOS | RATIO STEPS |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | | ○ | | | 1.300 | 1.398 |
| 5th | | | ○ | ○ | | | 1.000 | 1.300 |
| 6th | | ○ | | ○ | | | 0.792 | 1.263 |
| 7th | | | | ○ | ○ | | 0.632 | 1.254 |
| 8th | | | ○ | | ○ | | 0.526 | 1.200 |
| R | | ○ | | | | ○ | 2.597 | RATIO SPREAD 6.745 |

|       | C1 | C2 | C3 | C4 | B1 | B2 | RATIOS | RATIO STEPS |
|-------|----|----|----|----|----|----|--------|-------------|
| 1st   | O  |    |    |    |    | O  | 3.550  |             |
| 2nd   | O  |    |    |    | O  |    | 2.456  | 1.445       |
| 3rd   | O  | O  |    |    |    |    | 1.818  | 1.351       |
| 4th-1 | O  |    |    | O  |    |    | 1.349  | 1.348       |
| 5th   |    |    | O  | O  |    |    | 1.000  | 1.349       |
| 6th   |    | O  |    | O  |    |    | 0.792  | 1.263       |
| 7th   |    |    | O  |    | O  |    | 0.632  | 1.254       |
| 8th   |    |    | O  |    |    | O  | 0.526  | 1.200       |
| R     |    | O  |    |    |    | O  | 2.597  | RATIO SPREAD 6.745 |

|      | C1 | C2 | C3 | C4 | B1 | B2 | RATIOS | RATIO STEPS |
|------|----|----|----|----|----|----|--------|-------------|
| 1st  | O  |    |    |    |    | O  | 3.550  | 1.445 |
| 2nd  | O  |    |    |    | O  |    | 2.456  | 1.351 |
| 3rd  | O  | O  |    |    |    |    | 1.818  | 1.398 |
| 4th-1| O  |    |    | O  |    |    | 1.300  | 1.300 |
| 5th  |    |    | O  | O  |    |    | 1.000  | 1.263 |
| 6th  |    | O  |    | O  |    |    | 0.792  | 1.254 |
| 7th  |    |    |    | O  | O  |    | 0.632  | 1.200 |
| 8th  |    |    | O  |    | O  |    | 0.526  | RATIO SPREAD 6.745 |
| R    |    | O  |    |    |    | O  | 2.597  | |

| | C1 | C2 | C3 | C4 | B1 | B2 | RATIOS | RATIO STEPS |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | | ○ | | | 1.349 | 1.348 |
| 5th | | | ○ | ○ | | | 1.000 | 1.349 |
| 6th | | ○ | | ○ | | | 0.792 | 1.263 |
| 7th | | | ○ | | ○ | | 0.632 | 1.254 |
| 8th | | | ○ | | | ○ | 0.526 | 1.200 |
| R | | ○ | | | | ○ | 2.597 | RATIO SPREAD 6.745 |

| | C1 | C2 | C3 | C4 | B1 | B2 | RATIOS | RATIO STEPS |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | | ○ | ○ | | 1.300 | 1.398 |
| 5th | | | ○ | ○ | | | 1.000 | 1.300 |
| 6th | | ○ | | ○ | | | 0.792 | 1.263 |
| 7th | | | | ○ | ○ | | 0.632 | 1.254 |
| 8th | | | ○ | | ○ | | 0.526 | 1.200 |
| R | | ○ | | | | ○ | 2.597 | RATIO SPREAD 6.745 |

|       | C1 | C2 | C3 | C4 | B1 | B2 | RATIOS | RATIO STEPS |
|-------|----|----|----|----|----|----|--------|-------------|
| 1st   | O  |    |    |    |    | O  | 3.550  |             |
| 2nd   | O  |    |    |    | O  |    | 2.456  | 1.445       |
| 3rd   | O  | O  |    |    |    |    | 1.818  | 1.351       |
| 4th-1 | O  |    | O  |    |    |    | 1.349  | 1.348       |
| 5th   |    |    | O  | O  |    |    | 1.000  | 1.349       |
| 6th   |    | O  |    | O  |    |    | 0.792  | 1.263       |
| 7th   |    |    | O  | O  |    |    | 0.632  | 1.254       |
| 8th   |    |    | O  |    | O  |    | 0.526  | 1.200       |
| R     |    | O  |    |    |    | O  | 2.597  | RATIO SPREAD 6.745 |

|  | C1 | C2 | C3 | C4 | B1 | B2 | RATIOS | RATIO STEPS |
|---|---|---|---|---|---|---|---|---|
| 1st | ○ |  |  |  |  | ○ | 3.550 | |
| 2nd | ○ |  |  |  | ○ |  | 2.456 | 1.445 |
| 3rd | ○ | ○ |  |  |  |  | 1.818 | 1.351 |
| 4th-1 | ○ |  |  | ○ |  |  | 1.300 | 1.398 |
| 5th |  |  | ○ | ○ |  |  | 1.000 | 1.300 |
| 6th |  | ○ |  | ○ |  |  | 0.792 | 1.263 |
| 7th |  |  |  | ○ | ○ |  | 0.632 | 1.254 |
| 8th |  |  | ○ |  | ○ |  | 0.526 | 1.200 |
| R |  | ○ |  |  |  | ○ | 2.597 | RATIOSPREAD 6.745 |

|     | C1 | C2 | C3 | C4 | B1 | B2 | RATIOS | RATIO STEPS |
|-----|----|----|----|----|----|----|--------|-------------|
| 1st | ○  |    |    |    |    | ○  | 3.550  |             |
| 2nd | ○  |    |    |    | ○  |    | 2.456  | 1.445       |
| 3rd | ○  | ○  |    |    |    |    | 1.818  | 1.351       |
| 4th-1 | ○ |   | ○  |    |    |    | 1.349  | 1.348       |
| 5th |    |    | ○  | ○  |    |    | 1.000  | 1.349       |
| 6th |    | ○  |    | ○  |    |    | 0.792  | 1.263       |
| 7th |    |    |    | ○  | ○  |    | 0.632  | 1.254       |
| 8th |    |    | ○  |    | ○  |    | 0.526  | 1.200       |
| R   |    | ○  |    |    |    | ○  | 2.597  | RATIO SPREAD 6.745 |

| | C1 | C2 | C3 | C4 | B1 | B2 | RATIOS | RATIO STEPS |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | | ○ | | | 1.300 | 1.398 |
| 5th | | | ○ | ○ | | | 1.000 | 1.300 |
| 6th | | ○ | | ○ | | | 0.792 | 1.263 |
| 7th | | | | ○ | ○ | | 0.632 | 1.254 |
| 8th | | | ○ | | ○ | | 0.526 | 1.200 |
| R | | ○ | | | | ○ | 2.597 | RATIO SPREAD 6.745 |

|      | C1 | C2 | C3 | C4 | B1 | B2 | RATIOS | RATIO STEPS |
|------|----|----|----|----|----|----|--------|-------------|
| 1st  | O  |    |    |    |    | O  | 3.550  |             |
| 2nd  | O  |    |    |    | O  |    | 2.456  | 1.445       |
| 3rd  | O  | O  |    |    |    |    | 1.818  | 1.351       |
| 4th-1| O  |    |    | O  |    |    | 1.349  | 1.348       |
| 5th  |    |    | O  | O  |    |    | 1.000  | 1.349       |
| 6th  |    | O  |    | O  |    |    | 0.792  | 1.263       |
| 7th  |    |    |    | O  | O  |    | 0.632  | 1.254       |
| 8th  |    |    | O  | O  |    |    | 0.526  | 1.200       |
| R    |    | O  |    |    |    | O  | 2.597  | RATIO SPREAD 6.745 |

|      | C1 | C2 | C3 | C4 | B1 | B2 | RATIOS | RATIO STEPS |
|------|----|----|----|----|----|----|--------|-------------|
| 1st  | O  |    |    |    |    | O  | 3.550  |             |
| 2nd  | O  |    |    | O  |    |    | 2.456  | 1.445       |
| 3rd  | O  | O  |    |    |    |    | 1.818  | 1.351       |
| 4th-1| O  |    |    | O  |    |    | 1.300  | 1.398       |
| 5th  |    |    | O  | O  |    |    | 1.000  | 1.300       |
| 6th  |    | O  |    | O  |    |    | 0.792  | 1.263       |
| 7th  |    |    |    | O  | O  |    | 0.632  | 1.254       |
| 8th  |    |    | O  |    | O  |    | 0.526  | 1.200       |
| R    |    | O  |    |    |    | O  | 2.597  | RATIO SPREAD 6.745 |

PLANETARY-GEAR-TYPE MULTIPLE-STEP TRANSMISSION FOR VEHICLE

This application is based on Japanese Patent Applications No. 2003-149926 filed in May 27, 2003 and No. 2003-289464 filed in Aug. 7, 2003, the contents of which are incorporated hereinto by reference.

BACKGROUND OF THE INVENTION

1. Field of the Invention

The present invention relates to a planetary-gear-type multiple-step transmission interposed between a drive power source and drive wheels of a vehicle such as an automobile.

2. Discussion of Related Art

For vehicle, there is widely used a planetary-gear-type multiple-step transmission which is equipped with a plurality of planetary gear sets, as disclosed in JP-2002-206601A, JP-H08-105496A, JP-2000-199549A, JP-2000-266138A, JP-2001-82555A, JP-2002-227940A, JP-2002-295609A and JP-2956173B2. In such a planetary-gear-type multiple-step transmission, a plurality of predetermined speed ratios or operating positions (gear positions) are selectively established by connecting elements of the planetary gear sets through coupling devices such as clutches and brakes. For example, in a transmission disclosed in JP-2002-206601A, a total of twelve forward drive positions are established by using four planetary gear sets.

The planetary-gear-type multiple-step transmission is desired to be not only simple in construction and small in size and to provide a large number of operating positions and a wide range of speed ratio, but also to provide speed ratios that change in geometric progression or nearly geometric progression. In the multiple-step transmission disclosed in JP-2002-206601A, however, the speed ratios of the respective operating positions do not change in geometric progression, thereby resulting in a poor maneuverability in the transmission. In the transmission of JP-2002-206601A, for example, a ratio step between the speed ratio of the sixth-speed position and the speed ratio of the seventh-speed position is 1.050 (=1.391/1.325), which is considerably smaller than the other ratio steps between other adjacent speed positions (see FIG. 5 of the publication of Japanese Patent Application). That is, in this transmission, the ratio steps between adjacent speed positions considerably change, rather than being substantially uniform. Such a problem might be solved by increasing number of planetary gear sets to be incorporated in the transmission. However, the increase in the number of planetary gear sets leads to an increase in an overall length of the transmission, thereby possibly reducing a degree of freedom in installation of the transmission on a vehicle, while increasing number of coupling devices required for connecting elements of the planetary gear sets.

SUMMARY OF THE INVENTION

The present invention was made in the light of the background art discussed above. It is therefore an object of the present invention to provide a small-sized planetary-gear-type multiple-step transmission capable of establishing at least seven forward drive positions with relatively width range of speed ratio and appropriate ratio steps between adjacent drive positions. This object of the invention may be achieved according to any one of first through twenty-eighth aspects of the invention which are described below.

The first aspect of this invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets each having a sun gear, a carrier and a ring gear, the second transmission unit further including first and second brakes, and first, second, third and fourth clutches, wherein the second transmission unit constitutes first, second, third, fourth and fifth rotary elements, each of which is provided by at least one of the sun gears, carriers and ring gears of the three planetary gear sets, and each of which is rotatable as a unit, wherein the first rotary element is selectively connected to the second intermediate transmitting path through the second clutch, while being selectively connected to the stationary member through the first brake, wherein the second rotary element is selectively connected to the first intermediate transmitting path through the third clutch, wherein the third rotary element is selectively connected to the first intermediate transmitting path through the fourth clutch, while being selectively connected to the stationary member through the second brake, wherein the fourth rotary element is connected to the output rotary member, wherein the fifth rotary element is selectively connected to the second intermediate transmitting path through the first clutch, and wherein the plurality of drive positions are established by selectively engaging and releasing the brakes and the clutches.

According to the second aspect of the invention, the planetary-gear-type multiple-step transmission defined in the first aspect of the invention has at least seven forward drive positions, which are established by selectively engaging and releasing the brakes and the clutches.

According to the third aspect of the invention, the planetary-gear-type multiple-step transmission defined in the first or second aspect of the invention has at least eight drive positions consisting of a first-speed position, a second-speed position having a speed ratio smaller than that of the first-speed position, a third-speed position having a speed ratio smaller than that of the second-speed position, a fourth-speed position having a speed ratio smaller than that of the third-speed position, a fifth-speed position having a speed ratio smaller than that of the fourth-speed position, a sixth-speed position having a speed ratio smaller than that of the fifth-speed position, a seventh-speed position having a speed ratio smaller than that of the sixth-speed position, and an eighth-speed position having a speed ratio smaller than that of the seventh-speed position, wherein the first-speed position is established by engaging the first clutch and the second brake, wherein the second-speed position is established by engaging the first clutch and the first brake, wherein the third-speed position is established by engaging the first clutch and the second clutch, wherein the fourth-speed position is established by engaging the first clutch and one of the third and fourth clutches, wherein the fifth-speed position is established by engaging the third clutch and the fourth clutch, wherein the sixth-speed position is established by engaging the second clutch and the fourth clutch, wherein the seventh-speed position is established by engaging the fourth clutch and the first brake, and wherein the eighth-speed position is established by engaging the third clutch and the first brake.

According to the fourth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a double-pinion type planetary gear set, and includes a second sun gear, a second carrier, a second ring gear and at least one pair of planetary gears which are rotatably held by the second carrier and which mesh with each other, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the first rotary element includes the second sun gear and the fourth sun gear, wherein the second rotary element includes the third ring gear, wherein the third rotary element includes the second ring gear, the third carrier and the fourth carrier, wherein the fourth rotary element includes the third sun gear and the fourth ring gear, and wherein the fifth rotary element includes the second carrier.

According to the fifth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a double-pinion type planetary gear set, and includes a second sun gear, a second carrier, a second ring gear and at least one pair of planetary gears which are rotatably held by the second carrier and which mesh with each other, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the first rotary element includes the second carrier and the fourth sun gear, wherein the second rotary element includes the third ring gear, wherein the third rotary element includes the second ring gear, the third carrier and the fourth carrier, wherein the fourth rotary element includes the third sun gear and the fourth ring gear, and wherein the fifth rotary element includes the second sun gear.

According to the sixth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the third carrier and which mesh with each other, wherein the fourth planetary gear set is a single-pinion type planetary gear set, and includes a fourth sun gear, a fourth carrier and a fourth ring gear, wherein the first rotary element includes the second sun gear and the third sun gear, wherein the second rotary element includes the fourth ring gear, wherein the third rotary element includes the third ring gear and the fourth carrier, wherein the fourth rotary element includes the second carrier, the third carrier and the fourth sun gear, and wherein the fifth rotary element includes the second ring gear.

According to the seventh aspect of the invention, in the planetary-gear-type multiple-step transmission defined in the sixth aspect of the invention, the three planetary gear sets of the second transmission unit has a common carrier, a common sun gear and a common planetary gear, wherein the common carrier constitutes the second carrier and the third carrier, wherein the common sun gear constitutes the second sun gear and the third sun gear, and wherein the common planetary gear constitutes one of each pair of the above-described at least one pair of planetary gears, and a planetary gear held by the second carrier.

According to the eighth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the third carrier and which mesh with each other, wherein the fourth planetary gear set is a single-pinion type planetary gear set, and includes a fourth sun gear, a fourth carrier and a fourth ring gear, wherein the first rotary element includes the third sun gear and the fourth sun gear, wherein the second rotary element includes the second ring gear, wherein the third rotary element includes the second carrier, wherein the fourth rotary element includes the second sun gear, the third ring gear and the fourth carrier, and wherein the fifth rotary element includes the third carrier and the fourth ring gear.

According to the ninth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a single-pinion type planetary gear set, and includes a second sun gear, a second carrier and a second ring gear, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the first rotary element includes the third sun gear and the fourth sun gear, wherein the second rotary element includes the second ring gear, wherein the third rotary element includes the second carrier and the third carrier, wherein the fourth rotary element includes the second sun gear, the third ring gear and the fourth carrier, and wherein the fifth rotary element includes the fourth ring gear.

According to the tenth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the third carrier and which mesh with each other, wherein the fourth planetary gear set is a single-pinion type planetary gear set, and includes a fourth sun gear, a fourth carrier and a fourth ring gear, wherein the first rotary element includes the fourth sun gear, wherein the second rotary element includes the second ring gear and the third sun gear, wherein the third rotary element includes the second carrier, wherein the fourth rotary element includes the second sun gear, the third ring gear and the fourth carrier, and wherein the fifth rotary element includes the third carrier and the fourth ring gear.

According to the eleventh aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the third carrier and which mesh with each other, wherein the fourth planetary gear set is a single-pinion type planetary gear set, and includes a fourth sun gear, a fourth carrier and a fourth ring gear, wherein the first rotary element includes the fourth sun gear, wherein the second rotary element includes the second ring gear, wherein the third rotary element includes the second carrier and the third sun gear, wherein the fourth rotary element includes the second sun gear, the third ring gear and the fourth carrier, and wherein the fifth rotary element includes the third carrier and the fourth ring gear.

According to the twelfth aspect of the invention, in the planetary-gear-type multiple-step transmission defined in any one of the first through third aspects of the invention, the three planetary gear sets consist of second, third and fourth planetary gear sets which are disposed coaxially with each other, such that the third planetary gear set is disposed between the second and fourth planetary gear sets, wherein the second planetary gear set is a double-pinion type planetary gear set, and includes a second sun gear, a second carrier, a second ring gear and at least one pair of planetary gears which are rotatably held by the second carrier and which mesh with each other, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the first rotary element includes the fourth sun gear, wherein the second rotary element includes the second carrier and the third ring gear, wherein the third rotary element includes the third carrier, wherein the fourth rotary element includes the second ring gear, the third sun gear and the fourth carrier, and wherein the fifth rotary element includes the second sun gear and the fourth ring gear.

According to the thirteenth aspect of the invention, in the planetary-gear-type multiple-step transmission defined in any one of the first through twelfth aspects of the invention, the first transmission unit has a first planetary gear set including a first sun gear, a first carrier and a first ring gear, wherein one of the first sun gear, carrier and ring gear is connected to the input rotary member and the first intermediate transmitting path, wherein another of the first sun gear, carrier and ring gear is fixed to the stationary member so as to be unrotatable, and wherein still another of the first sun gear, carrier and ring gear is connected to the second intermediate transmitting path.

According to the fourteenth aspect of the invention, in the planetary-gear-type multiple-step transmission defined in the thirteenth aspect of the invention, the first planetary gear set is a double-pinion type planetary gear set, and further includes at least one pair of planetary gears which are rotatably held by the first carrier and which mesh with each other, wherein the first carrier is connected to the input rotary member and the first intermediate transmitting path, wherein the first sun gear is fixed to the stationary member so as to be unrotatable, and wherein the first ring gear is connected to the second intermediate transmitting path.

The fifteenth aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a double-pinion type planetary gear set, and includes a second sun gear, a second carrier, a second ring gear and at least one pair of planetary gears which are rotatably held by the second carrier and which mesh with each other, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the second sun gear and the fourth sun gear are selectively connected to the second intermediate transmitting path through the second clutch, while being selectively connected to the stationary member through the first brake, wherein the third ring gear is selectively connected to the first intermediate transmitting path through the third clutch, wherein the second ring gear, the third carrier and the fourth carrier are selectively connected to the first intermediate transmitting path through the fourth clutch, while being selectively connected to the stationary member through the second brake, wherein the third sun gear and the fourth ring gear are connected to the output rotary member, wherein the second carrier is selectively connected to the second intermediate transmitting path through the first clutch, and wherein the plurality of drive positions are established by selectively engaging and releasing the brakes and the clutches.

The sixteenth aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a double-pinion type planetary gear set, and includes a second sun gear, a second carrier, a second ring gear and at least one pair of planetary gears which are rotatably held by the second carrier and which mesh with each other, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the second carrier and the fourth sun gear are selectively connected to the second intermediate transmitting path through the second clutch, while being selectively connected to the stationary member through the first brake, wherein the third ring gear is selectively connected to the first intermediate transmitting path through the third clutch, wherein the second ring gear, the third carrier and the fourth carrier are selectively connected to the first intermediate transmitting path through the fourth clutch, while being selectively connected to the stationary member through the second brake, wherein the third sun gear and the fourth ring gear are connected to the output rotary member, wherein the second sun gear is selectively connected to the second intermediate transmitting path through the first clutch, and wherein the plurality of drive positions are established by selectively engaging and releasing the brakes and the clutches.

The seventeenth aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the second carrier and which mesh with each other, wherein the fourth planetary gear set is a single-pinion type planetary gear set, and includes a fourth sun gear, a fourth carrier and a fourth ring gear, wherein the second sun gear and the third sun gear are selectively connected to the second intermediate transmitting path through the second clutch, while being selectively connected to the stationary member through the first brake, wherein the fourth ring gear is selectively connected to the first intermediate transmitting path through the third clutch, wherein the third ring gear and the fourth carrier are selectively connected to the first intermediate transmitting path through the fourth clutch, while being selectively connected to the stationary member through the second brake, wherein the second carrier, the third carrier and the fourth sun gear are connected to the output rotary member, wherein the second ring gear is selectively connected to the second intermediate transmitting path through the first clutch, and wherein the plurality of drive positions are established by selectively engaging and releasing the brakes and the clutches.

According to the eighteenth aspect of the invention, in the planetary-gear-type multiple-step transmission defined in the seventeenth aspect of the invention, the three planetary gear sets of the second transmission unit has a common carrier, a common sun gear and a common planetary gear, wherein the common carrier constitutes the second carrier and the third carrier, wherein the common sun gear constitutes the second sun gear and the third sun gear, and wherein the common planetary gear constitutes one of each pair of the above-described at least one pair of planetary gears, and a planetary gear held by the second carrier.

The nineteenth aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the second carrier and which mesh with each other, wherein the fourth planetary gear set is a single-pinion type planetary gear set, and includes a fourth sun gear, a fourth carrier and a fourth ring gear, wherein the third sun gear and the fourth sun gear are selectively connected to the second intermediate transmitting path through the second clutch, while being selectively connected to the stationary member through the first brake, wherein the second ring gear is selectively connected to the first intermediate transmitting path through the third clutch, wherein the second carrier is selectively connected to the first intermediate transmitting path through the fourth clutch, while being selectively connected to the stationary member through the second brake, wherein the second sun gear, the third ring gear and the fourth carrier are connected to the output rotary member, wherein the third carrier and the fourth ring gear are selectively connected to the second intermediate transmitting path through the first clutch, and wherein the plurality of drive positions are established by selectively engaging and releasing the brakes and the clutches.

The twentieth aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a single-pinion type planetary gear set, and includes a second sun gear, a second carrier and a second ring gear, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the third sun gear and the fourth sun gear are selectively connected to the second intermediate transmitting path through the second clutch, while being selectively connected to the stationary member through the first brake, wherein the second ring gear is selectively connected to the first intermediate transmitting path through the third clutch, wherein the second carrier and the third carrier are selectively connected to the first intermediate transmitting path through the fourth clutch, while being selectively connected to the stationary member through the second brake, wherein the second sun gear, the third ring gear and the fourth carrier are connected to the output rotary member, wherein the fourth ring gear is selectively connected to the second intermediate transmitting path through the first clutch, and wherein the plurality of drive positions are established by selectively engaging and releasing the brakes and the clutches.

The twenty-first aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the second carrier and which mesh with each other, wherein the fourth planetary gear set is a single-pinion type planetary gear set, and includes a fourth sun gear, a fourth carrier and a fourth ring gear, wherein the fourth sun gear is selectively connected to the second intermediate transmitting path through the second clutch, while being selectively connected to the stationary member through the first brake, wherein the second ring gear and the third sun gear are selectively connected to the first intermediate transmitting path through the third clutch, wherein the second carrier is selectively connected to the first intermediate transmitting path through the fourth clutch, while being selectively connected to the stationary member through the second brake, wherein the second sun gear, the third ring gear and the fourth carrier are connected to the output rotary member, wherein the third carrier and the fourth ring gear are selectively connected to the second intermediate transmitting path through the first clutch, and wherein the plurality of drive positions are established by selectively engaging and releasing the brakes and the clutches.

The twenty-second aspect of the invention provides a planetary-gear-type multiple-step transmission for a vehicle, having a plurality of drive positions which are selectively established, the transmission comprising: (a) a stationary member; (b) an input rotary. member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a single-pinion type planetary gear set, and includes a second sun gear, a second carrier and a second ring gear, wherein the third planetary gear set is a double-pinion type planetary gear set, and includes a third sun gear, a third carrier, a third ring gear and at least one pair of planetary gears which are rotatably held by the second carrier and which mesh with each other, wherein the fourth planetary gear set is a single-pinion type planetary gear set, and includes a fourth sun gear, a fourth carrier and a fourth ring gear, wherein the fourth sun gear is selectively connected to the second intermediate transmitting path through the second clutch, while being selectively connected to the stationary member through the first brake, wherein the second ring gear is selectively connected to the first intermediate transmitting path through the third clutch, wherein the second carrier and the third sun gear are selectively connected to the first intermediate transmitting path through the fourth clutch, while being selectively connected to the stationary member through the second brake, wherein the second sun gear, the third ring gear and the fourth carrier are connected to the output rotary member, wherein the third carrier and the fourth ring gear are selectively connected to the second intermediate transmitting path through the first clutch, and wherein the plurality of drive positions are established by selectively engaging and releasing the brakes and the clutches.

The twenty-third aspect of the invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member, wherein the first transmission unit is capable of transmitting a rotary motion from the input rotary member to the second transmission unit through first and second intermediate transmitting paths such that a speed of the rotary motion transmitted through the second intermediate transmitting path is lower than a speed of the rotary motion transmitted through the first intermediate transmitting path, wherein the second transmission unit includes three planetary gear sets consisting of second, third and fourth planetary gear sets which are disposed coaxially with each other, such that the third planetary gear set is disposed between the second and fourth planetary gear sets, the second transmission unit further including first and second brakes, and first, second, third and fourth clutches, wherein the second planetary gear set is a double-pinion type planetary gear set, and includes a second sun gear, a second carrier, a second ring gear and at least one pair of planetary gears which are rotatably held by the second carrier and which mesh with each other, wherein the third planetary gear set is a single-pinion type planetary gear set, and includes a third sun gear, a third carrier and a third ring gear, wherein the fourth planetary gear set is a single-pinion type planetary gear set, and includes a fourth sun gear, a fourth carrier and a fourth ring gear, wherein the fourth sun gear is selectively connected to the second intermediate transmitting path through the second clutch, while being selectively connected to the stationary member through the first brake, wherein the second carrier and the third ring gear are selectively connected to the first intermediate transmitting path through the third clutch, wherein the third carrier is selectively connected to the first intermediate transmitting path through the fourth clutch, while being selectively connected to the stationary member through the second brake, wherein the second ring gear, the third sun gear and the fourth carrier are connected to the output rotary member, wherein the second sun gear and the fourth ring gear are selectively connected to the second intermediate transmitting path through the first clutch, and wherein the plurality of drive positions are established by selectively engaging and releasing the brakes and the clutches.

According to the twenty-fourth aspect of the invention, in the planetary-gear-type multiple-step transmission defined in any one of the fifteenth through twenty-third aspects of the invention, the first transmission unit has a first planetary gear set of double-pinion type including a first sun gear, a first carrier, a first ring gear and at least one pair of planetary gears which are rotatably held by the first carrier and which mesh with each other, wherein the first carrier is connected to the input rotary member and the first intermediate transmitting path, wherein the first sun gear is fixed to the stationary member so as to be unrotatable, and wherein the first ring gear is connected to the second intermediate transmitting path.

According to the twenty-fifth aspect of the invention, the planetary-gear-type multiple-step transmission defined in any one of the fifteenth through twenty-fourth aspects of the invention, has at least seven forward drive positions, which are established by selectively engaging and releasing the brakes and the clutches.

According to the twenty-sixth aspect of the invention, the planetary-gear-type multiple-step transmission defined in any one of the fifteenth through twenty-fifth aspects of the invention, has at least eight drive positions consisting of a first-speed position, a second-speed position having a speed ratio smaller than that of the first-speed position, a third-speed position having a speed ratio smaller than that of the second-speed position, a fourth-speed position having a speed ratio smaller than that of the third-speed position, a fifth-speed position having a speed ratio smaller than that of the fourth-speed position, a sixth-speed position having a speed ratio smaller than that of the fifth-speed position, a seventh-speed position having a speed ratio smaller than that of the sixth-speed position, and an eighth-speed position having a speed ratio smaller than that of the seventh-speed position, wherein the first-speed position is established by engaging the first clutch and the second brake, wherein the second-speed position is established by engaging the first clutch and the first brake, wherein the third-speed position is established by engaging the first clutch and the second clutch, wherein the fourth-speed position is established by engaging the first clutch and one of the third and fourth clutches, wherein the fifth-speed position is established by engaging the third clutch and the fourth clutch, wherein the sixth-speed position is established by engaging the second clutch and the fourth clutch, wherein the seventh-speed position is established by engaging the fourth clutch and the first brake, and wherein the eighth-speed position is established by engaging the third clutch and the first brake.

According to the twenty-seventh aspect of the invention, the planetary-gear-type multiple-step transmission defined in any one of the first through twenty-sixth aspects of the invention, has a rear drive position, which is established by engaging the second clutch and the second brake.

According to the twenty-eighth aspect of the invention, the planetary-gear-type multiple-step transmission defined in any one of the first through twenty-seventh aspects of the invention, further comprises a hydraulic transmission unit through which an output of a drive power source is transmitted to the input rotary member.

Each of the above-described first through twenty-eighth aspects of the invention provides the small-sized planetary-gear-type multiple-step transmission having, for example, at least seven forward drive positions, with relatively width range of speed ratio and appropriate ratio steps between adjacent drive positions, owing to the first transmission unit and the second transmission unit which includes the three planetary gear sets.

Each of the above-described third and twenty-sixth aspects of the invention provides the small-sized planetary-gear-type multiple-step transmission having at least eight drive positions, with relatively width range of speed ratio and appropriate ratio steps between adjacent drive positions. The number of drive positions may be changed to seven, for example, by eliminating one of the first-speed through eighth-speed positions. The seven forward drive positions may consist of the first-speed through seven-speed positions, or the second-speed through eighth-speed positions, for example.

Each of the above-described seventh and eighteen aspects of the invention provides the planetary-gear-type multiple-step transmission which can be constituted by a further reduced number of components and which can have a further reduced axial length.

The above-described twenty-seventh aspect of the invention provides the planetary-gear-type multiple-step transmission which has the rear drive position in addition to the plurality of forward drive positions.

The above-described twenty-eighth aspect of the invention provides the planetary-gear-type multiple-step transmission which can be made in compact.

In each of the above-described thirteenth, fourteenth and twenty-fourth aspects of the invention, the first transmission unit has the first planetary gear set including the first sun gear, carrier and ring gear, such that one of the first sun gear, carrier and ring gear is connected to the input rotary member and the first intermediate transmitting path, such that another of the first sun gear, carrier and ring gear is fixed to the stationary member, and such that still another of the first sun gear, carrier and ring gear is connected to the second intermediate transmitting path. However, the provision of the first planetary gear set in the first transmission unit is not essential.

For example, in the planetary-gear-type multiple-step transmission of each of the above-described first through twelfth and fifteenth through twenty-third aspects of the invention, the first transmission unit may have two pairs of power transmitting members which are arranged in parallel with each other, wherein one of the two pairs of the power transmitting members is connected to the input rotary member and the first intermediate transmitting path while the other of the two pairs of the power transmitting members is connected to the input rotary member and the second intermediate transmitting path. The two pairs of power transmitting members may be provided by first and second pairs of counter gears consisting of first drive and driven gears and second drive and driven gears, like counter gears of a parallel-axes-type transmission, such that the first and second drive gears are mounted on a first shaft to which the input rotary member is connected while the first and second driven gears are mounted on a second shaft which is parallel with the first shaft and which corresponds to a common axis of the three planetary gear sets of the second transmission unit. Where the reduction gear ratio of the second pair of counter gears is made larger than that of the first pair of counter gears, the first transmission unit transmits the rotary motion from the input rotary member to the second transmission unit such that the speed of the rotary motion as transmitted through the second intermediate transmitting path is lower than the speed of the rotary motion as transmitted through the first intermediate transmitting path. This arrangement, in which the first transmission unit have the two pairs of power transmitting members in place of the planetary gear set, permits the transmission to have relatively width range of speed ratio and appropriate ratio steps between adjacent drive positions, as the arrangement in which the first transmission unit have the planetary gear set. Further, this arrangement is advantageous over a transmission having four planetary gear sets arranged in series on a single axis, in that its relatively small axial length permits the transmission to be advantageously used for a front-engine front-drive (FF vehicle) or a rear-engine rear-drive (RR vehicle) on which a transmission is preferably installed with an axis of the transmission being parallel to the transverse or lateral direction of the vehicle.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENT

Figures 1, 2:
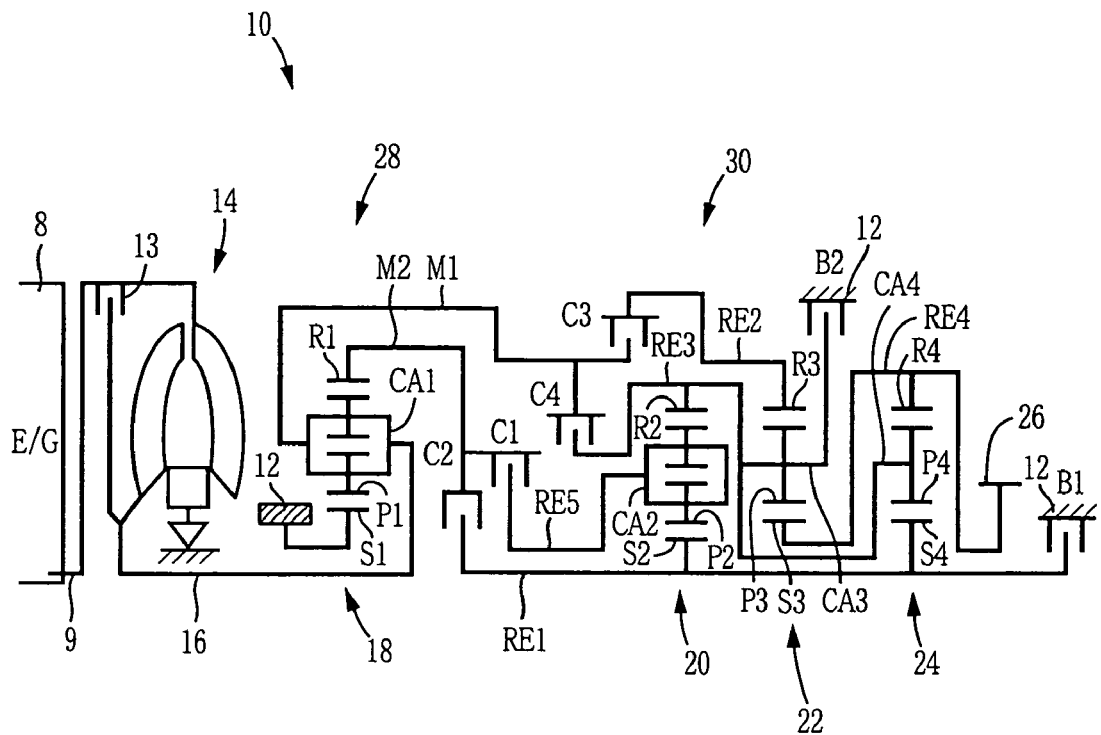
FIG. 1 is a schematic view illustrating a basic arrangement of a vehicle planetary-gear-type multiple-step transmission according to a first embodiment of the present invention.
FIG. 2 is a table indicating a relationship between operating positions of the multiple-step transmission of FIG. 1 and combinations of operating states of hydraulically operated frictional coupling devices to establish the respective operating positions.

Referring to first to the schematic view of FIG. 1, there is illustrated a basic arrangement of a vehicle automatic transmission in the form of a vehicle planetary gear type multiple-step transmission (hereinafter referred to simply as "transmission") 10, which is to be disposed between an engine 8 as a drive power source and drive wheels (not shown) so as to transmit an output of the engine 8 to the drive wheels. As shown in FIG. 1, the transmission 10 has a transmission casing 12 to be fixed to the body of the vehicle, and includes: a hydraulic transmission unit in the form of a torque converter 14 equipped with a lock-up clutch 13; an input shaft 16 connected to the torque converter 14; a first transmission unit 28 constituted principally by a first planetary gear set 18; a second transmission unit 30 constituted principally by a second planetary gear set 20, a third planetary gear set 22 and a fourth planetary gear set 24; and an output gear 26. The torque converter 14, the input shaft 16, the first transmission unit 28, the second transmission unit 30 and the output gear 26 are disposed coaxially with each other within the transmission casing 12, in the order of description. The input shaft 16 is connected to the torque converter 14, which in turn is connected to a crankshaft 9 of the engine 8. The output gear 26 is held in meshing engagement with a large-diameter gear of a differential gear device (not shown), so as to rotate the right and left drive wheels through the differential gear. This transmission 10 is advantageously used for a front-engine front-drive (FF vehicle) or a rear-engine rear-drive (RR vehicle) on which a transmission is preferably installed with an axis of the transmission being parallel to the transverse or lateral direction of the vehicle. In the present first embodiment, the input shaft 16 and the output gear 26 function as an input rotary member and an output rotary member, respectively, while the transmission casing 12 functions as a stationary or non-rotary member. Since the transmission 10 is constructed symmetrically with respect to its axis, the lower half of the transmission 10 located below the axis is omitted in the schematic view of FIG. 1.

The first planetary gear set 18 constituting the first transmitting unit 28 is of double-pinion type, and includes a first sun gear S1, plural pairs of first planetary gears P1 (each pair of gears P1 mesh with each other), a first carrier CA1 supporting the first planetary gears P1, and a first ring gear R1 meshing with the first sun gear S1 through the first planetary gears P1. The first carrier CA1 supports the first planetary gears P1 such that the first planetary gears P1 are rotatable about their respective axes and are rotatable about the axis of the first sun gear S1. The first planetary gear set 18 has a predetermined gear ratio $\rho_1$, for instance, about 0.450. The first carrier CA1 is connected to the input shaft 16 and also to a transmitting member which constitutes a first intermediate transmitting path M1. The first sun gear S1 is fixed to the transmission casing 12 so as to be unrotatable. The first ring gear R1 is connected to a transmitting member which constitutes a second intermediate transmitting path M2. The first transmitting unit 28 is capable of transmitting a rotary motion from the input shaft 16 to the second transmission unit 30 through the two different intermediate transmitting paths M1, M2 such that a speed of rotary motion as transmitted through the second intermediate transmitting path M2 is lower than a speed of the rotary motion as transmitted through the first intermediate transmitting path M1. In the present first embodiment, the first intermediate transmitting path M1 is connected to the input shaft 16 through the first carrier CA1 of the first transmission unit 28, so that the rotary motion of the input shaft 16 is transmitted to the intermediate transmitting path M1 without the speed of the rotary motion being changed. However, the speed of the rotary motion may be changed in its transmission between the input shaft 16 and the intermediate transmitting path M1. Further, in the present embodiment, it is possible to consider that the first ring gear R1 per se (which is a member connected to the second intermediate transmitting path M2) functions also as the transmitting member or intermediate outputting member which constitutes the second intermediate transmitting path M2.

The second planetary gear set 20 of the second transmitting unit 30 is of double-pinion type, while the third and fourth planetary gear sets 22, 24 are of single-pinion type. The second planetary gear set 20 includes a second sun gear S2, plural pairs of second planetary gears P2 (each pair of gears P2 mesh with each other), a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.532. The third planetary gear set 22 includes a third sun gear S3, a plurality of third planetary gears P3, a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.286. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.583. Where the numbers of teeth of the first sun gear S1, first ring gear R1, second sun gear S2, second ring gear R2, third sun gear S3, third ring gear R3, fourth sun gear S4 and fourth ring gear R4 are represented by $Z_{S1}$, $Z_{R1}$, $Z_{S2}$, $Z_{R2}$, $Z_{S3}$, $Z_{R3}$, $Z_{S4}$ and $Z_{R4}$, respectively, the above-indicated gear ratios $\rho_1$, $\rho_2$, $\rho_3$ and $\rho_4$ are represented by $Z_{S1}/Z_{R1}$, $Z_{S2}/Z_{R2}$, $Z_{S3}/Z_{R3}$ and $Z_{S4}/Z_{R4}$, respectively.

In the second transmission unit 30, the second and fourth sun gears S2, S4 integrally connected to each other are selectively connected to the transmitting member of the second intermediate transmitting path M2 (which is in turn connected to the first ring gear R1 or corresponds to the first ring gear R1 per se) through a second clutch C2, while being selectively connected to the transmission casing 12 as the stationary member through a first brake B1. The third ring gear R3 is selectively connected to the transmitting member of the first intermediate transmitting path M1 through a third clutch C3. The second ring gear R2, the third carrier CA3 and the fourth carrier CA4 integrally connected to each other are selectively connected to the transmitting member of the first intermediate transmitting path M1 through a fourth clutch C4, while being selectively connected to the transmission casing 12 through a second brake B2. The third sun gear S3 and the fourth ring gear R4 integrally connected to each other are connected to the output gear 26 as the output rotary member. The second carrier CA2 is selectively connected to the transmitting member of the second intermediate transmitting path M2 through a first clutch C1.

The above-described first clutch C1, second clutch C2, third clutch C3, fourth clutch C4, first brake B1 and second brake B2 are hydraulically operated frictional coupling devices commonly used in known automatic transmissions for vehicles. For instance, each of those clutches may be a wet-type multiple-disc clutch having a plurality of friction plates which are superposed on each other and forced against each other by a hydraulic actuator, and each of those brakes may be a band brake having one band or two bands each of which is wound on the outer circumferential surface of a rotary drum and tightened at its one end by a hydraulic actuator. The brakes B1, B2 are selectively engaged to connect the corresponding rotary elements to the transmission casing 12, that is, to selectively bring the corresponding rotary elements to a stationary state.

In the transmission 10 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 2. The eight forward drive positions are first-speed, second-speed, third-speed, fourth-speed, fifth-speed, sixth-speed, seventh-speed and eighth-speed positions, which have respective speed ratios γ that change in geometric progression. The speed ratio $\gamma$ is equal to $N_{in}/N_{out}$, where $N_{in}$ and $N_{out}$ represent rotational speeds of the input shaft 16 and output gear 26, respectively.

As shown in FIG. 2, the first-speed position having the highest speed ratio $\gamma_1$ of 3.550, for instance, is established by engaging the first clutch C1 and the second brake B2 so as to connect the second carrier CA2 to the first ring gear R1 (via the second intermediate transmitting path M2) and so as to connect the second ring gear R2, third carrier CA3 and fourth carrier CA4 to the transmission casing 12. The second-speed position having the speed ratio $\gamma_2$, for instance, about 2.456, which is lower than that of the first-speed position, is established by engaging the first clutch C1 and the first brake B1 so as to connect the second carrier CA2 to the first ring gear R1 (via the second intermediate transmitting path M2) and so as to connect the second and fourth sun gears S2, S4 to the transmission casing 12. The third-speed position having the speed ratio $\gamma_3$, for instance, about 1.818, which is lower than that of the second-speed position, is established by engaging the first and second clutches C1, C2 so as to connect the second carrier CA2 to the first ring gear R1 (via the second intermediate transmitting path M2) and so as to connect the second and fourth sun gears S2, S4 to the first ring gear R1 (via the second intermediate transmitting path M2). The fourth-speed position having the speed ratio $\gamma_4$, for instance, about 1.349, which is lower than that of the third-speed position, is established by engaging the first and third clutches C1, C3 so as to connect the second carrier CA2 to the first ring gear R1 (via the second intermediate transmitting path M2) and so as to connect the third ring gear R3 to the first carrier CA1 (via the first intermediate transmitting path M1). The fifth-speed position having the speed ratio $\gamma_5$, for instance, about 1.000, which is lower than that of the fourth-speed position, is established by engaging the third and fourth clutches C3 and C4 so as to connect the third ring gear R3 to the first carrier CA1 (via the first intermediate transmitting path M1) and so as to connect the second ring gear R2 and third and fourth carriers CA3, CA4 to the first carrier CA1 (via the first intermediate transmitting path M1). The sixth-speed position having the speed ratio $\gamma_6$, for instance, about 0.792, which is lower than that of the fifth-speed position, is established by engaging the second and fourth clutches C2, C4 so as to connect the second and fourth sun gears S2, S4 to the first ring gear R1 (via the second intermediate transmitting path M2) and so as to connect the second ring gear R2 and third and fourth carriers CA3, CA4 to the first carrier CA1 (via the first intermediate transmitting path M1). The seventh-speed position having the speed ratio $\gamma_7$ of 0.632, for instance, which is lower than that of the sixth-speed position, is established by engaging the fourth clutch C4 and the first brake B1 so as to connect the second ring gear R2 and third and fourth carriers CA3, CA4 to the first carrier CA1 (via the first intermediate transmitting path M1) and so as to connect the second and fourth sun gears S2, S4 to the transmission casing 12. The eighth-speed position having the lowest speed ratio $\gamma_8$ of 0.526, for instance, which is lower than that of the seventh-speed position, is established by engaging the third clutch C3 and the first brake B1 so as to connect the third ring gear R3 to the first carrier CA1 (via the first intermediate transmitting path M1) and so as to connect the second and fourth sun gears S2, S4 to the transmission casing 12. The rear drive position having the ratio $\gamma_R$, for instance, 2.597, which is between those of the first-speed and second-speed positions, is established by engaging the second clutch C2 and the second brake B2 so as to connect the second and fourth sun gears S2, S4 to the first ring gear R1 (via the second intermediate transmitting path M2) and so as to connect the second ring gear R2, third carrier CA3 and fourth carrier CA4 to the transmission casing 12. The gear ratio $\rho_1$ of the first planetary gear set 18, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the transmission 10 described above, a ratio step ($\gamma_1/\gamma_2$) between the speed ratio $\gamma_1$ of the first-speed position and the speed ratio $\gamma_2$ of the second-speed position is 1.445, and a ratio step ($\gamma_2/\gamma_3$) between the speed ratio $\gamma_2$ of the second-speed position and the speed ratio $\gamma_3$ of the third-speed position is 1.351. A ratio step ($\gamma_3/\gamma_4$) between the speed ratio $\gamma_3$ of the third-speed position and the speed ratio $\gamma_4$ of the fourth-speed position is 1.348. A ratio step ($\gamma_4/\gamma_5$) between the speed ratio $\gamma_4$ of the fourth-speed position and the speed ratio $\gamma_5$ of the fifth-speed position is 1.349. A ratio step ($\gamma_5/\gamma_6$) between the speed ratio $\gamma_5$ of the fifth-speed position and the speed ratio $\gamma_6$ of the sixth-speed position is 1.263. A ratio step ($\gamma_6/\gamma_7$) between the speed ratio $\gamma_6$ of the sixth-speed position and the speed ratio $\gamma_7$ of the seventh-speed position is 1.254. A ratio step ($\gamma_7/\gamma_8$) between the speed ratio $\gamma_7$ of the seventh-speed position and the speed ratio $\gamma_8$ of the eighth-speed position is 1.200. Thus, the speed ratios $\gamma_1-\gamma_8$ change as the geometric progression. In the transmission 10, a ratio spread, i.e., a ratio step ($\gamma_1/\gamma_8$) between the speed ratio $\gamma_1$ of the first-speed position and the speed ratio $\gamma_8$ of the eighth-speed position is 6.745, which is comparatively high. This ratio spread or ratio step ($\gamma_1/\gamma_8$) represents a range of the gear ratio of the transmission 10.

Figure 3:
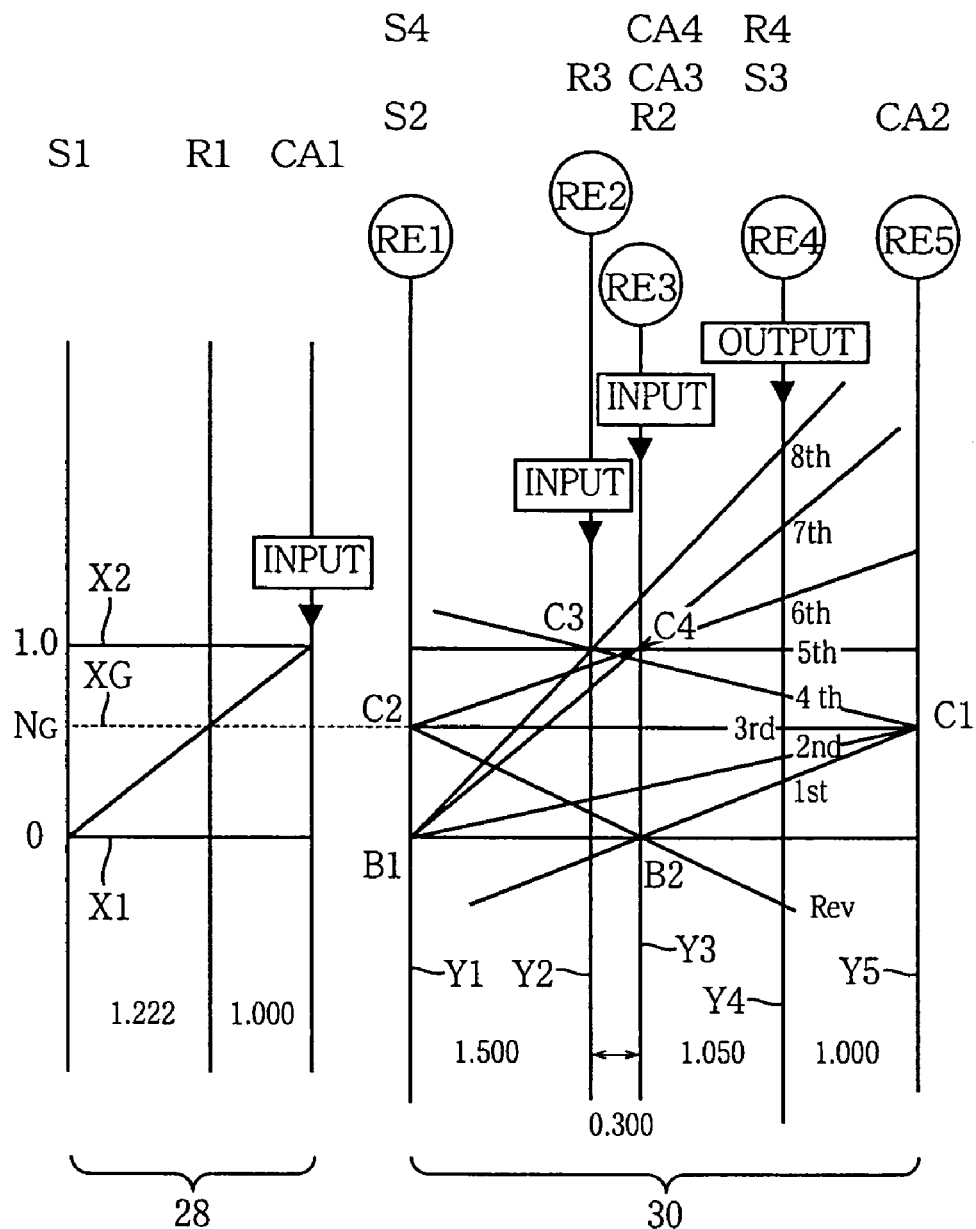
FIG. 3 is a collinear chart showing relative rotational speeds of a plurality of rotary elements incorporated in the multiple-step transmission of FIG. 1.

The collinear chart of FIG. 3 indicates, by parallel straight lines, a relationship among the rotational speeds of the rotary elements in each of the operating positions of the transmission 10 in which the rotary elements are connected to each other in respective different manners. The collinear chart of FIG. 3 is a two-dimensional coordinate system in which the gear ratios of the planetary gear sets 18, 20, 22, 24 are taken along the horizontal axis, while the relative rotational speeds of the rotary elements are taken along the vertical axis. A lowermost one of three horizontal straight lines X1, XG and X2, that is, the horizontal straight line X1 indicates the rotational speed of "0", while an uppermost line X2 indicates the rotational speed of "1.0", that is, the rotational speed of the input shaft 16 which is connected to the first intermediate transmitting path M1. An intermediate line XG indicates a predetermined rotational speed of $N_G$ which is dependent on the gear ratio $\rho_1$ of the first planetary gear set 18, that is, the rotational speed of the first ring gear R1 which is connected to the second intermediate transmitting path M2. Three straight lines of the first transmission unit 28 respectively represent three rotary elements of the first transmission unit 28, i.e., the first sun gear S1, first ring gear R1 and carrier CA1 in this order of description as viewed in the direction from the left toward the right in the collinear chart of FIG. 3. The distances between the adjacent ones of the vertical straight lines are determined by the gear ratio $\rho_1$ of the first planetary gear set 18. Five vertical straight lines Y1, Y2, Y3, Y4 and Y5 of the second transmission unit 30 respectively represent: a first rotary element RE1 consisting of the second and fourth sun gears S2, S4 that are connected to each other; a second rotary element RE2 consisting of the third ring gear R3; a third rotary element RE3 consisting of the second ring gear R2 and the third and fourth carriers CA3, CA4 that are connected to each other; a fourth rotary element RE4 consisting of the third sun gear S3 and the fourth ring gear R4 that are connected to each other; and a fifth rotary element RE5 consisting of the second carrier CA2. The distances between the adjacent ones of the vertical straight lines Y1–Y5 are determined by the gear ratios $\rho_2$, $\rho_3$ and $\rho_4$ of the three planetary gear sets 20, 22, 24.

In the collinear chart of FIG. 3, a ratio of the distance between the straight lines respectively representative of the carrier and the ring gear, to the distance between the straight lines respectively representative of the carrier and the sun gear corresponds to the gear ratio of the corresponding planetary gear set. That is, in the three straight lines of the first transmission unit 28, a ratio of the distance (which is set to be 1.0) between the straight lines respectively representative of CA1 and R1, to the distance between the straight lines respectively representative of CA1 and S1 corresponds to the gear ratio $\rho_1$ (=0.450) of the first planetary gear set 18. In the five straight lines of the second transmission unit 30 (in which the distance between the straight lines Y4, Y5 is set to be 1.0), for example, a ratio of the distance between the straight lines Y3, Y5 respectively representative of R2 (RE3) and CA2 (RE5), to the distance between the straight lines Y1, Y5 respectively representative of S2 (RE1) and CA2 (RE5) corresponds to the gear ratio $\rho_2$ (=0.532) of the second planetary gear set 20. Each of the first, second, third, fourth and fifth rotary elements RE1–RE5 is constituted by at least one of the second sun gear S2, carrier CA2 and ring gear R2 (of the second planetary gear set 20), the third sun gear S3, carrier CA3 and ring gear R3 (of the third planetary gear set 22) and the fourth sun gear S4, carrier CA4 and ring gear R4 (of the fourth planetary gear set 24), and rotational speeds of the first rotary elements RE1–RE5 are represented by the five vertical straight lines Y1–Y5 of the collinear chart, which lines are arranged in a direction away from one of opposite ends of the collinear chart toward the other end, i.e., in the direction from the left toward the right. That is, the second rotary element RE2 is rotatable at a rotational speed intermediate between those of the first and third rotary elements RE1, RE3. The third rotary element RE3 is rotatable at a rotational speed intermediate between those of the second and fourth rotary elements RE2, RE4. The fourth rotary element RE4 is rotatable at a rotational speed intermediate between those of the third and fifth rotary elements RE3, RE5.

In the first transmission unit 28 of the transmission 10 of the present embodiment, the first carrier CA1 (which is one of the three rotary elements of the first planetary gear set 18) is connected to the input shaft 16 and the first intermediate transmitting path M1. The first sun gear S1 (which is another of the three rotary elements) is fixed to the transmission casing 12 so as to be unrotatable. The first ring gear R1 (which is still another of the three rotary elements) is connected to the second intermediate transmitting path M2. Thus, the first transmission unit 28 is capable of transmitting a rotary motion from the input shaft 16 to the second transmission unit 30 through the first and second intermediate transmitting paths M1, M2, such that a speed of the rotary motion as transmitted through the second intermediate transmitting path M2 is lower than a speed of the rotary motion as transmitted through the first intermediate transmitting path M1. In the second transmission unit 30, the first rotary element RE1 (S2, S4) is selectively connected to the second intermediate transmitting path M2 through the second clutch C2, while being selectively connected to the transmission casing 12 through the first brake B1. The second rotary element RE2 (R3) is selectively connected to the first intermediate transmitting path M1 through the third clutch C3. The third rotary element RE3 (R2, CA3, CA4) is selectively connected to the first intermediate transmitting path M1 through the fourth clutch C4, while being selectively connected to the transmission casing 12 through the second brake B2. The fourth rotary element RE4 (S3, R4) is connected to the output gear 26. The fifth rotary element RE5 (CA2) is selectively connected to the second intermediate transmitting path M2 through the first clutch C1.

Referring to the collinear chart of FIG. 3, there will be described the rotational speeds of the output gear 26 when the first-speed through seventh-speed positions are established.

In the first-speed position, the first clutch C1 is engaged to connect the fifth rotary element RE5 to the second intermediate transmitting path M2 (ring gear R1) so that the fifth rotary element RE5 is rotated at a speed "$N_G$" which is lower than the speed of the rotary motion as transmitted through the first intermediate transmitting path M1, while at the same time the second brake B2 is engaged to connect the third rotary element RE3 to the transmission casing 12 so that the rotational speed of the third rotary element RE3 is "0". In the first-speed position, therefore, the rotational speed of the output gear 26 (sun gear S3, ring gear R4) is represented by a point of intersection (indicated at "1st") between the vertical straight line Y4 and a straight line which passes a point of intersection between the vertical straight line Y5 and the horizontal straight line XG and a point of intersection between the vertical straight line Y3 and the horizontal straight line X1.

In the second-speed position, the first clutch C1 is engaged to connect the fifth rotary element RE5 to the second intermediate transmitting path M2 so that the fifth rotary element RE5 is rotated at the speed "$N_G$", while at the same time the first brake B1 is engaged to connect the first rotary element RE1 to the transmission casing 12 so that the rotational speed of the first rotary element RE1 is "0". Therefore, the rotational speed of the output gear 26 in the second-speed position, which is one step higher than that in the first-speed position, is represented by a point of intersection (indicated at "2nd") between the vertical straight line Y4 and a straight line which passes the point of intersection between the vertical straight line Y5 and the horizontal straight line XG and a point of intersection between the vertical straight line Y1 and the horizontal straight line X1.

In the third-speed position, the first clutch C1 is engaged to connect the fifth rotary element RE5 to the second intermediate transmitting path M2 so that the fifth rotary element RE5 is rotated at the speed "$N_G$", while at the same time the second clutch C2 is engaged to connect the first rotary element RE1 to the second intermediate transmitting path M2 so that the first rotary element RE1 is rotated at the speed "$N_G$", too. Therefore, the rotational speed of the output gear 26 in the third-speed position, which is one step higher than that in the second-speed position, is represented by a point of intersection (indicated at "3rd") between the vertical straight line Y4 and a straight line which passes the point of intersection between the vertical straight line Y5 and the horizontal straight line XG and a point of intersection between the vertical straight line Y1 and the horizontal straight line XG.

In the fourth-speed position, the first clutch C1 is engaged to connect the fifth rotary element RE5 to the second intermediate transmitting path M2 so that the fifth rotary element RE5 is rotated at the speed "$N_G$", while at the same time the third clutch C3 is engaged to connect the second rotary element RE2 to the first intermediate transmitting path M1 so that the second rotary element RE2 is rotated at the speed "1.0". Therefore, the rotational speed of the output gear 26 in the fourth-speed position, which is one step higher than that in the third-speed position, is represented by a point of intersection (indicated at "4th") between the vertical straight line Y4 and a straight line which passes the point of intersection between the vertical straight line Y5 and the horizontal straight line XG and a point of intersection between the vertical straight line Y2 and the horizontal straight line X2.

In the fifth-speed position, the third clutch C3 is engaged to connect the second rotary element RE2 to the first intermediate transmitting path M1 so that the second rotary element RE2 is rotated at the speed "1.0", while at the same time the fourth clutch C4 is engaged to connect the third rotary element RE3 to the first intermediate transmitting path M1 so that the third rotary element RE3 is rotated at the speed "1.0", too. Therefore, the rotational speed of the output gear 26 in the fifth-speed position, which is one step higher than that in the fourth-speed position, is represented by a point of intersection (indicated at "5th") between the vertical straight line Y4 and a straight line which passes the point of intersection between the vertical straight line Y2 and the horizontal straight line X2 and a point of intersection between the vertical straight line Y3 and the horizontal straight line X2.

In the sixth-speed position, the second clutch C2 is engaged to connect the first rotary element RE1 to the second intermediate transmitting path M2 so that the first rotary element RE1 is rotated at the speed "$N_G$", while at the same time the fourth clutch C4 is engaged to connect the third rotary element RE3 to the first intermediate transmitting path M1 so that the third rotary element RE3 is rotated at the speed "1.0". Therefore, the rotational speed of the output gear 26 in the sixth-speed position, which is one step higher than that in the fifth-speed position, is represented by a point of intersection (indicated at "6th") between the vertical straight line Y4 and a straight line which passes the point of intersection between the vertical straight line Y1 and the horizontal straight line XG and the point of intersection between the vertical straight line Y3 and the horizontal straight line X2.

In the seventh-speed position, the fourth clutch C4 is engaged to connect the third rotary element RE3 to the first intermediate transmitting path M1 so that the third rotary element RE3 is rotated at the speed "1.0", while at the same time the first brake B1 is engaged to connect the first rotary element RE1 to the transmission casing 12 so that the rotational speed of the first rotary element RE1 is "0". Therefore, the rotational speed of the output gear 26 in the seventh-speed position, which is one step higher than that in the sixth-speed position, is represented by a point of intersection (indicated at "7th") between the vertical straight line Y4 and a straight line which passes the point of intersection between the vertical straight line Y3 and the horizontal straight line X2 and the point of intersection between the vertical straight line Y1 and the horizontal straight line X1.

In the eighth-speed position, the third clutch C3 is engaged to connect the second rotary element RE2 to the first intermediate transmitting path M1 so that the second rotary element RE2 is rotated at the speed "1.0", while at the same time the first brake B1 is engaged to connect the first rotary element RE1 to the transmission casing 12 so that the rotational speed of the first rotary element RE1 is "0". Therefore, the rotational speed of the output gear 26 in the eighth-speed position, which is one step higher than that in the seventh-speed position, is represented by a point of intersection (indicated at "8th") between the vertical straight line Y4 and a straight line which passes the point of intersection between the vertical straight line Y2 and the horizontal straight line X2 and the point of intersection between the vertical straight line Y1 and the horizontal straight line X1.

In the rear drive position, the second clutch C2 is engaged to connect the first rotary element RE1 to the second intermediate transmitting path M2 so that the first rotary element RE1 is rotated at the speed "$N_G$", while at the same time the second brake B2 is engaged to connect the third rotary element RE3 to the transmission casing 12 so that the rotational speed of the third rotary element RE3 is "0". Therefore, the rotational speed of the output gear 26 in the reverse direction is represented by a point of intersection (indicated at "Rev") between the vertical straight line Y4 and a straight line which passes the point of intersection between the vertical straight line Y1 and the horizontal straight line XG and the point of intersection between the vertical straight line Y3 and the horizontal straight line X1.

As is clear from the foregoing description, owing to the arrangement of the four planetary gear sets 18, 20, 22, 24, the transmission 10 according to the present embodiment can be made in compact and is capable of establishing at least seven forward drive positions with relatively width range of speed ratio and appropriate ratio steps between adjacent drive positions. That is, the speed ratios γ of the respective drive positions change substantially in geometric progression, thereby assuring excellent vehicle accelerating characteristics upon shift-up action of the transmission 10. Further, since the ratio spread, i.e., the ratio step ($\gamma_1/\gamma_8$) is as high as 6.745, the transmission has a wide range of gear ratio, permitting not only high-speed running of the vehicle but also stable starting of the vehicle on an uphill road.

Further, the transmission 10 according to the present embodiment is capable of establishing, in addition to the forward drive positions, the rear drive position which is established by the simultaneous engaging actions of the second clutch C2 and the second brake B2.

Further, in the transmission 10 of the present embodiment, the first, second, third and fourth planetary gear sets 18, 20, 22, 24 are disposed in this order of description between the input shaft 16 and the output shaft 24, and an output of the engine 8 is applied to the input shaft 16 of the transmission 10 through the torque converter 14 equipped with the lock-up clutch 13, so that the automatic transmission 10 has a compact arrangement.

Still further, in the transmission 10 of the present embodiment, the first, second, third and fourth clutches C1–C4 are disposed in a portion of the second transmission unit 30, which portion is close to the first transmission unit 28, while the first and second brakes B1, B2 are disposed on the transmission casing 12, that is, in a radially outer portion of the transmission 10. This arrangement facilitates connections of fluid passages to the clutches and brakes C1–C4 and B1, B2.

There will be described other embodiments of this invention. The same reference signs as used in the above-described first embodiment of FIGS. 1–3 will be used in the following embodiments, to identify the functionally corresponding elements.

Figures 4, 5:
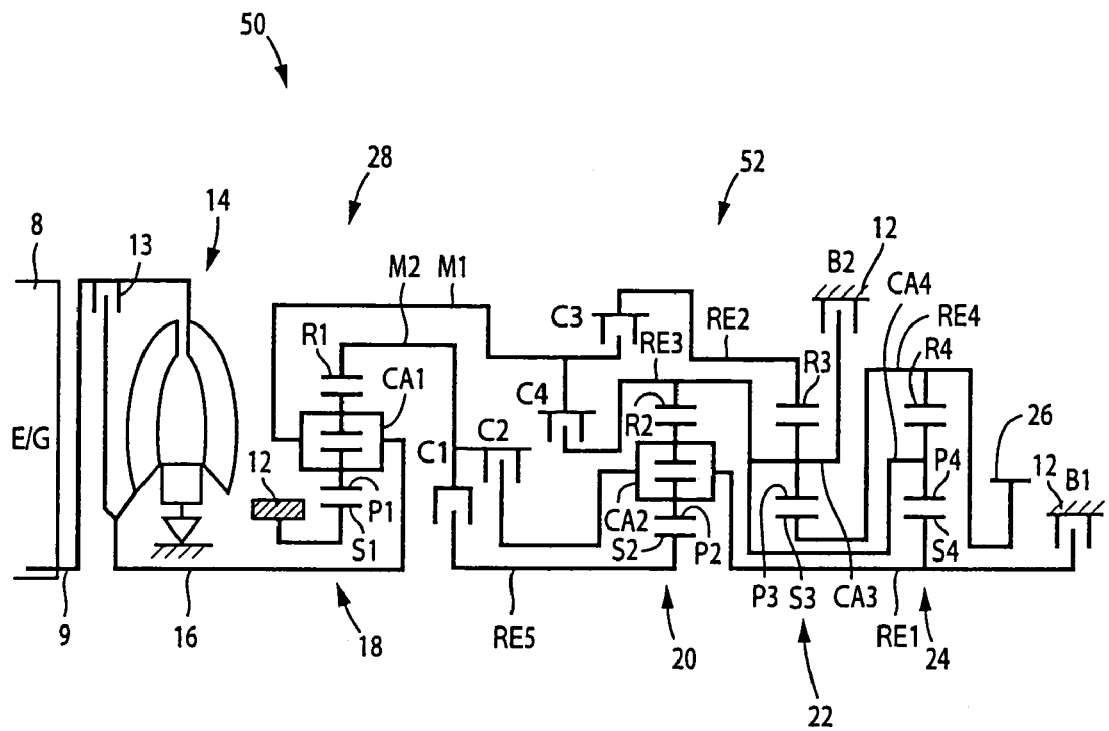
FIG. 4 is a schematic view corresponding to that of FIG. 1, illustrating a basic arrangement of a vehicle planetary-gear-type multiple-step transmission according to a second embodiment of the present invention.
FIG. 5 is a table corresponding to that of FIG. 2, indicating a relationship between operating positions of the multiple-step transmission of FIG. 4 and combinations of operating states of hydraulically operated frictional coupling devices to establish the respective operating positions.
Figure 6:
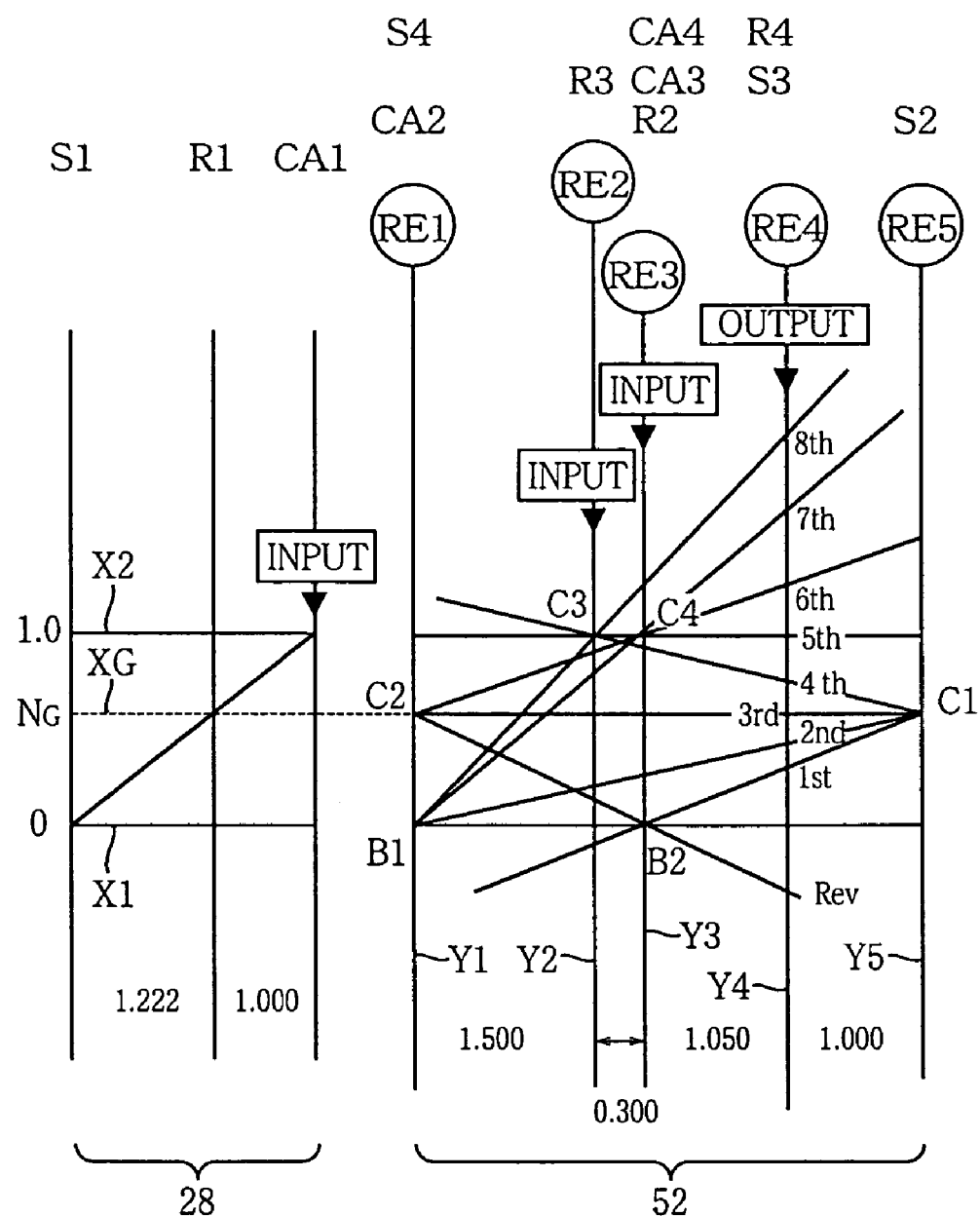
FIG. 6 is a collinear chart corresponding to that of FIG. 3, showing relative rotational speeds of a plurality of rotary elements incorporated in the multiple-step transmission of FIG. 4.

FIG. 4 is a schematic view illustrating a basic arrangement of a transmission 50 constructed according to a second embodiment of the present invention. FIG. 5 is a table indicating a relationship between operating positions of the transmission 50 and combinations of operating states of hydraulically operated frictional coupling devices to establish the respective operating positions. FIG. 6 is a collinear chart showing relative rotational speeds of a plurality of rotary elements incorporated in the multiple-step transmission 50. The transmission 50 is identical with the above-described transmission 10 of the first embodiment of FIGS. 1–3, except for construction of its second transmission unit 52, and provides substantially the same advantages as the transmission 10.

In this second embodiment, the second planetary gear set 20 of the second transmitting unit 30 is of double-pinion type, while the third and fourth planetary gear sets 22, 24 are of single-pinion type. The second planetary gear set 20 includes a second sun gear S2, plural pairs of second planetary gears P2 (each pair of gears P2 mesh with each other), a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.468. The third planetary gear set 22 includes a third sun gear S3, a plurality of third planetary gears P3, a third carrier. CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.286. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.583.

In the second transmission unit 52, the second carrier CA2 and the fourth sun gears S4 integrally connected to each other are selectively connected to the second intermediate transmitting path M2 (which is in turn connected to the first ring gear R1 or corresponds to the first ring gear R1 per se) through a second clutch C2, while being selectively connected to the transmission casing 12 as the stationary member through a first brake B1. The third ring gear R3 is selectively connected to the first intermediate transmitting path M1 through a third clutch C3. The second ring gear R2, the third carrier CA3 and the fourth carrier CA4 integrally connected to each other are selectively connected to the first intermediate transmitting path M1 through a fourth clutch C4, while being selectively connected to the transmission casing 12 through a second brake B2. The third sun gear S3 and the fourth ring gear R4 integrally connected to each other are connected to the output gear 26 as the output rotary member. The second sun gear S2 is selectively connected to the second intermediate transmitting path M2 through a first clutch C1.

In the transmission 50 constructed as described above, like in the transmission 10 of FIGS. 1–3, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 5 (which is identical with that of FIG. 2). The eight forward drive positions have respective speed ratios $\gamma$ that change in geometric progression. The speed ratio $\gamma$ is equal to $N_{in}/N_{out}$, where $N_{in}$ and $N_{out}$ represent rotational speeds of the input shaft 16 and output gear 26, respectively.

As shown in FIG. 5, the first-speed position having the highest speed ratio $\gamma_1$ of 3.550, for instance, is established by engaging the first clutch C1 and the second brake B2 so as to connect the second sun gear S2 to the first ring gear R1 (via the second intermediate transmitting path M2) and so as to connect the second ring gear R2, third carrier CA3 and fourth carrier CA4 to the transmission casing 12. The second-speed position having the speed ratio $\gamma_2$, for instance, about 2.456, which is lower than that of the first-speed position, is established by engaging the first clutch C1 and the first brake B1 so as to connect the second sun gear S2 to the first ring gear R1 (via the second intermediate transmitting path M2) and so as to connect the second carrier CA2 and fourth sun gear S4 to the transmission casing 12. The third-speed position having the speed ratio $\gamma_3$, for instance, about 1.818, which is lower than that of the second-speed position, is established by engaging the first and second clutches C1, C2 so as to connect the second sun gear S2 to the first ring gear R1 (via the second intermediate transmitting path M2) and so as to connect the second carrier CA2 and fourth sun gear S4 to the first ring gear R1 (via the second intermediate transmitting path M2). The fourth-speed position having the speed ratio $\gamma_4$, for instance, about 1.349, which is lower than that of the third-speed position, is established by engaging the first and third clutches C1, C3 so as to connect the second sun gear S2 to the first ring gear R1 (via the second intermediate transmitting path M2) and so as to connect the third ring gear R3 to the first carrier CA1 (via the first intermediate transmitting path M1). The fifth-speed position having the speed ratio $\gamma_5$, for instance, about 1.000, which is lower than that of the fourth-speed position, is established by engaging the third and fourth clutches C3 and C4 so as to connect the third ring gear R3 to the first carrier CA1 (via the first intermediate transmitting path M1) and so as to connect the second ring gear R2 and third and fourth carriers CA3, CA4 to the first carrier CA1 (via the first intermediate transmitting path M1). The sixth-speed position having the speed ratio $\gamma_6$, for instance, about 0.792, which is lower than that of the fifth-speed position, is established by engaging the second and fourth clutches C2, C4 so as to connect the second carrier CA2 and fourth sun gears S4 to the first ring gear R1 (via the second intermediate transmitting path M2) and so as to connect the second ring gear R2 and third and fourth carriers CA3, CA4 to the first carrier CA1 (via the first intermediate transmitting path M1). The seventh-speed position having the speed ratio $\gamma_7$ of 0.632, for instance, which is lower than that of the sixth-speed position, is established by engaging the fourth clutch C4 and the first brake B1 so as to connect the second ring gear R2 and third and fourth carriers CA3, CA4 to the first carrier CA1 (via the first intermediate transmitting path M1) and so as to connect the second carrier CA2 and fourth sun gear S4 to the transmission casing 12. The eighth-speed position having the lowest speed ratio $\gamma_8$ of 0.526, for instance, which is lower than that of the seventh-speed position, is established by engaging the third clutch C3 and the first brake B1 so as to connect the third ring gear R3 to the first carrier CA1 (via the first intermediate transmitting path M1) and so as to connect the second carrier CA2 and fourth sun gear S4 to the transmission casing 12. The rear drive position having the ratio $\gamma_R$, for instance, 2.597, which is between those of the first-speed and second-speed positions, is established by engaging the second clutch C2 and the second brake B2 so as to connect the second carrier CA2 and fourth sun gear S4 to the first ring gear R1 (via the second intermediate transmitting path M2) and so as to connect the second ring gear R2, third carrier CA3 and fourth carrier CA4 to the transmission casing 12. The gear ratio $\rho_1$ of the first planetary gear set 18, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

As shown in the collinear chart of FIG. 6, the first rotary element RE1 consists of the second carrier CA2 and the fourth sun gear S4, the second rotary element RE2 consists of the third ring gear R3, the third rotary element RE3 consists of the second ring gear R2 and the third and fourth carriers CA3, CA4, the fourth rotary element RE4 consists of the third sun gear S3 and the fourth ring gear R4, and the fifth rotary element RE5 consists of the second sun gear S2. The collinear chart of FIG. 6 is identical with that of FIG. 3, except in that the first rotary element RE1 consists of the second carrier CA2 and the fourth sun gear S4, and in that the fifth rotary element RE5 consists of the second sun gear S2. The foregoing descriptions by reference to FIG. 3 substantially apply to the present second embodiment of FIGS. 4–6.

Figures 7, 8:
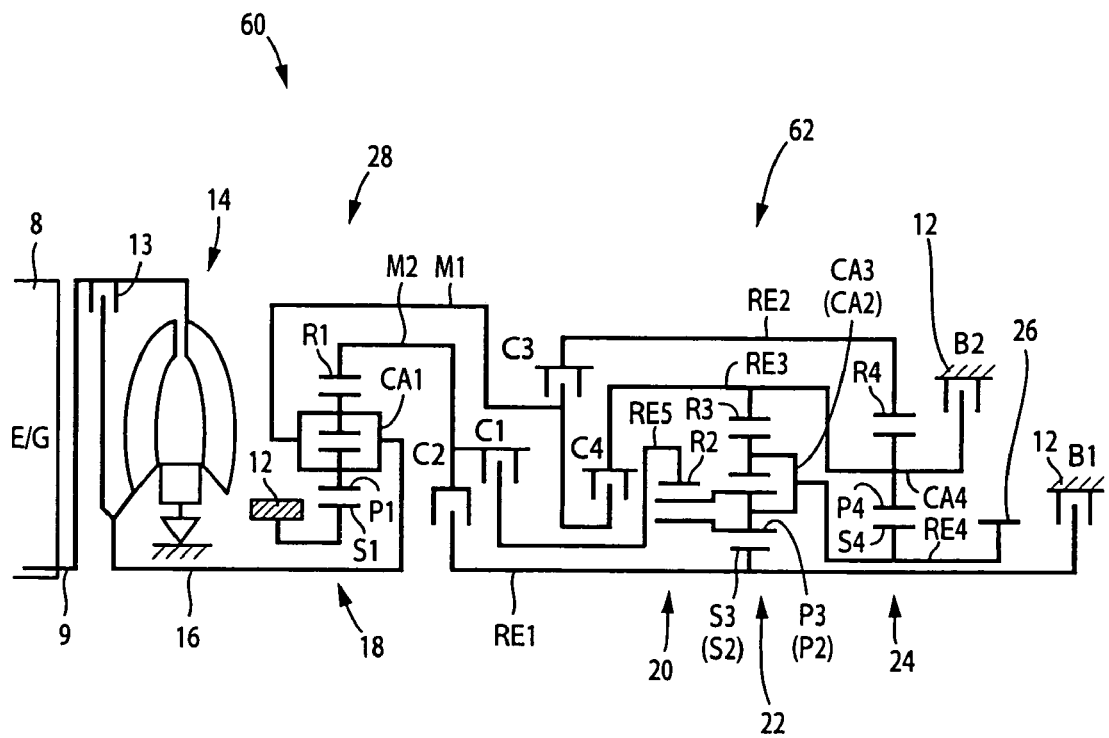
FIG. 7 is a schematic view corresponding to that of FIG. 1, illustrating a basic arrangement of a vehicle planetary-gear-type multiple-step transmission according to a third embodiment of the present invention.
FIG. 8 is a table corresponding to that of FIG. 2, indicating a relationship between operating positions of the multiple-step transmission of FIG. 7 and combinations of operating states of hydraulically operated frictional coupling devices to establish the respective operating positions.
Figure 9:
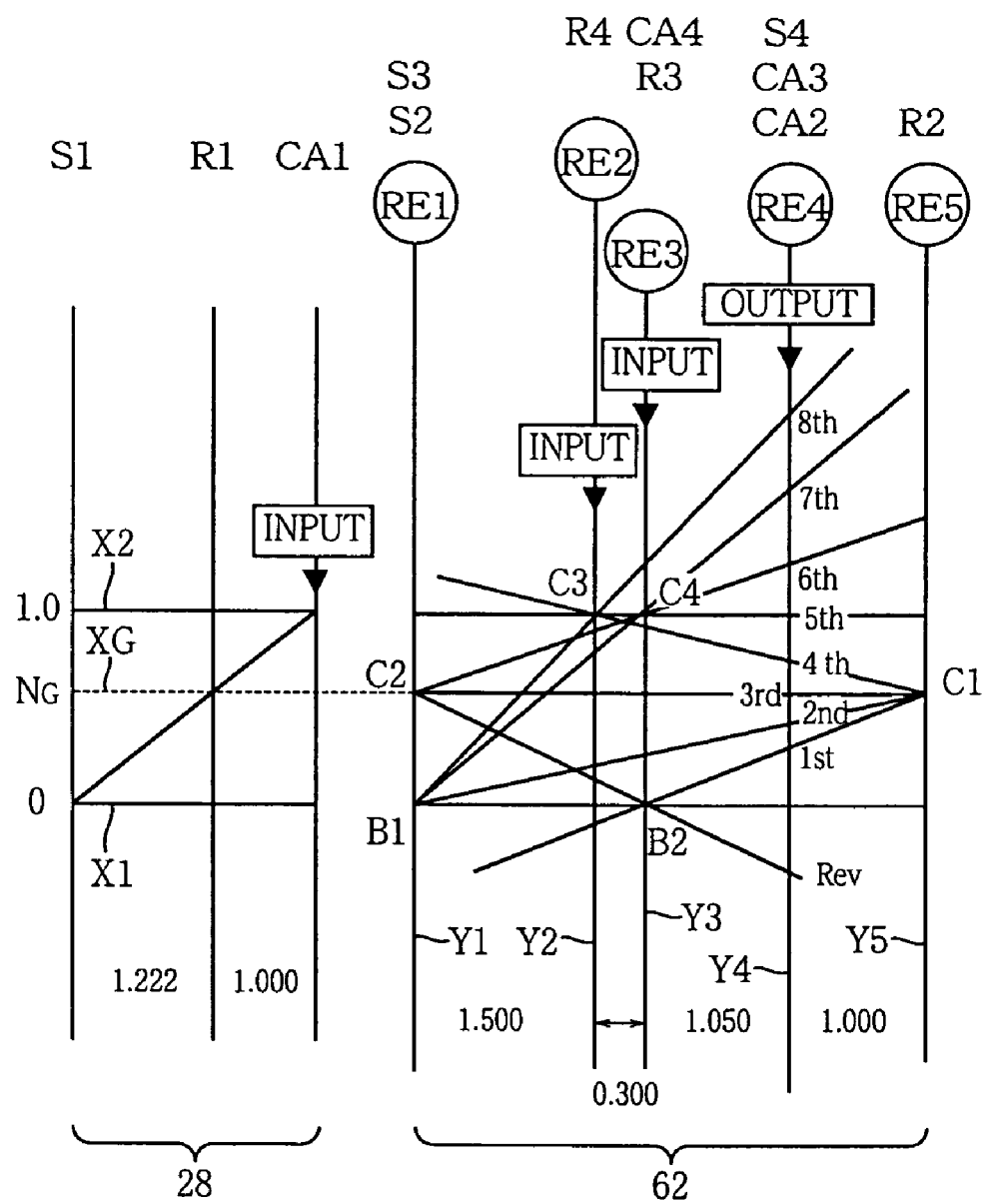
FIG. 9 is a collinear chart corresponding to that of FIG. 3, showing relative rotational speeds of a plurality of rotary elements incorporated in the multiple-step transmission of FIG. 7.

FIG. 7 is a schematic view illustrating a basic arrangement of a transmission 60 constructed according to a third embodiment of the present invention. FIG. 8 is a table indicating a relationship between operating positions of the transmission 60 and combinations of operating states of hydraulically operated frictional coupling devices to establish the respective operating positions. FIG. 9 is a collinear chart showing relative rotational speeds of a plurality of rotary elements incorporated in the multiple-step transmission 60. The transmission 60 is identical with the above-described transmission 10 of the first embodiment of FIGS. 1–3, except for construction of its second transmission unit 62, and provides substantially the same advantages as the transmission 10.

In this third embodiment, the second and fourth planetary gear sets 20, 24 are of single-pinion type, while the third planetary gear set 22 is of double-pinion type. The third planetary gear set 22 includes a third sun gear S3, plural pairs of third planetary gears P3 (each pair of gears P3 mesh with each other), a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.368. The second planetary gear set 20 includes a second sun gear S2 provided by a common sun gear which provides also the third sun gear S3, a plurality of second planetary gears P2 each provided by a common planetary gear which provides also one of the corresponding pair of third planetary gears P3, a second carrier CA2 provided by a common carrier which provides also the third carrier CA3, and a second ring gear R2 meshing with the second sun gear S2 through the second planetary gears P2. The second planetary gear set 20 has a predetermined gear ratio $\rho_2$, for instance, about 0.351. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.286. It is noted that the above-described common planetary gear, which provides each of the second planetary gears P2 and one of the corresponding pair of third planetary gears P3, may include a second planetary gear portion and a third planetary gear portion which are different in diameter or number of teeth. It is also noted that the common sun gear, common planetary gear and common carrier are not essential. That is, the second and third sun gears S2, S3, the second and third carriers CA2, CA3 and the second and third planetary gears P2, P3 may be provided by respective members independent of each other.

In the second transmission unit 62, the second and third sun gears S2, S3 integrally connected to each other are selectively connected to the second intermediate transmitting path M2 (which is in turn connected to the first ring gear R1 or corresponds to the first ring gear R1 per se) through a second clutch C2, while being selectively connected to the transmission casing 12 as the stationary member through a first brake B1. The fourth ring gear R4 is selectively connected to the first intermediate transmitting path M1 through a third clutch C3. The third ring gear R3 and the fourth carrier CA4 integrally connected to each other are selectively connected to the first intermediate transmitting path M1 through a fourth clutch C4, while being selectively connected to the transmission casing 12 through a second brake B2. The second carrier CA2, the third carrier CA3 and the fourth sun gear S4 integrally connected to each other are connected to the output gear 26 as the output rotary member. The second ring gear R2 is selectively connected to the second intermediate transmitting path M2 through a first clutch C1.

In the transmission 60 constructed as described above, like in the transmission 10 of FIGS. 1–3, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 8 (which is identical with that of FIG. 2). The eight forward drive positions have respective speed ratios γ (=rotational speed $N_{in}$ of input shaft/rotational speed $N_{out}$ of output gear) that change in geometric progression.

As shown in FIG. 8, the first-speed position having the highest speed ratio $\gamma_1$ of 3.550, for instance, is established by engaging the first clutch C1 and the second brake B2 so as to connect the second ring gear R2 to the first ring gear R1 (via the second intermediate transmitting path M2) and so as to connect the third ring gear R3 and fourth carrier CA4 to the transmission casing 12. The second-speed position having the speed ratio $\gamma_2$, for instance, about 2.456, which is lower than that of the first-speed position, is established by engaging the first clutch C1 and the first brake B1 so as to connect the second ring gear R2 to the first ring gear R1 (via the second intermediate transmitting path M2) and so as to connect the second and third sun gears S2, S3 to the transmission casing 12. The third-speed position having the speed ratio $\gamma_3$, for instance, about 1.818, which is lower than that of the second-speed position, is established by engaging the first and second clutches C1, C2 so as to connect the second ring gear R2 to the first ring gear R1 (via the second intermediate transmitting path M2) and so as to connect the second and third sun gears S2, S3 to the first ring gear R1 (via the second intermediate transmitting path M2). The fourth-speed position having the speed ratio $\gamma_4$, for instance, about 1.349, which is lower than that of the third-speed position, is established by engaging the first and third clutches C1, C3 so as to connect the second ring gear R2 to the first ring gear R1 (via the second intermediate transmitting path M2) and so as to connect the fourth ring gear R4 to the first carrier CA1 (via the first intermediate transmitting path M1). The fifth-speed position having the speed ratio $\gamma_5$, for instance, about 1.000, which is lower than that of the fourth-speed position, is established by engaging the third and fourth clutches C3 and C4 so as to connect the fourth ring gear R4 to the first carrier CA1 (via the first intermediate transmitting path M1) and so as to connect the third ring gear R3 and fourth carrier CA4 to the first carrier CA1 (via the first intermediate transmitting path M1). The sixth-speed position having the speed ratio $\gamma_6$, for instance, about 0.792, which is lower than that of the fifth-speed position, is established by engaging the second and fourth clutches C2, C4 so as to connect the second and third sun gears S2, S3 to the first ring gear R1 (via the second intermediate transmitting path M2) and so as to connect the third ring gear R3 and fourth carrier CA4 to the first carrier CA1 (via the first intermediate transmitting path M1). The seventh-speed position having the speed ratio $\gamma_7$ of 0.632, for instance, which is lower than that of the sixth-speed position, is established by engaging the fourth clutch C4 and the first brake B1 so as to connect the third ring gear R3 and fourth carrier CA4 to the first carrier CA1 (via the first intermediate transmitting path M1) and so as to connect the second and third sun gears S2, S3 to the transmission casing 12. The eighth-speed position having the lowest speed ratio $\gamma_8$ of 0.526, for instance, which is lower than that of the seventh-speed position, is established by engaging the third clutch C3 and the first brake B1 so as to connect the fourth ring gear R4 to the first carrier CA1 (via the first intermediate transmitting path M1) and so as to connect the second and third sun gears S2, S3 to the transmission casing 12. The rear drive position having the ratio $\gamma_R$, for instance, 2.597, which is between those of the first-speed and second-speed positions, is established by engaging the second clutch C2 and the second brake B2 so as to connect the second and third sun gears S2, S3 to the first ring gear R1 (via the second intermediate transmitting path M2) and so as to connect the third ring gear R3 and fourth carrier CA4 to the transmission casing 12. The gear ratio $\rho_1$ of the first planetary gear set 18, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

As shown in the collinear chart of FIG. 9, the first rotary element RE1 consists of the second and third sun gears S2, S3, the second rotary element RE2 consists of the fourth ring gear R4, the third rotary element RE3 consists of the third ring gear R3 and fourth carrier CA4, the fourth rotary element RE4 consists of the second and third carriers CA2, CA3 and fourth sun gear S4, and the fifth rotary element RE5 consists of the second ring gear R2. The collinear chart of FIG. 9 is identical with that of FIG. 3, except for the components of each of the rotary elements. The foregoing descriptions by reference to FIG. 3 substantially apply to the present third embodiment of FIGS. 7–9.

As is clear from the foregoing description, the transmission 60 of the present third embodiment provides substantially the same advantages as the transmission 10 of FIGS. 1–3, and can be constructed with further reduced number of components and axial length, owing to the arrangement in which the second and third sun gears S2, S3 and the second and third carriers CA2, CA3 are provided by the common sun gear and the common carrier, respectively.

Figures 10, 11:
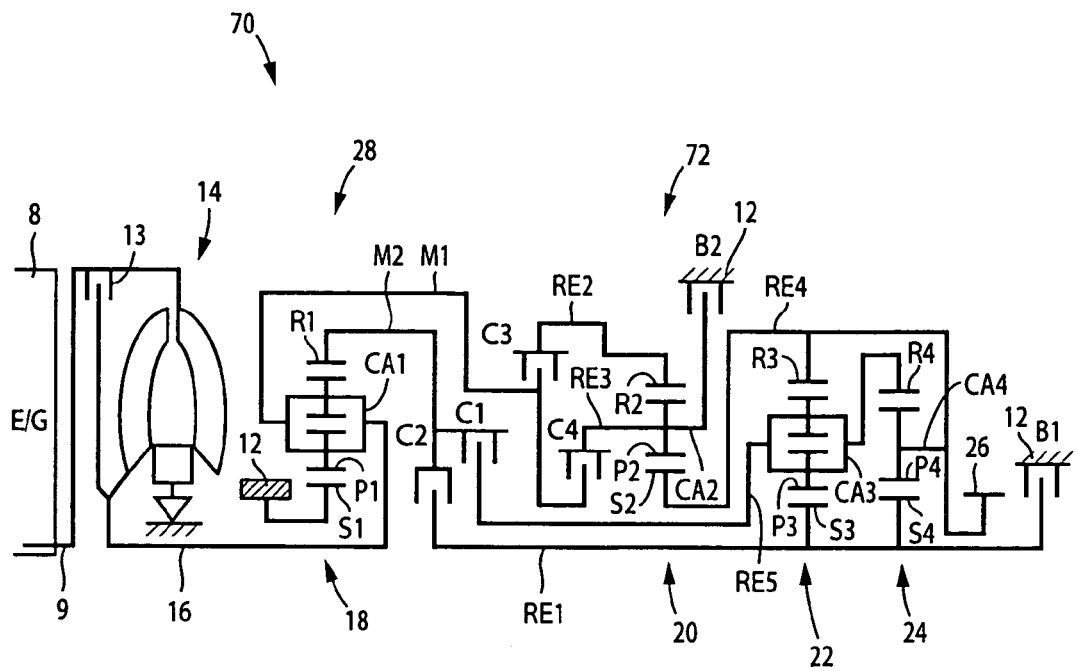
FIG. 10 is a schematic view corresponding to that of FIG. 1, illustrating a basic arrangement of a vehicle planetary-gear-type multiple-step transmission according to a fourth embodiment of the present invention.
FIG. 11 is a table corresponding to that of FIG. 2, indicating a relationship between operating positions of the multiple-step transmission of FIG. 10 and combinations of operating states of hydraulically operated frictional coupling devices to establish the respective operating positions.
Figure 12:
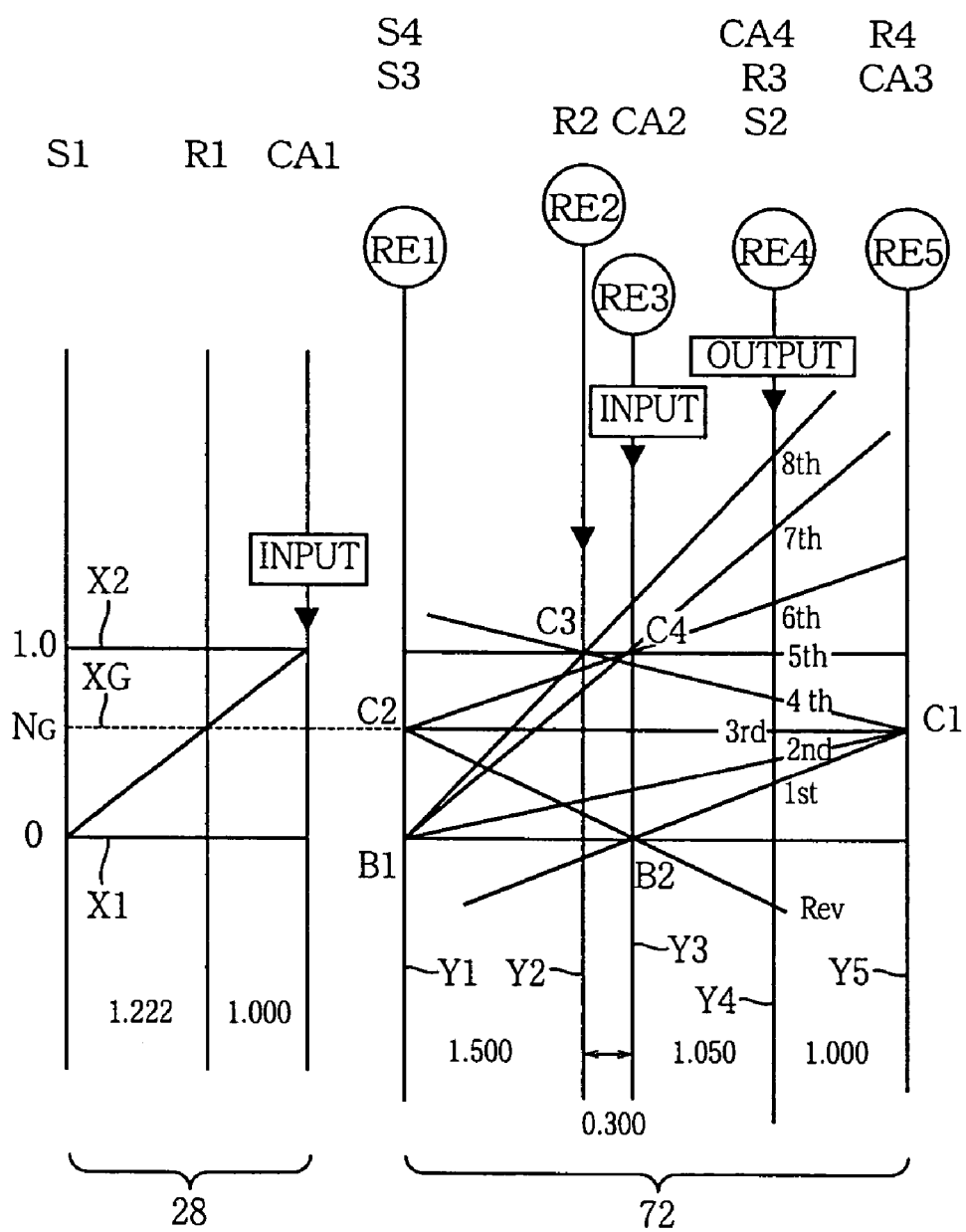
FIG. 12 is a collinear chart corresponding to that of FIG. 3, showing relative rotational speeds of a plurality of rotary elements incorporated in the multiple-step transmission of FIG. 10.

FIG. 10 is a schematic view illustrating a basic arrangement of a transmission 70 constructed according to a fourth embodiment of the present invention. FIG. 11 is a table indicating a relationship between operating positions of the transmission 70 and combinations of operating states of hydraulically operated frictional coupling devices to establish the respective operating positions. FIG. 12 is a collinear chart showing relative rotational speeds of a plurality of rotary elements incorporated in the multiple-step transmission 70. The transmission 70 is identical with the above-described transmission 70 of the first embodiment of FIGS. 1–3, except for construction of its second transmission unit 72, and provides substantially the same advantages as the transmission 10.

In this fourth embodiment, the second and fourth planetary gear sets 20, 24 are of single-pinion type, while the third planetary gear set 22 is of double-pinion type. The second planetary gear set 20 includes a second sun gear S2, a plurality of second planetary gears P2, a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.286. The third planetary gear set 22 includes a third sun gear S3, plural pairs of third planetary gears P3 (each pair of gears P3 mesh with each other), a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.260. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.351.

In the second transmission unit 72, the third and fourth sun gears S3, S4 integrally connected to each other are selectively connected to the second intermediate transmitting path M2 (which is in turn connected to the first ring gear R1 or corresponds to the first ring gear R1 per se) through a second clutch C2, while being selectively connected to the transmission casing 12 as the stationary member through a first brake B1. The second ring gear R2 is selectively connected to the first intermediate transmitting path M1 through a third clutch C3. The second carrier CA2 is selectively connected to the first intermediate transmitting path M1 through a fourth clutch C4, while being selectively connected to the transmission casing 12 through a second brake B2. The second sun gear S2, the third ring gear R3 and the fourth carrier CA4 integrally connected to each other are connected to the output gear 26 as the output rotary member. The third carrier CA3 and the fourth ring gear R4 integrally connected to each other are selectively connected to the second intermediate transmitting path M2 through a first clutch C1.

In the transmission 70 constructed as described above, like in the transmission 10 of FIGS. 1–3, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 11 (which is identical with that of FIG. 2). The eight forward drive positions have respective speed ratios γ (=rotational speed $N_{in}$ of input shaft/rotational speed $N_{out}$ of output gear) that change in geometric progression.

As shown in FIG. 11, the first-speed position having the highest speed ratio $\gamma_1$ of 3.550, for instance, is established by engaging the first clutch C1 and the second brake B2 so as to connect the third ring gear CA3 and fourth ring gear R4 to the first ring gear R1 (via the second intermediate transmitting path M2) and so as to connect the second carrier CA2 to the transmission casing 12. The second-speed position having the speed ratio $\gamma_2$, for instance, about 2.456, which is lower than that of the first-speed position, is established by engaging the first clutch C1 and the first brake B1 so as to connect the third carrier CA3 and fourth ring gear R4 to the first ring gear R1 (via the second intermediate transmitting path M2) and so as to connect the third and fourth sun gears S3, S4 to the transmission casing 12. The third-speed position having the speed ratio $\gamma_3$, for instance, about 1.818, which is lower than that of the second-speed position, is established by engaging the first and second clutches C1, C2 so as to connect the third carrier CA3 and fourth ring gear R4 to the first ring gear R1 (via the second intermediate transmitting path M2) and so as to connect the third and fourth sun gears S3, S4 to the first ring gear R1 (via the second intermediate transmitting path M2). The fourth-speed position having the speed ratio $\gamma_4$, for instance, about 1.349, which is lower than that of the third-speed position, is established by engaging the first and third clutches C1, C3 so as to connect the third carrier CA3 and fourth ring gear R4 to the first ring gear R1 (via the second intermediate transmitting path M2) and so as to connect the second ring gear R2 to the first carrier CA1 (via the first intermediate transmitting path M1). The fifth-speed position having the speed ratio $\gamma_5$, for instance, about 1.000, which is lower than that of the fourth-speed position, is established by engaging the third and fourth clutches C3 and C4 so as to connect the second ring gear R2 to the first carrier CA1 (via the first intermediate transmitting path M1) and so as to connect the second carrier CA2 to the first carrier CA1 (via the first intermediate transmitting path M1). The sixth-speed position having the speed ratio $\gamma_6$, for instance, about 0.792, which is lower than that of the fifth-speed position, is established by engaging the second and fourth clutches C2, C4 so as to connect the third and fourth sun gears S3, S4 to the first ring gear R1 (via the second intermediate transmitting path M2) and so as to connect the second carrier CA2 to the first carrier CA1 (via the first intermediate transmitting path M1). The seventh-speed position having the speed ratio $\gamma_7$ of 0.632, for instance, which is lower than that of the sixth-speed position, is established by engaging the fourth clutch C4 and the first brake B1 so as to connect the second carrier CA2 to the first carrier CA1 (via the first intermediate transmitting path M1) and so as to connect the third and fourth sun gears S3, S4 to the transmission casing 12. The eighth-speed position having the lowest speed ratio $\gamma_8$ of 0.526, for instance, which is lower than that of the seventh-speed position, is established by engaging the third clutch C3 and the first brake B1 so as to connect the second ring gear R2 to the first carrier CA1 (via the first intermediate transmitting path M1) and so as to connect the third and fourth sun gears S3, S4 to the transmission casing 12. The rear drive position having the ratio $\gamma_R$, for instance, 2.597, which is between those of the first-speed and second-speed positions, is established by engaging the second clutch C2 and the second brake B2 so as to connect the third and fourth sun gears S3, S4 to the first ring gear R1 (via the second intermediate transmitting path M2) and so as to connect the second carrier CA2 to the transmission casing 12. The gear ratio $\rho_1$ of the first planetary gear set 18, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

As shown in the collinear chart of FIG. 12, the first rotary element RE1 consists of the third and fourth sun gears S3, S4, the second rotary element RE2 consists of the second ring gear R2, the third rotary element RE3 consists of the second carrier CA2, the fourth rotary element RE4 consists of the second sun gear S2, third ring gear R3 and fourth carrier CA4, and the fifth rotary element RE5 consists of the third carrier CA3 and fourth ring gear R4. The collinear chart of FIG. 12 is identical with that of FIG. 3, except for the components of each of the rotary elements. The foregoing descriptions by reference to FIG. 3 substantially apply to the present fourth embodiment of FIGS. 10–12.

Figures 13, 14:
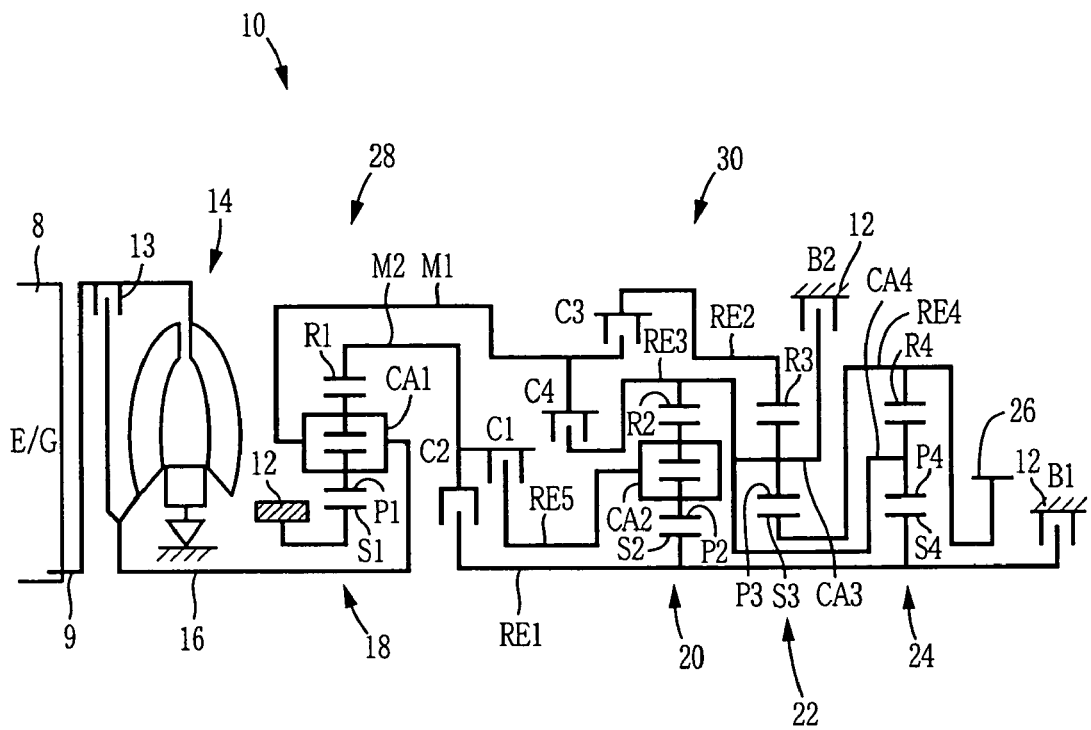
FIG. 13 is a schematic view corresponding to that of FIG. 1, illustrating a basic arrangement of a vehicle planetary-gear-type multiple-step transmission according to a fifth embodiment of the present invention.
FIG. 14 is a table corresponding to that of FIG. 2, indicating a relationship between operating positions of the multiple-step transmission of FIG. 13 and combinations of operating states of hydraulically operated frictional coupling devices to establish the respective operating positions.
Figure 15:
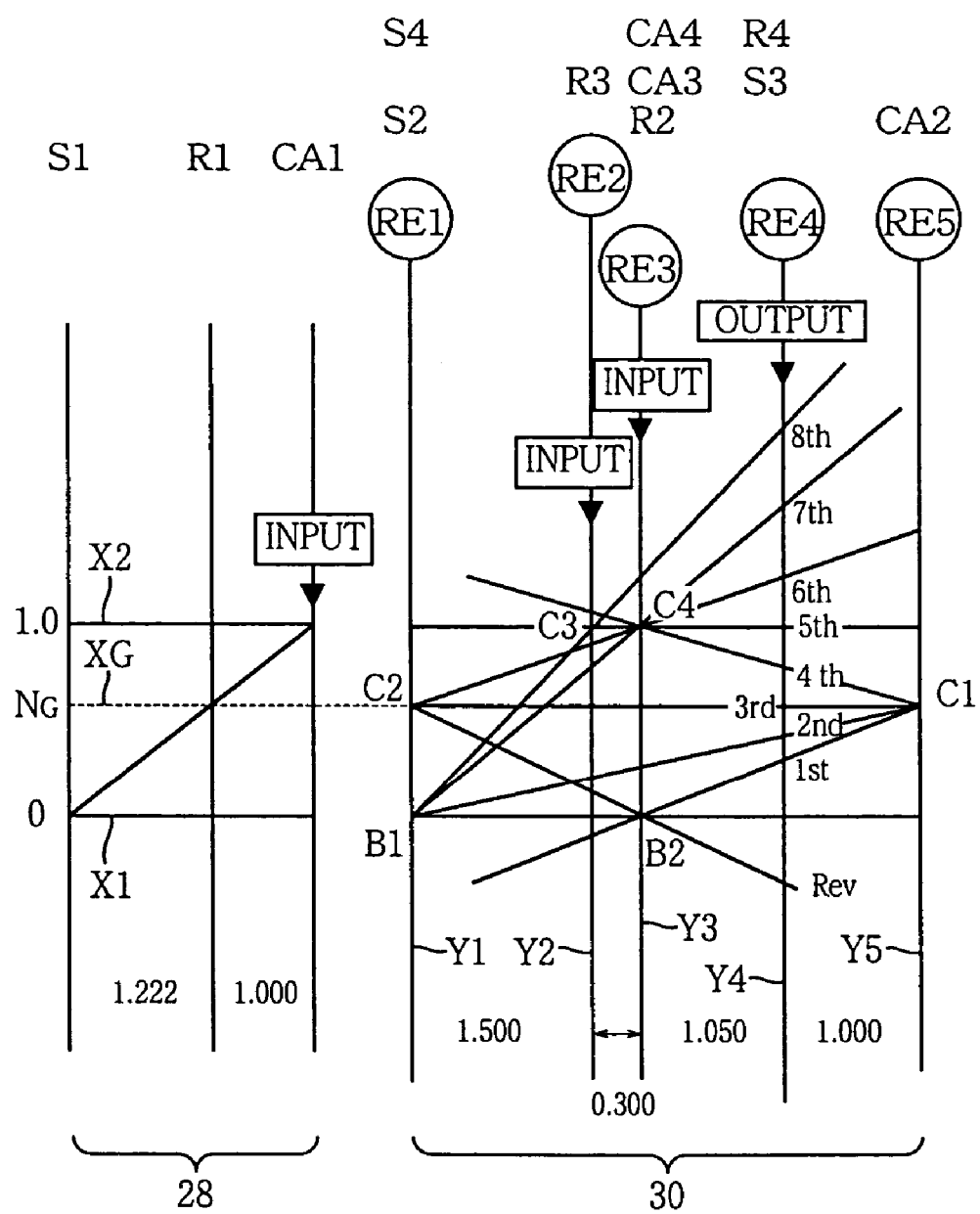
FIG. 15 is a collinear chart corresponding to that of FIG. 3, showing relative rotational speeds of a plurality of rotary elements incorporated in the multiple-step transmission of FIG. 13.

FIG. 13 is a schematic view illustrating a basic arrangement of the transmission 10 according to a fifth embodiment of the present invention. FIG. 14 is a table indicating a relationship between operating positions of the transmission 10 and combinations of operating states of hydraulically operated frictional coupling devices to establish the respective operating positions. FIG. 15 is a collinear chart showing relative rotational speeds of a plurality of rotary elements incorporated in the multiple-step transmission 10. The arrangement in this fifth embodiment is identical with that in the first embodiment of FIGS. 1–3, except in that the combination of the frictional coupling devices used to establish the fourth-speed position is different from that in the first embodiment, and in that the speed ratio of the fourth-speed position is different from that in the first embodiment. The arrangement in the fifth embodiment provides substantially the same advantages as that in the first embodiment.

In the first embodiment of FIGS. 1–3, the fourth-speed position having the speed ratio $\gamma_4$, for instance, about 1.349, which is lower than that of the third-speed position, is established by engaging the first and third clutches C1, C3 so as to connect the second carrier CA2 to the first ring gear R1 (via the second intermediate transmitting path M2) and so as to connect the third ring gear R3 to the first carrier CA1 (via the first intermediate transmitting path M1). In the present fifth embodiment of FIGS. 13–15, on the other hand, the fourth-speed position having the speed ratio $\gamma_4$, for instance, about 1.300 is established by engaging the first and fourth clutches C1, C4 (as shown in FIG. 14) so as to connect the second carrier CA2 to the first ring gear R1 (via the second intermediate transmitting path M2) and so as to connect the second ring gear R2, third carrier CA3 and fourth carrier CA4 to the first carrier CA1 (via the first intermediate transmitting path M1). A ratio step ($\gamma_3/\gamma_4$) between the speed ratio $\gamma_3$ of the third-speed position and the speed ratio $\gamma_4$ of the fourth-speed position is 1.399 in the present fifth embodiment, while that is 1.348 in the first embodiment of FIGS. 1–3. A ratio step ($\gamma_4/\gamma_5$) between the speed ratio $\gamma_4$ of the fourth-speed position and the speed ratio $\gamma_5$ of the fifth-speed position is 1.300 in the present fifth embodiment, while that is 1.349 in the first embodiment.

In the first embodiment of FIGS. 1–3, for establishing the fourth-speed position, the first clutch C1 is engaged to connect the fifth rotary element RE5 to the second intermediate transmitting path M2 so that the fifth rotary element RE5 is rotated at the speed. "$N_G$", while at the same time the third clutch C3 is engaged to connect the second rotary element RE2 to the first intermediate transmitting path M1 so that the second rotary element RE2 is rotated at the speed "1.0". The rotational speed of the output gear 26 in the fourth-speed position, which is one step higher than that in the third-speed position, is represented by the point of intersection (4th) between the vertical straight line Y4 and the straight line which passes the point of intersection between the vertical straight line Y5 and the horizontal straight line XG and the point of intersection between the vertical straight line Y2 and the horizontal straight line X2, as shown in the collinear chart of FIG. 3. In the present fifth embodiment of FIGS. 13–15, on the other hand, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the fourth clutch C4 is engaged to connect the third rotary element RE3 to the first intermediate transmitting path M1 so that the third rotary element RE3 is rotated at the speed "1.0". The rotational speed of the output gear 26 in the fourth-speed position is represented by the point of intersection (4th) between the vertical straight line Y4 and a straight line which passes a point of intersection between the vertical straight line Y5 and the horizontal straight line XG and a point of intersection between the vertical straight line Y3 and the horizontal straight line X2.

Figures 16, 17:
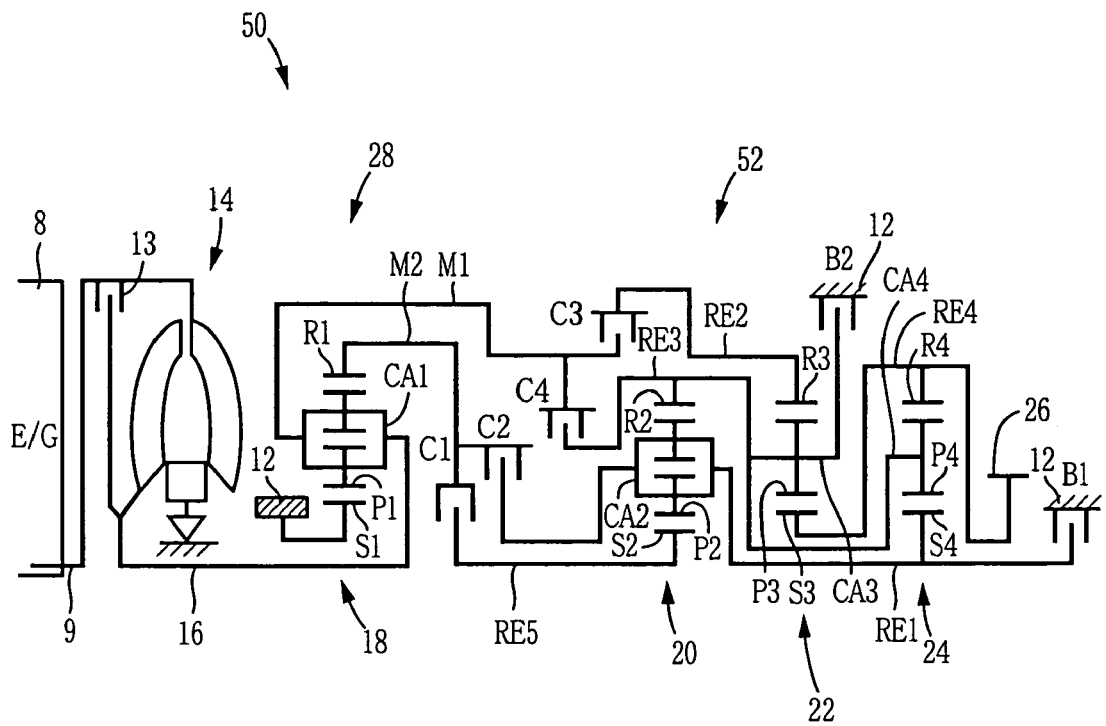
FIG. 16 is a schematic view corresponding to that of FIG. 4, illustrating a basic arrangement of a vehicle planetary-gear-type multiple-step transmission according to a sixth embodiment of the present invention.
FIG. 17 is a table corresponding to that of FIG. 5, indicating a relationship between operating positions of the multiple-step transmission of FIG. 16 and combinations of operating states of hydraulically operated frictional coupling devices to establish the respective operating positions.
Figure 18:
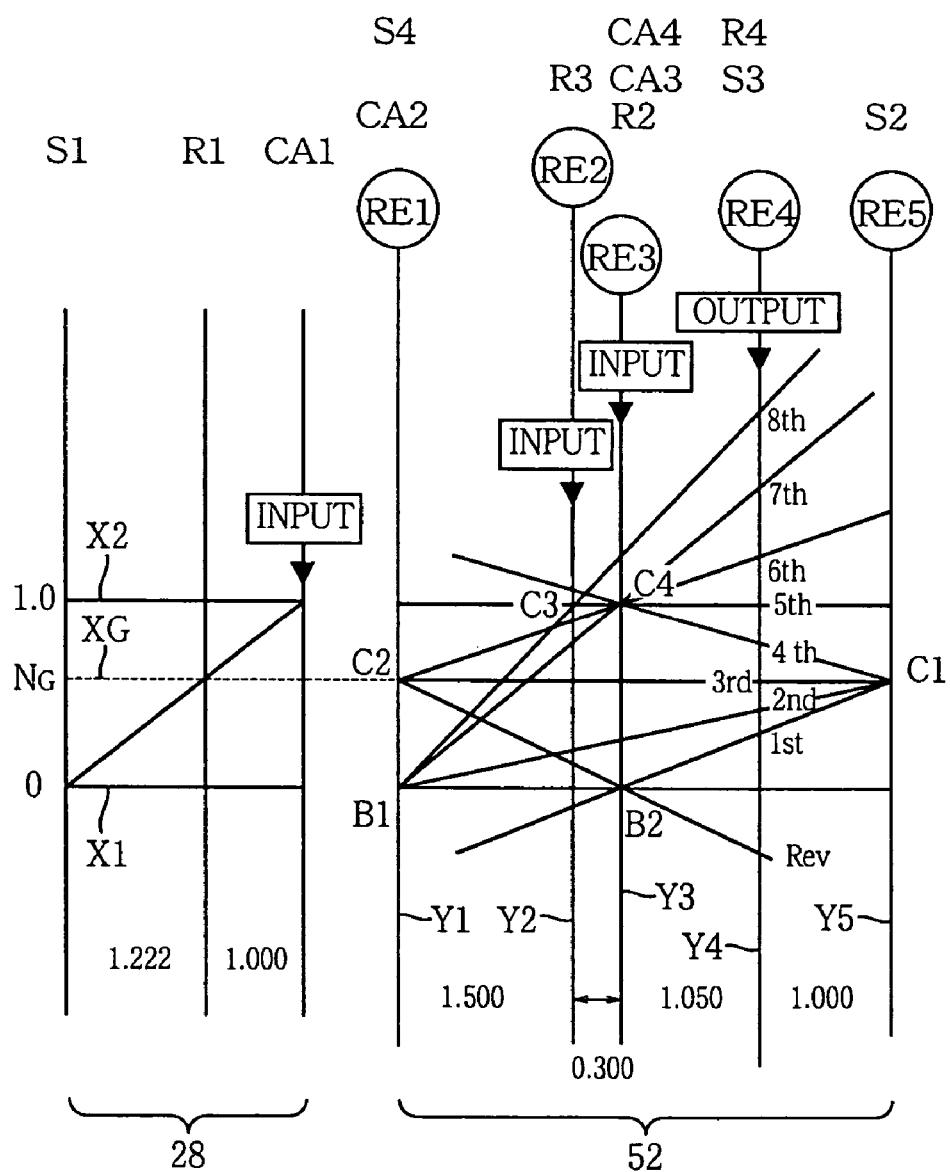
FIG. 18 is a collinear chart corresponding to that of FIG. 6, showing relative rotational speeds of a plurality of rotary elements incorporated in the multiple-step transmission of FIG. 16.

FIG. 16 is a schematic view illustrating a basic arrangement of the transmission 50 according to a sixth embodiment of the present invention. FIG. 17 is a table indicating a relationship between operating positions of the transmission 50 and combinations of operating states of hydraulically operated frictional coupling devices to establish the respective operating positions. FIG. 18 is a collinear chart showing relative rotational speeds of a plurality of rotary elements incorporated in the multiple-step transmission 10. The arrangement in this sixth embodiment is identical with that in the second embodiment of FIGS. 4–6, except in that the combination of the frictional coupling devices used to establish the fourth-speed position is different from that in the second embodiment, and in that the speed ratio of the fourth-speed position is different from that in the second embodiment. The arrangement in the sixth embodiment provides substantially the same advantages as that in the second embodiment.

In the second embodiment of FIGS. 4–6, the fourth-speed position having the speed ratio $\gamma_4$, for instance, about 1.349, which is lower than that of the third-speed position, is established by engaging the first and third clutches C1, C3 so as to connect the second sun gear S2 to the first ring gear R1 (via the second intermediate transmitting path M2) and so as to connect the third ring gear R3 to the first carrier CA1 (via the first intermediate transmitting path M1). In the present sixth embodiment of FIGS. 16–18, on the other hand, the fourth-speed position having the speed ratio $\gamma_4$, for instance, about 1.300 is established by engaging the first and fourth clutches C1, C4 (as shown in FIG. 17) so as to connect the second sun gear S2 to the first ring gear R1 (via the second intermediate transmitting path M2) and so as to connect the second ring gear R2, third carrier CA3 and fourth carrier CA4 to the first carrier CA1 (via the first intermediate transmitting path M1). A ratio step ($\gamma_3/\gamma_4$) between the speed ratio $\gamma_3$ of the third-speed position and the speed ratio $\gamma_4$ of the fourth-speed position is 1.399 in the present sixth embodiment, while that is 1.348 in the second embodiment of FIGS. 4–6. A ratio step ($\gamma_4/\gamma_5$) between the speed ratio $\gamma_4$ of the fourth-speed position and the speed ratio $\gamma_5$ of the fifth-speed position is 1.300 in the present sixth embodiment, while that is 1.349 in the second embodiment.

In the second embodiment of FIGS. 4–6, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the third clutch C3 is engaged to connect the second rotary element RE2 to the first intermediate transmitting path M1 so that the second rotary element RE2 is rotated at the speed "1.0". The rotational speed of the output gear 26 in the fourth-speed position, which is one step higher than that in the third-speed position, is represented by the point of intersection (4th) between the vertical straight line Y4 and the straight line which passes the point of intersection between the vertical straight line Y5 and the horizontal straight line XG and the point of intersection between the vertical straight line Y2 and the horizontal straight line X2, as shown in the collinear chart of FIG. 6. In the present sixth embodiment of FIGS. 16–18, on the other hand, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the fourth clutch C4 is engaged to connect the third rotary element RE3 to the first intermediate transmitting path M1 so that the third rotary element RE3 is rotated at the speed "1.0". The rotational speed of the output gear 26 in the fourth-speed position is represented by the point of intersection (4th) between the vertical straight line Y4 and a straight line which passes a point of intersection between the vertical straight line Y5 and the horizontal straight line XG and a point of intersection between the vertical straight line Y3 and the horizontal straight line X2.

Figures 19, 20:
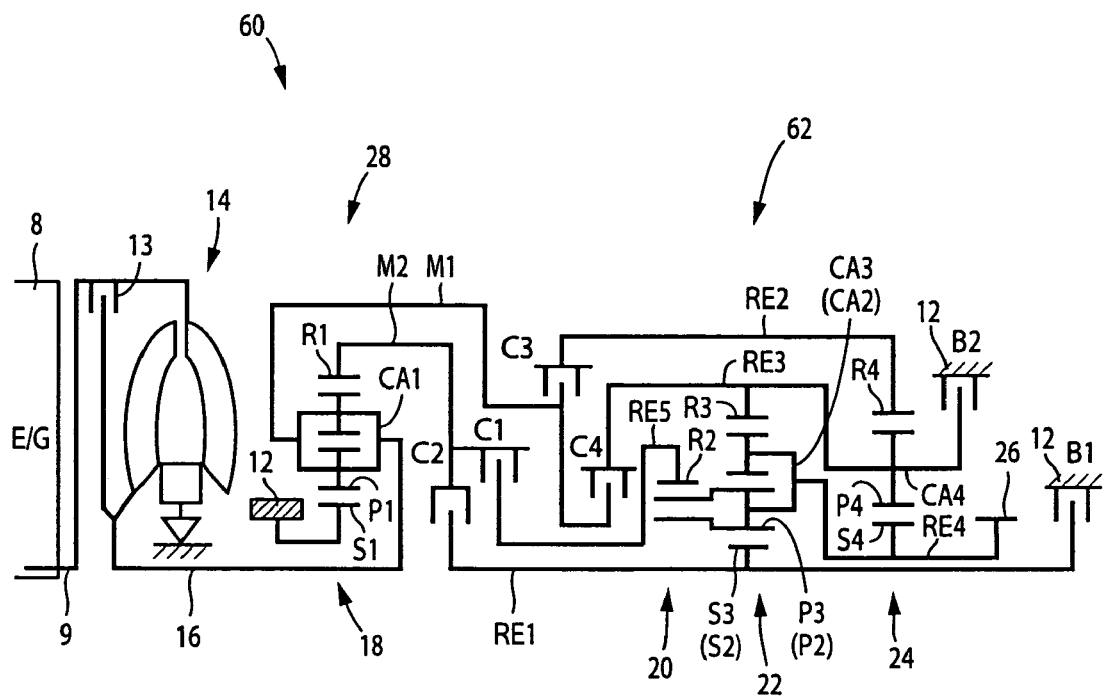
FIG. 19 is a schematic view corresponding to that of FIG. 7, illustrating a basic arrangement of a vehicle planetary-gear-type multiple-step transmission according to a seventh embodiment of the present invention.
FIG. 20 is a table corresponding to that of FIG. 8, indicating a relationship between operating positions of the multiple-step transmission of FIG. 19 and combinations of operating states of hydraulically operated frictional coupling devices to establish the respective operating positions.
Figure 21:
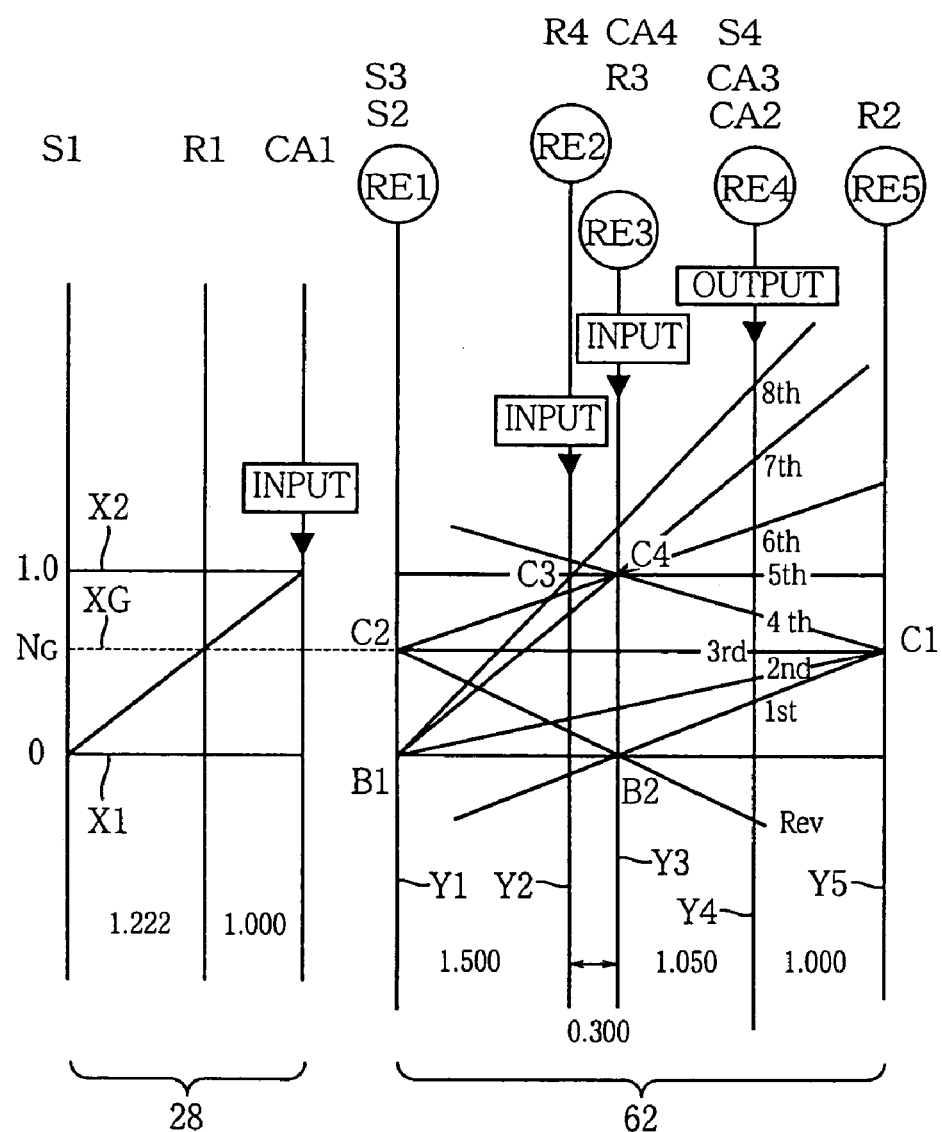
FIG. 21 is a collinear chart corresponding to that of FIG. 9, showing relative rotational speeds of a plurality of rotary elements incorporated in the multiple-step transmission of FIG. 19.

FIG. 19 is a schematic view illustrating a basic arrangement of the transmission 60 according to a seventh embodiment of the present invention. FIG. 20 is a table indicating a relationship between operating positions of the transmission 60 and combinations of operating states of hydraulically operated frictional coupling devices to establish the respective operating positions. FIG. 21 is a collinear chart showing relative rotational speeds of a plurality of rotary elements incorporated in the multiple-step transmission 60. The arrangement in this seventh embodiment is identical with that in the third embodiment of FIGS. 7–9, except in that the combination of the frictional coupling devices used to establish the fourth-speed position is different from that in the third embodiment, and in that the speed ratio of the fourth-speed position is different from that in the third embodiment. The arrangement in the seventh embodiment provides substantially the same advantages as that in the third embodiment.

In the third embodiment of FIGS. 7–9, the fourth-speed position having the speed ratio $\gamma_4$, for instance, about 1.349, which is lower than that of the third-speed position, is established by engaging the first and third clutches C1, C3 so as to connect the second ring gear R2 to the first ring gear R1 (via the second intermediate transmitting path M2) and so as to connect the fourth ring gear R4 to the first carrier CA1 (via the first intermediate transmitting path M1). In the present seventh embodiment of FIGS. 19–21, on the other hand, the fourth-speed position having the speed ratio $\gamma_4$, for instance, about 1.300 is established by engaging the first and fourth clutches C1, C4 (as shown in FIG. 20) so as to connect the second ring gear R2 to the first ring gear R1 (via the second intermediate transmitting path M2) and so as to connect the third ring gear R3 and fourth carrier CA4 to the first carrier CA1 (via the first intermediate transmitting path M1). A ratio step ($\gamma_3/\gamma_4$) between the speed ratio $\gamma_3$ of the third-speed position and the speed ratio $\gamma_4$ of the fourth-speed position is 1.399 in the present seventh embodiment, while that is 1.348 in the third embodiment of FIGS. 7–9. A ratio step ($\gamma_4/\gamma_5$) between the speed ratio $\gamma_4$ of the fourth-speed position and the speed ratio $\gamma_5$ of the fifth-speed position is 1.300 in the present seventh embodiment, while that is 1.349 in the third embodiment.

In the third embodiment of FIGS. 7–9, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the third clutch C3 is engaged to connect the second rotary element RE2 to the first intermediate transmitting path M1 so that the second rotary element RE2 is rotated at the speed "1.0". The rotational speed of the output gear 26 in the fourth-speed position, which is one step higher than that in the third-speed position, is represented by the point of intersection (4th) between the vertical straight line Y4 and the straight line which passes the point of intersection between the vertical straight line Y5 and the horizontal straight line XG and the point of intersection between the vertical straight line Y2 and the horizontal straight line X2, as shown in the collinear chart of FIG. 9. In the present seventh embodiment of FIGS. 19–21, on the other hand, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the fourth clutch C4 is engaged to connect the third rotary element RE3 to the first intermediate transmitting path M1 so that the third rotary element RE3 is rotated at the speed "1.0". The rotational speed of the output gear 26 in the fourth-speed position is represented by the point of intersection (4th) between the vertical straight line Y4 and a straight line which passes a point of intersection between the vertical straight line Y5 and the horizontal straight line XG and a point of intersection between the vertical straight line Y3 and the horizontal straight line X2.

Figures 22, 23:
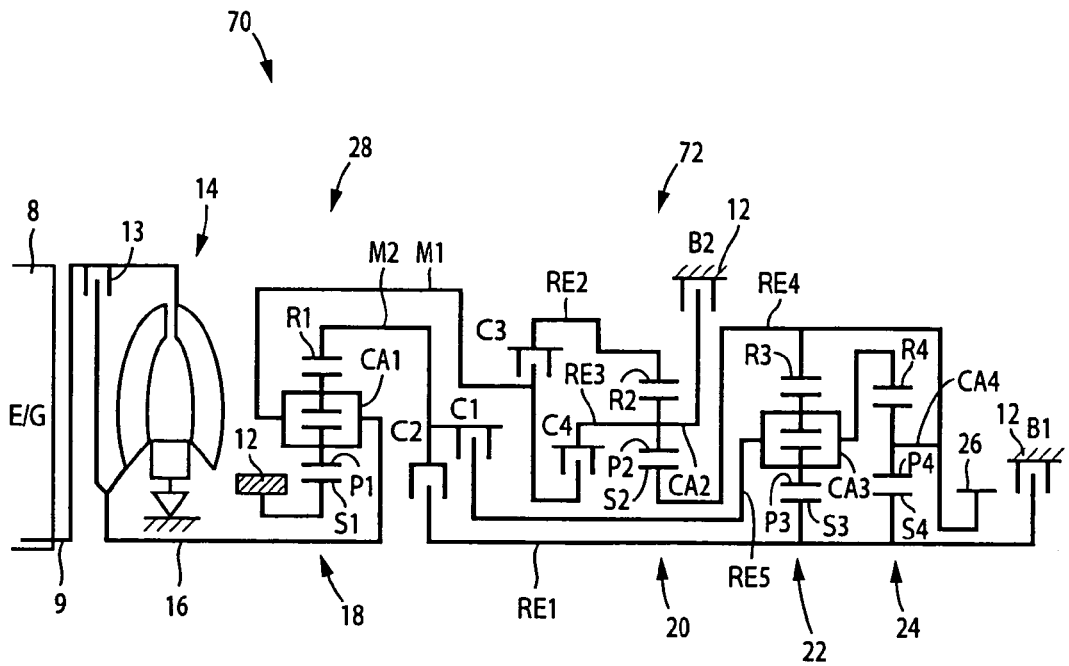
FIG. 22 is a schematic view corresponding to that of FIG. 10, illustrating a basic arrangement of a vehicle planetary-gear-type multiple-step transmission according to an eighth embodiment of the present invention.
FIG. 23 is a table corresponding to that of FIG. 11, indicating a relationship between operating positions of the multiple-step transmission of FIG. 22 and combinations of operating states of hydraulically operated frictional coupling devices to establish the respective operating positions.
Figure 24:
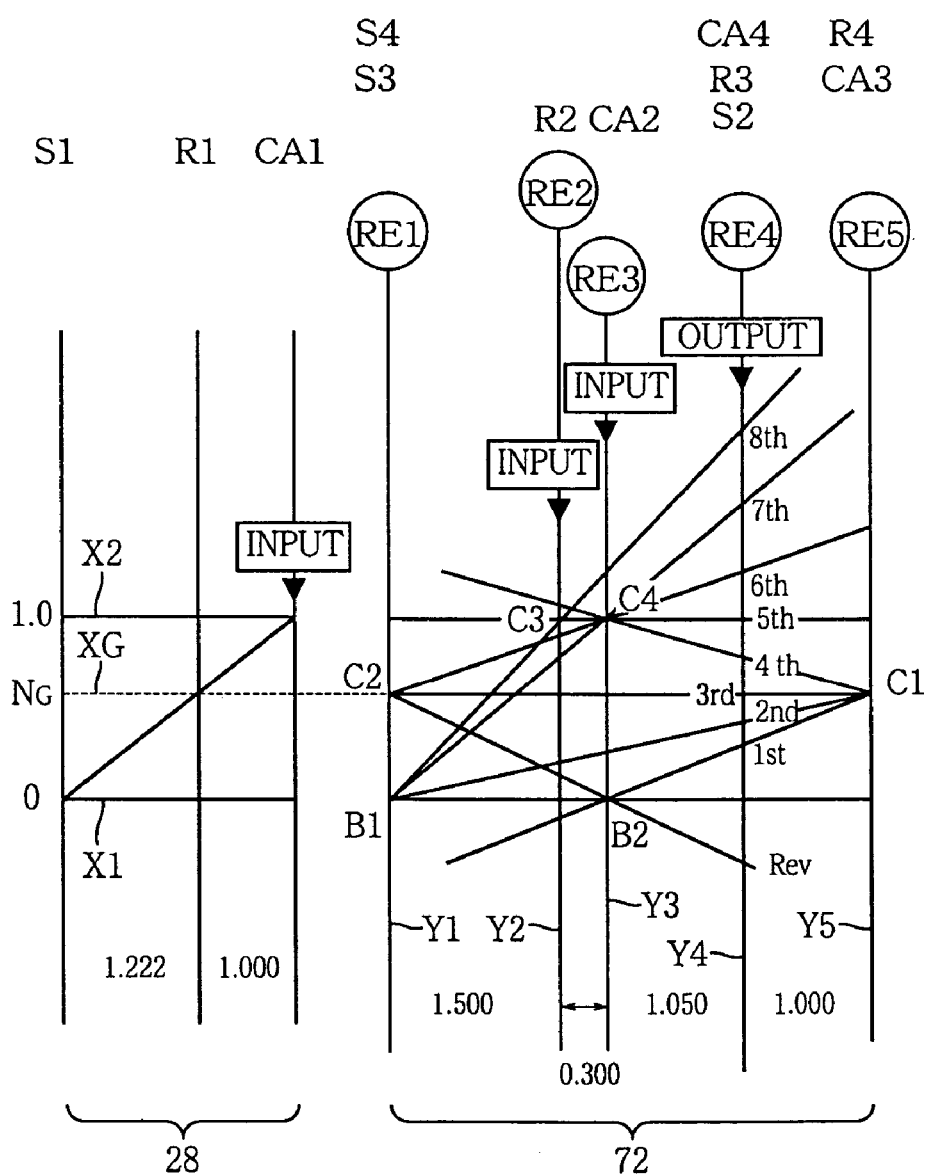
FIG. 24 is a collinear chart corresponding to that of FIG. 12, showing relative rotational speeds of a plurality of rotary elements incorporated in the multiple-step transmission of FIG. 22.

FIG. 22 is a schematic view illustrating a basic arrangement of the transmission 70 according to an eighth embodiment of the present invention. FIG. 23 is a table indicating a relationship between operating positions of the transmission 70 and combinations of operating states of hydraulically operated frictional coupling devices to establish the respective operating positions. FIG. 24 is a collinear chart showing relative rotational speeds of a plurality of rotary elements incorporated in the multiple-step transmission 70. The arrangement in this eighth embodiment is identical with that in the fourth embodiment of FIGS. 10–12, except in that the combination of the frictional coupling devices used to establish the fourth-speed position is different from that in the fourth embodiment, and in that the speed ratio of the fourth-speed position is different from that in the fourth embodiment. The arrangement in the eighth embodiment provides substantially the same advantages as that in the fourth embodiment.

In the fourth embodiment of FIGS. 10–12, the fourth-speed position having the speed ratio $\gamma_4$, for instance, about 1.349, which is lower than that of the third-speed position, is established by engaging the first and third clutches C1, C3 so as to connect the third carrier CA3 and fourth ring gear R4 to the first ring gear R1 (via the second intermediate transmitting path M2) and so as to connect the second ring gear R2 to the first carrier CA1 (via the first intermediate transmitting path M1). In the present eighth embodiment of FIGS. 22–24, on the other hand, the fourth-speed position having the speed ratio $\gamma_4$, for instance, about 1.300 is established by engaging the first and fourth clutches C1, C4 (as shown in FIG. 23) so as to connect the third carrier CA3 and fourth ring gear R4 to the first ring gear R1 (via the second intermediate transmitting path M2) and so as to connect the second carrier CA2 to the first carrier CA1 (via the first intermediate transmitting path M1). A ratio step ($\gamma_3/\gamma_4$) between the speed ratio $\gamma_3$ of the third-speed position and the speed ratio $\gamma_4$ of the fourth-speed position is 1.399 in the present eighth embodiment, while that is 1.348 in the fourth embodiment of FIGS. 10–12. A ratio step ($\gamma_4/\gamma_5$) between the speed ratio $\gamma_4$ of the fourth-speed position and the speed ratio $\gamma_5$ of the fifth-speed position is 1.300 in the present eighth embodiment, while that is 1.349 in the fourth embodiment.

In the fourth embodiment of FIGS. 10–12, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the third clutch C3 is engaged to connect the second rotary element RE2 to the first intermediate transmitting path M1 so that the second rotary element RE2 is rotated at the speed "1.0". The rotational speed of the output gear 26 in the fourth-speed position, which is one step higher than that in the third-speed position, is represented by the point of intersection (4th) between the vertical straight line Y4 and the straight line which passes the point of intersection between the vertical straight line Y5 and the horizontal straight line XG and the point of intersection between the vertical straight line Y2 and the horizontal straight line X2, as shown in the collinear chart of FIG. 12. In the present eighth embodiment of FIGS. 22–24, on the other hand, for establishing the fourth-speed position, the first clutch C1 is engaged to connect the fifth rotary element RE5 to the second intermediate transmitting path M2 so that the fifth rotary element RE5 is rotated at the speed "$N_G$", while at the same time the fourth clutch C4 is engaged to connect the third rotary element RE3 to the first intermediate transmitting path M1 so that the third rotary element RE3 is rotated at the speed "1.0". The rotational speed of the output gear 26 in the fourth-speed position is represented by the point of intersection (4th) between the vertical straight line Y4 and a straight line which passes a point of intersection between the vertical straight line Y5 and the horizontal straight line XG and a point of intersection between the vertical straight line Y3 and the horizontal straight line X2.

Figure 25:
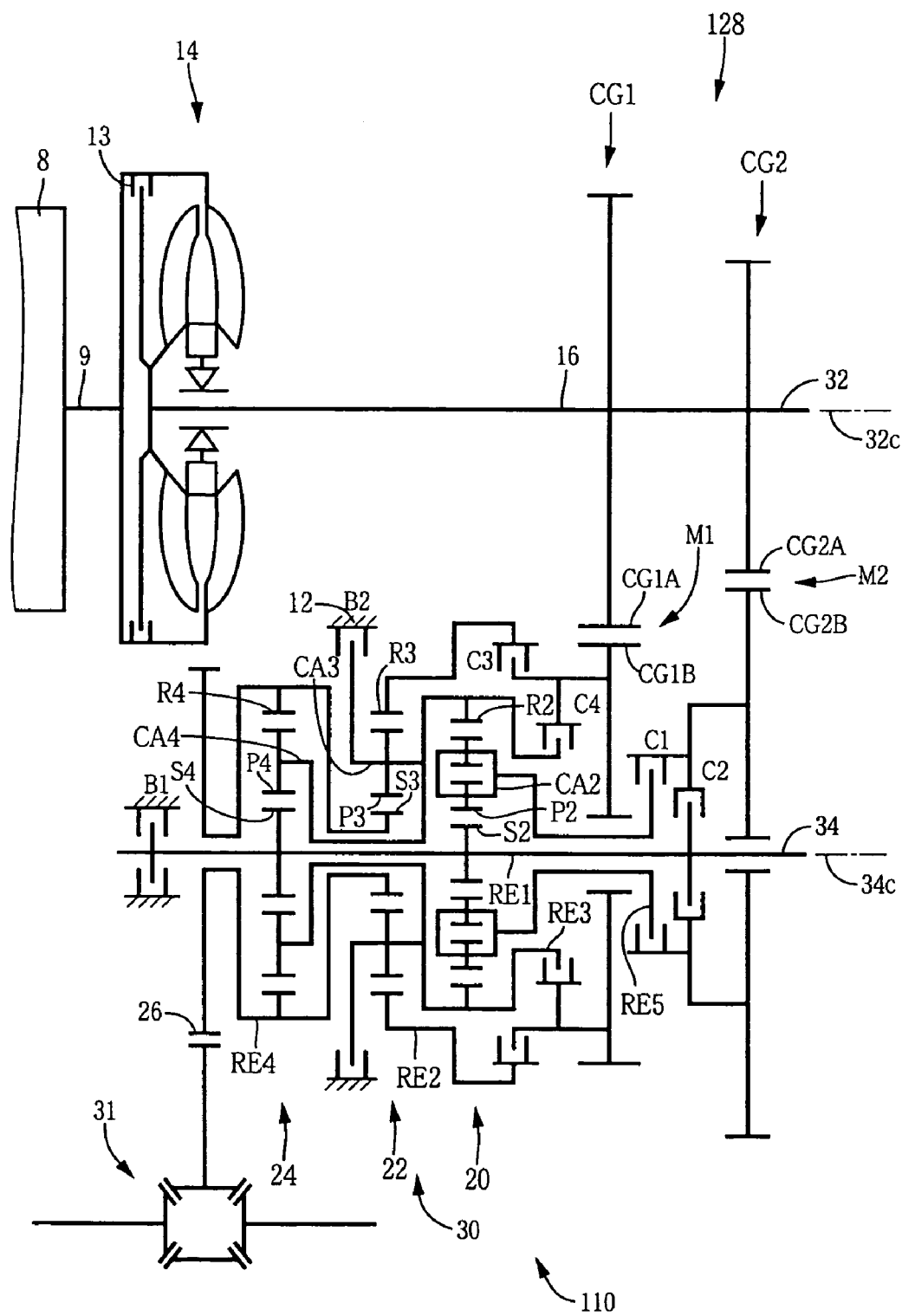
FIG. 25 is a schematic view corresponding to that of FIG. 1, illustrating a basic arrangement of a vehicle planetary-gear-type multiple-step transmission according to a ninth embodiment of the present invention.
Figures 26, 27:
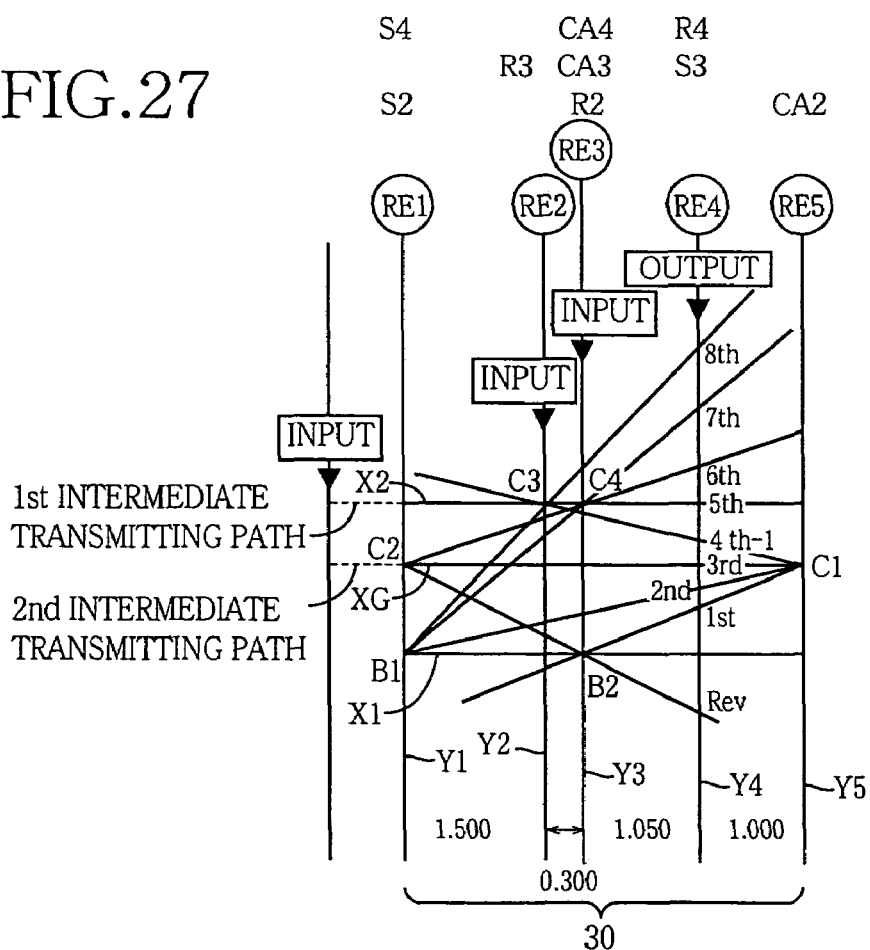
FIG. 26 is a table corresponding to that of FIG. 2, indicating a relationship between operating positions of the multiple-step transmission of FIG. 25 and combinations of operating states of hydraulically operated frictional coupling devices to establish the respective operating positions.
FIG. 27 is a collinear chart corresponding to that of FIG. 3, showing relative rotational speeds of a plurality of rotary elements incorporated in the multiple-step transmission of FIG. 25.

FIG. 25 is a schematic view illustrating a basic arrangement of a transmission 110 according to a ninth embodiment of the present invention. FIG. 26 is a table indicating a relationship between operating positions of the transmission 110 and combinations of operating states of hydraulically operated frictional coupling devices to establish the respective operating positions. FIG. 27 is a collinear chart showing relative rotational speeds of a plurality of rotary elements incorporated in the multiple-step transmission 110. The transmission 110 is identical with the above-described transmission 10 of the first embodiment of FIGS. 1–3, except for construction of its first transmission unit 128, and provides substantially the same advantages as the transmission 10.

Namely, a main difference of the present ninth embodiment from the first embodiment is that the transmission 110 is equipped with the first transmission unit 128 in place of the above-described first transmission unit 28. In the following description as to the ninth embodiment, the same reference sings as used in the first embodiment will be used to identify the same elements, and such features that are characteristics of the ninth embodiment will be explained in contrast with the first embodiment.

As shown in FIG. 25, the transmission 110 has first and second shafts 32, 34 which are parallel with each other and which are rotatably held by the transmission casing 12. The first transmission unit 128 is constituted principally by two pairs of power transmitting members in the form of a first pair of counter gears CG1 and a second pair of counter gears CG2. A drive gear CG1A (which is one of the first pair of counter gears CG1) and a drive gear CG2A (which is one of the second pair of counter gears CG2) are mounted on the first shaft 32 which is rotatable about its axis 32c, while a driven gear CG1B (which is the other of the first pair of counter gears CG1) and a driven gear CG2B (which is the other of the second pair of counter gears CG2) are mounted on the second shaft 34 which is rotatable about its axis 34c. The drive gears CG1A, CG2A are disposed coaxially with the hydraulic transmission unit in the form of the torque converter 14 equipped with the lock-up clutch 13 and connected to the output shaft 16 which in turn is connected to the first shaft 32. The driven gears CG1B, CG2B are disposed coaxially with the second, third and fourth planetary gear sets 20, 22, 24 and the output gear 26. This transmission 110 is to be disposed between the engine 8 and drive wheels (not shown) so as to transmit an output of the engine 8 to the drive wheels, and is advantageously used for a front-engine front-drive (FF vehicle) or a rear-engine rear-drive (RR vehicle) on which a transmission is preferably installed with an axis of the transmission being parallel to the transverse or lateral direction of the vehicle. In the present ninth embodiment, the input shaft 16 and the output gear 26 function as the input rotary member and the output rotary member, while the transmission casing 12 functions as the stationary or non-rotary member. The input shaft 16 and the first shaft 32 (which is connected to the input shaft 16) may be considered as a single shaft. In this sense, a rotary motion of the first shaft 32 corresponds to a rotary motion of the input shaft 16 as the input rotary member. The torque converter 14 is operatively connected to the crankshaft 9 of the engine 8, for transmitting the power of the engine 8 to the input shaft 16. That is, the input shaft 16, which is connected to a turbine shaft (i.e., output rotary member) of the torque converter 14, is rotated about the first axis 32c by the engine 8. In this sense, the turbine shaft of the torque converter also corresponds to the input rotary member. It is noted that reference sign 31 denotes a differential gear device 31 which serves to transmit a rotary motion of the output gear 26 to the right and left drive wheels of the vehicle.

There will be described layout or arrangement of components of the transmission 110, by reference to FIG. 25. The first pair of counter gears CG1 and the second pair of counter gears CG2 of the first transmission unit 128 are arranged in parallel with each other, with a minimized spacing distance between the first and second pairs of counter gears CG1, CG2. Further, the first and second pairs of counter gears CG1, CG2 are positioned to be more distant from the engine 8 as viewed in a direction parallel with the first and second axes 32c, 34c, than the second, third and fourth planetary gear sets 20, 22, 24 of the second transmission unit 28. That is, the torque converter 14, the input shaft 16 and the second transmission unit 28 are positioned to be closer to the engine 8 as viewed in the direction parallel with the first and second axes 32c, 34c, than the first transmission unit 128. The second shaft 34 has an axial length which is substantially equal to a sum of axial lengths of the respective input shaft 16 and first shaft 32. In the first transmission unit 128, the first pair of counter gears CG1 are positioned to be closer to the engine 8, than the second pair of counter gears CG2. In the second transmission unit 30, the second planetary gear set 20, the third planetary gear set 22, the fourth planetary gear set 24 and the output gear 26 are arranged in this order of description, as viewed in a direction away from the first transmission unit 128 toward the engine 8. The second, third and fourth planetary gear sets 20, 22, 24 and the output gear 26 of the second transmission unit 30 of the present transmission 110 are arranged in this order of description as viewed in the direction from the right toward the left in FIG. 25, while the second, third and fourth planetary gear sets 20, 22, 24 and the output gear 26 of the second transmission unit 30 of the above-described transmission 10 are arranged in this order of description as viewed in the direction from the left toward the right in FIG. 1. The clutches C1–C4 as the coupling devices are disposed between the second transmission unit 30 and the first pair of counter gears CG1 or second pair of counter gears CG2.

The present transmission 110 is advantageous over a transmission having four planetary gear sets arranged in series on a single axis, in that its relatively small axial length permits the transmission 110 to be more easily installed with its axis being parallel to the transverse or lateral direction of a FF vehicle or a RR vehicle. Further, since the clutches C1–C4 and the brakes B1, B2 are disposed in an end portion of the second shaft 34 or outside the transmission casing 12, it is easy to establish a hydraulically operating system for these hydraulically operated frictional coupling devices. Particularly, connections of the clutches C1–C4 with the first transmission unit 128 can be easily made. Still further, since a space is formed along the first axis 32c between the first transmission unit 128 and the torque converter 14, various elements of the hydraulically operating system such as an oil pump and valve bodies can be disposed within the space, thereby facilitating arrangement of a hydraulic circuit required for the transmission 110. Still further, since the oil pump is disposed near the engine 8 which drives the oil pump, the oil pump can be driven with high efficiency.

Like well-known counter gears of a parallel-axes-type transmission, the first and second pairs of counter gears CG1, CG2 of the first transmission unit 128 has the first and second drive gears CG1A, CG2A mounted on the first shaft 32, and the first and second driven gears CG1B, CG2B mounted on the second shaft 34, such that the first drive and driven gears CG1A, CG1B are held in meshing engagement with each other while the second drive and driven gears CG2A, CG2B are held in meshing engagement with each other. These two pairs of counter gears CG1, CG2 serve as the power transmitting members for transmitting a rotary motion of the input rotary member which is inputted to the first shaft 32, to the second transmission unit 30 disposed on the second shaft 34c. The first pair of counter gears CG1 and the second pair of counter gears CG2 constitute respective drive-driven paths, and correspond to the first intermediate transmitting path M1 and the second intermediate transmitting path M2, respectively. That is, the first transmission unit 128 is capable of transmitting the rotary motion from the input shaft 16 or first shaft 32, to the second transmission unit 30 through the first and second intermediate transmitting paths M1, M2 such that a speed of the rotary motion as transmitted through the first intermediate transmitting path M1 is different from a speed of the rotary motion as transmitted through the second intermediate transmitting path M2. The first drive gear CG1A corresponds to a first drive member constituting a portion of the first intermediate transmitting path M1 which portion is located on the first shaft 32. The second drive gear CG2A corresponds to a second drive member constituting a portion of the second intermediate transmitting path M2 which portion is located on the first shaft 32. The first driven gear CG1B corresponds to a first driven member constituting a portion of the first intermediate transmitting path M1 which portion is located on the second shaft 34. The second driven gear CG2B corresponds to a second driven member constituting a portion of the second intermediate transmitting path M2 which portion is located on the second shaft 34. Where the first pair of counter gears CG1 has a reduction gear ratio (=rotational speed of the drive gear CG1A/rotational speed of the driven gear CG1B) of about 1.000 while the second pair of counter gears CG2 has a reduction gear ratio (=rotational speed of the drive gear CG2A/rotational speed of the driven gear CG2B) of about 1.818, for example, the speed of the rotary motion as transmitted through the second intermediate transmitting path M2 is lower than the speed of the rotary motion as transmitted through the first intermediate transmitting path M1. In the present ninth embodiment, the first pair of counter gears CG1 is adapted to have the reduction gear ratio of about 1.000, so that the speed of the rotary motion transmitted through the first intermediate transmitting path M1 is substantially equal to the rotational speed of the input shaft 16. However, the speed of the rotary motion transmitted through the first intermediate transmitting path M1 may be different from the rotational speed of the input shaft 16.

In the present transmission 110, the second intermediate transmitting path M2 (which is selectively connected to the fifth rotary element RE5 through the first clutch C1 or connected to the first rotary element RE1 through the second clutch C2) is connected to the second driven gear CG2B, while the first intermediate transmitting path M1 (which is selectively connected to the second rotary element RE2 through the third clutch C3 or connected to the third rotary element RE3 through the fourth clutch C4) is connected to the first driven gear CG1B. However, the second transmission unit 30 of the transmission 110 is substantially identical with the second transmission unit 30 of the above-described transmission 10.

In the transmission 110 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 26 (which is identical with that of FIG. 2). The eight forward drive positions have respective speed ratios γ (=rotational speed $N_{in}$ of input shaft/rotational speed $N_{out}$ of output gear) that change in geometric progression, as in the first embodiment of FIGS. 1–3. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

The collinear chart of FIG. 27 is different from the collinear chart of FIG. 3 in that the first transmission unit 128 is represented by a single vertical straight line indicative of the first and second pairs of counter gears CG1, CG2 connected to the input shaft 16 while the first transmission unit 28 is represented by the three vertical straight lines indicative of the respective rotary elements of the first planetary gear set 18. However, the collinear chart of FIG. 27 is identical with that of FIG. 3 in that the second transmission unit 30 is represented by the five vertical straight lines indicative of the respective rotary elements of the second, third and fourth planetary gear sets 20, 22, 24.

As is apparent from the collinear chart of FIG. 27, the first transmission unit 128 is capable of transmitting a rotary motion from the input shaft 16 (the first shaft 32) to the second transmitting unit 30 through the first and second intermediate transmitting paths M1, M2, such that a speed of the rotary motion as transmitted through the second intermediate transmitting path M2 is lower than a speed of the rotary motion as transmitted through the first intermediate transmitting path M1. The arrangement of the second transmission unit 30 is the same as that of the second transmission unit 30 of the transmission 10 shown in the collinear chart of FIG. 3. The present transmission 110 is different from the transmission 10 only in construction of the first transmission unit. The rotational speed of the output gear 26 in each speed position in the transmission 110 is the same as that in the transmission 10.

The transmission 110 of the present ninth embodiment provides the same advantages as the transmission 10 of FIGS. 1–3. Further, since the number of planetary gear sets arranged on the second shaft 34 is three, an overall axial length of the transmission unit 110 can be made smaller than that of a transmission which is equipped with four planetary gears arranged on a single axis. Therefore, the transmission 110 can be advantageously used for a front-engine front-drive (FF vehicle) or a rear-engine rear-drive (RR vehicle) on which a transmission is preferably installed with an axis of the transmission being parallel to the transverse or lateral direction of the vehicle.

Figures 28, 29:
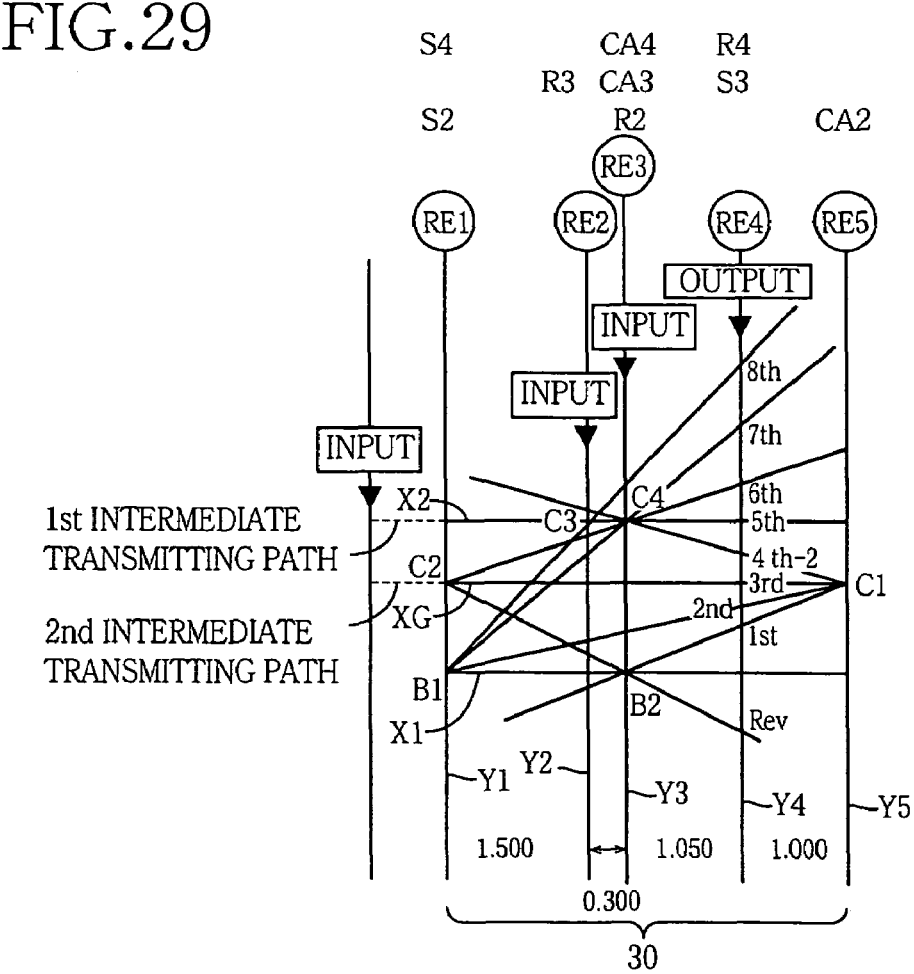
FIG. 28 is a table corresponding to that of FIG. 26, indicating a modified arrangement for the operating position establishment in the multiple-step transmission of FIG. 25.
FIG. 29 is a collinear chart corresponding to that of FIG. 27, showing relative rotational speeds of the plurality of rotary elements in the modified arrangement indicated in FIG. 28.

FIG. 28 is a table corresponding to that of FIG. 26, and indicating a modified arrangement for the operating position establishment in the transmission 110 of FIG. 25. FIG. 29 is a collinear chart showing relative rotational speeds of the rotary elements in the modified arrangement indicated in the table of FIG. 28. The arrangement of FIG. 28 is identical with that of FIG. 26, except in that the combination of the frictional coupling devices used to establish the fourth-speed position is different from that in the arrangement of FIG. 26. In the arrangement of FIG. 28, the fourth-speed position is established by engaging the first and fourth clutches C1, C4 in place of the first and third clutches C1, C3, so that the fourth-speed position is given a speed ratio $\gamma_4$ of about 1.300. A ratio step ($\gamma_3/\gamma_4$) between the speed ratio $\gamma_3$ of the third-speed position and the speed ratio $\gamma_4$ of the fourth-speed position is 1.398, and a ratio step ($\gamma_4/\gamma_5$) between the speed ratio $\gamma_4$ of the fourth-speed position and the speed ratio $\gamma_5$ of the fifth-speed position is 1.300.

As shown in the collinear chart of FIG. 29, for establishing the fourth-speed position, the first clutch C1 is engaged to connect the fifth rotary element RE5 to the second driven gear CG2B (the second intermediate transmitting path M2) so that the fifth rotary element RE5 is rotated at the speed "$N_G$", while at the same time the fourth clutch C4 is engaged to connect the third rotary element RE3 to the first driven gear CG1B (the first intermediate transmitting path M1) so that the third rotary element RE3 is rotated at the speed "1.0". The rotational speed of the output gear 26 in the fourth-speed position is represented by the point of intersection (4th-2) between the vertical straight line Y4 and a straight line which passes a point of intersection between the vertical straight line Y5 and the horizontal straight line XG and a point of intersection between the vertical straight line Y3 and the horizontal straight line X2.

Figure 30:
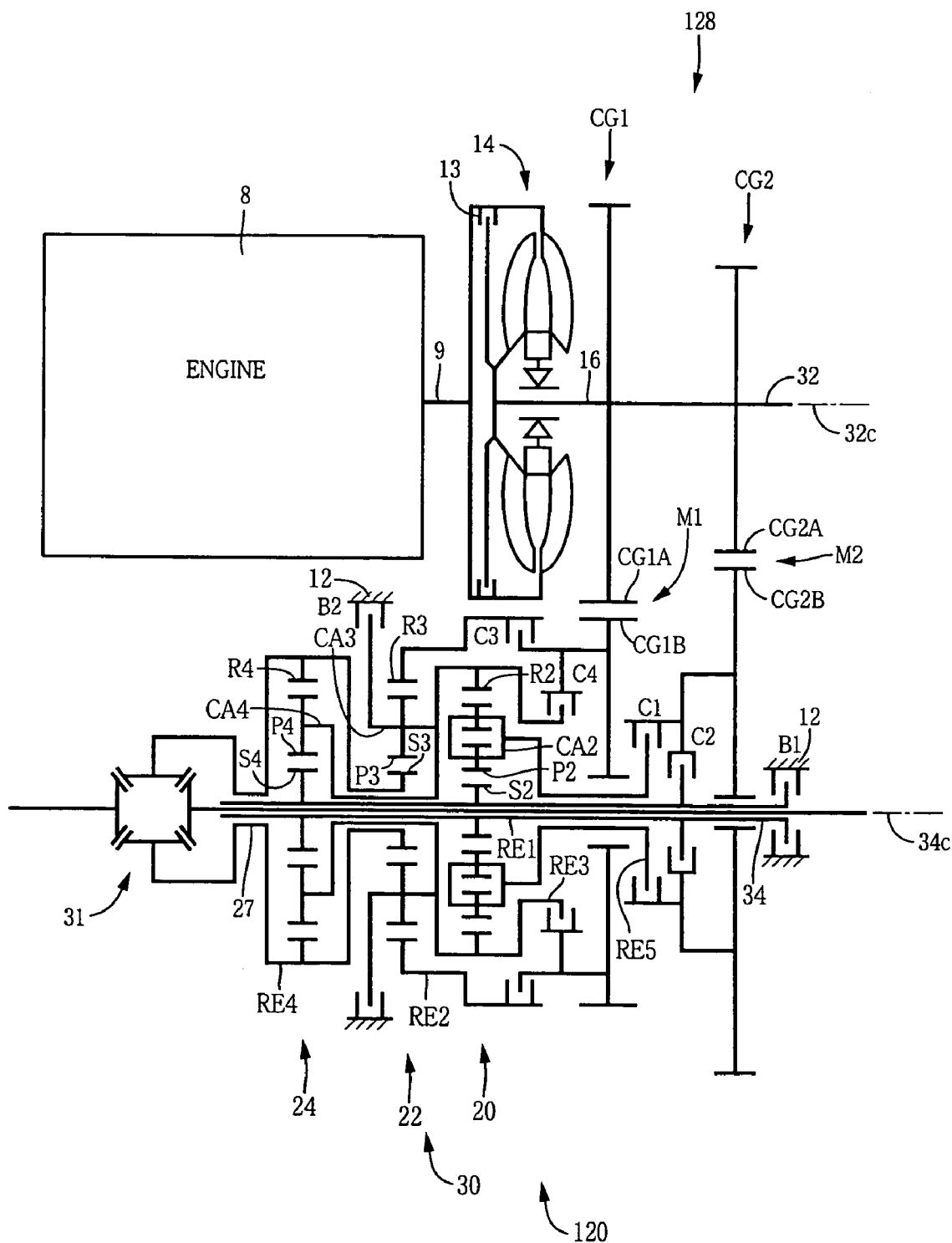
FIG. 30 is a schematic view corresponding to that of FIG. 25, illustrating a basic arrangement of a vehicle planetary-gear-type multiple-step transmission according to a tenth embodiment of the present invention.

FIG. 30 is a schematic view illustrating a basic arrangement of a transmission 120 according to a tenth embodiment of the present invention. This transmission 120 is identical with the above-described transmission 110 except in that the output rotary member takes the form of an output shaft 27 in place of the output gear 26, and in that a positional relationship (layout) between the first transmission unit 128 and the torque converter 14 as viewed in a direction of the first axis 32c.

In the transmission 120 of the present tenth embodiment, the input shaft 16 has a smaller axial length than in the transmission 110 of FIG. 25, so that the sum of the axial lengths of the respective input shaft 16 and first shaft 32 is smaller than the axial length of the second shaft 34. Therefore, the engine 8 or other element can be disposed in a space located on one of opposite sides of the torque converter 14 which is remote from the first transmission unit 128 as viewed in the direction of the first axis 32c. Since the transmission 120 provides such a space available for the engine 8 or other element, it is possible to increase a degree of freedom in its installation on a vehicle.

Figure 31:
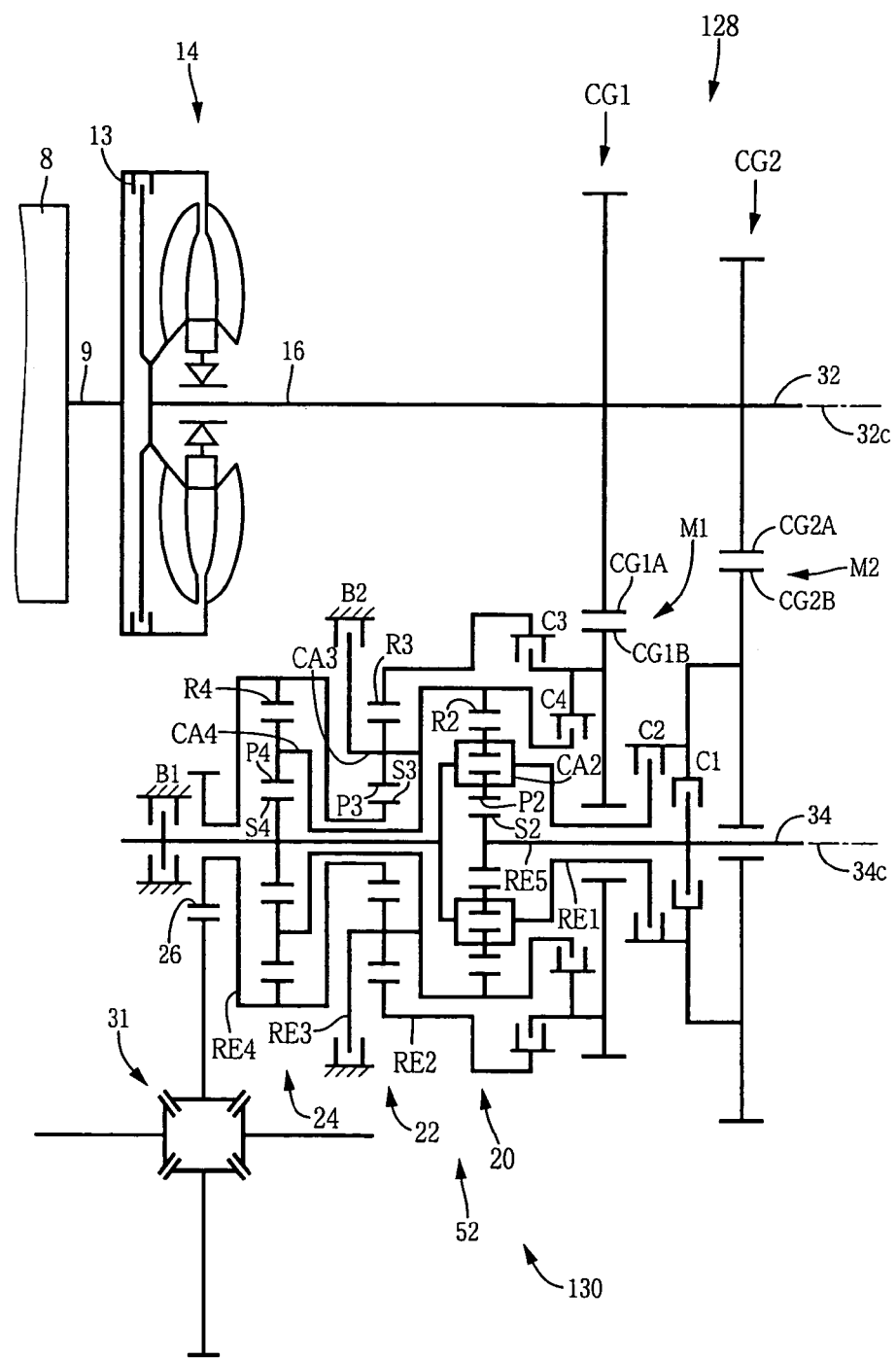
FIG. 31 is a schematic view corresponding to that of FIG. 25, illustrating a basic arrangement of a vehicle planetary-gear-type multiple-step transmission according to an eleventh embodiment of the present invention.
Figures 32, 33:
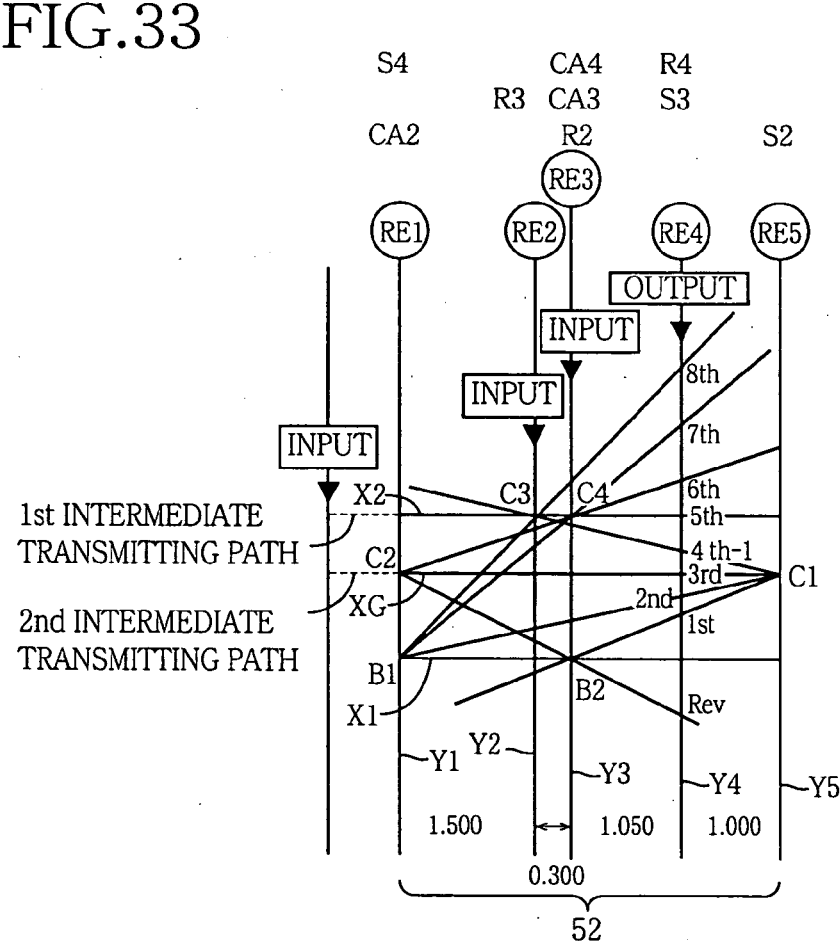
FIG. 32 is a table corresponding to that of FIG. 26, indicating a relationship between operating positions of the multiple-step transmission of FIG. 31 and combinations of operating states of hydraulically operated frictional coupling devices to establish the respective operating positions.
FIG. 33 is a collinear chart corresponding to that of FIG. 27, showing relative rotational speeds of a plurality of rotary elements incorporated in the multiple-step transmission of FIG. 31.

FIG. 31 is a schematic view illustrating a basic arrangement of a transmission 130 constructed according to an eleventh embodiment of the present invention. FIG. 32 is a table indicating a relationship between operating positions of the transmission 130 and combinations of operating states of hydraulically operated frictional coupling devices to establish the respective operating positions. FIG. 33 is a collinear chart showing relative rotational speeds of a plurality of rotary elements incorporated in the multiple-step transmission 130. The transmission 130 is identical with the above-described transmission 110 shown in FIG. 25, except for construction of its second transmission unit 52, and provides substantially the same advantages as the transmission 110 in the arrangement of FIGS. 25–27.

The second transmission unit 52 of the present transmission 130 is identical with the second transmission unit 52 of the transmission 50 of FIG. 4, except in that the second, third and fourth planetary gear sets 20, 22, 24 and the output gear 26 of the second transmission unit 52 of the present transmission 130 are arranged in this order of description as viewed in the direction from the right toward the left in FIG. 31, while the second, third and fourth planetary gear sets 20, 22, 24 and the output gear 26 of the second transmission unit 52 of the transmission 50 are arranged in this order of description as viewed in the direction from the left toward the right in FIG. 4.

In the transmission 130 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 32 (which is identical with that of FIG. 26). The eight forward drive positions have respective speed ratios γ (=rotational speed $N_{in}$ of input shaft/rotational speed $N_{out}$ of output gear) that change in geometric progression. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 33, five vertical straight lines Y1, Y2, Y3, Y4 and Y5 of the second transmission unit 52 respectively represent: a first rotary element RE1 consisting of the second carrier CA2 and the fourth sun gear S4 that are connected to each other; a second rotary element RE2 consisting of the third ring gear R3; a third rotary element RE3 consisting of the second ring gear R2 and the third and fourth carriers CA3, CA4 that are connected to each other; a fourth rotary element RE4 consisting of the third sun gear S3 and the fourth ring gear R4 that are connected to each other; and a fifth rotary element RE5 consisting of the second sun gear S2. The collinear chart of FIG. 33 is identical with that of FIG. 27, except in that the first rotary element RE1 consists of the second carrier CA2 and the fourth sun gear S4, and in that the fifth rotary element RE5 consists of the second sun gear S2.

Figures 34, 35:
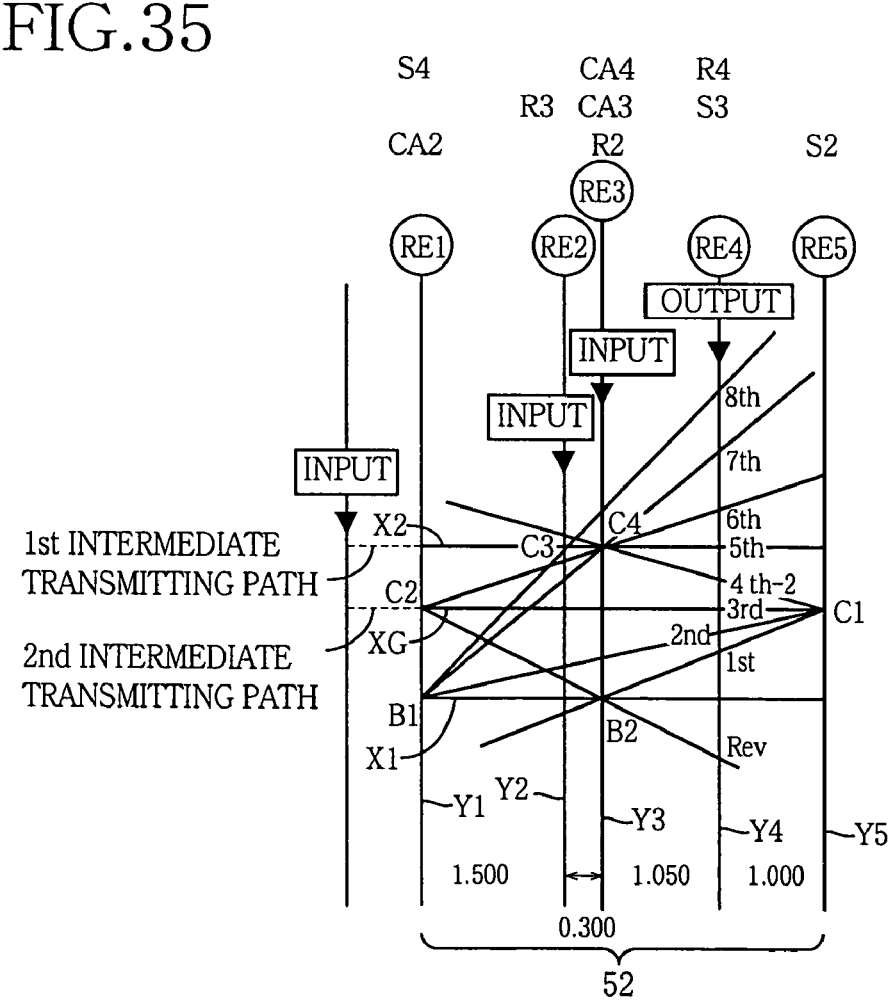
FIG. 34 is a table corresponding to that of FIG. 28, indicating a modified arrangement for the operating position establishment in the multiple-step transmission of FIG. 31.
FIG. 35 is a collinear chart corresponding to that of FIG. 29, showing relative rotational speeds of the plurality of rotary elements in the modified arrangement indicated in FIG. 34.

FIG. 34 is a table corresponding to that of FIG. 32, and indicating a modified arrangement for the operating position establishment in the transmission 130 of FIG. 31. FIG. 35 is a collinear chart showing relative rotational speeds of the rotary elements in the modified arrangement indicated in the table of FIG. 34. A difference between the arrangements of FIG. 34 and FIG. 32 is the same as the difference between the arrangements of FIG. 28 and FIG. 26, and description as to the difference is not provided herein. Similarly, a difference between the arrangements of FIG. 35 and FIG. 33 is the same as the difference between the arrangements of FIG. 29 and FIG. 27, and description as to the difference is not provided herein, either.

Figure 36:
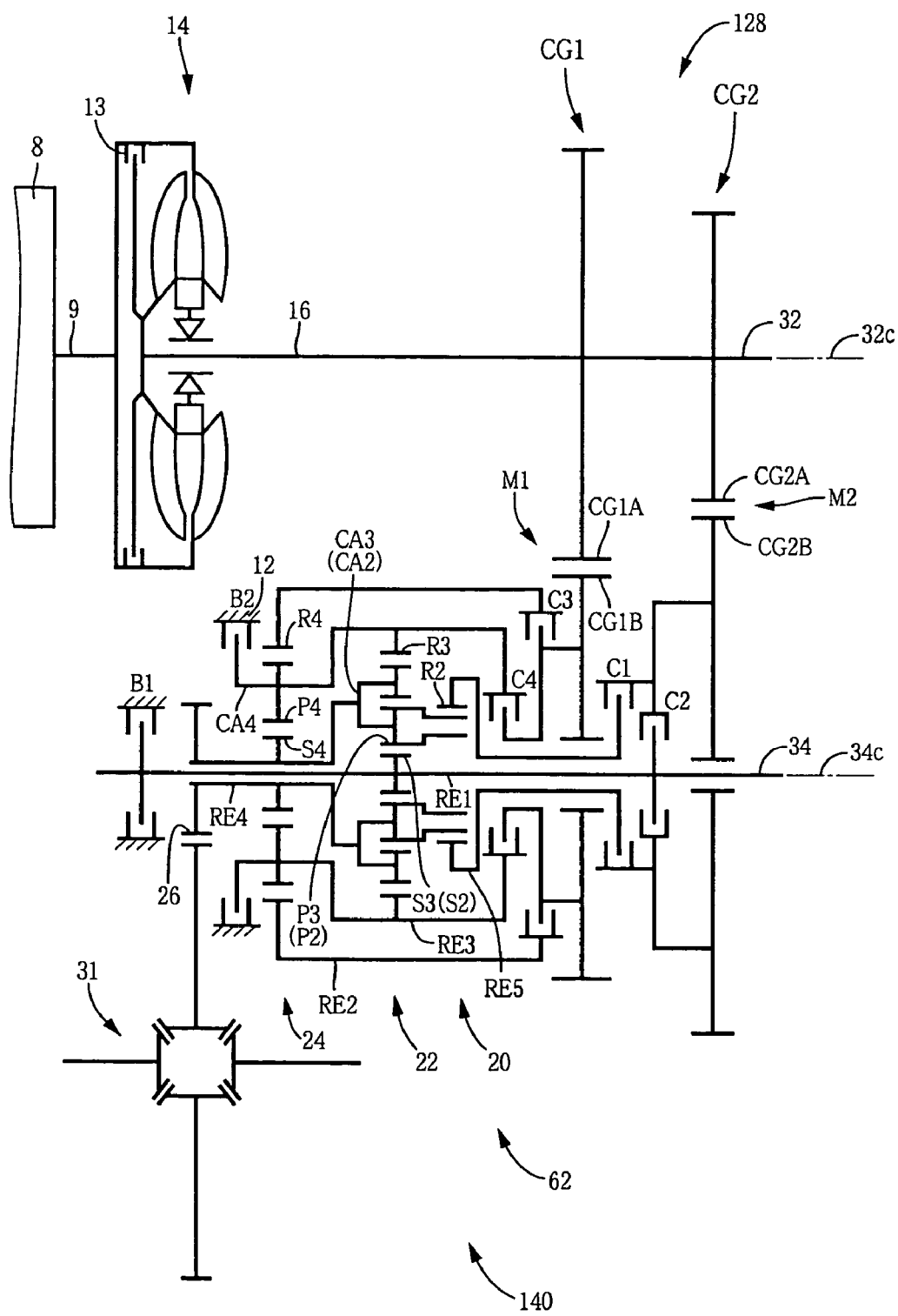
FIG. 36 is a schematic view corresponding to that of FIG. 25, illustrating a basic arrangement of a vehicle planetary-gear-type multiple-step transmission according to a twelfth embodiment of the present invention.
Figures 37, 38:
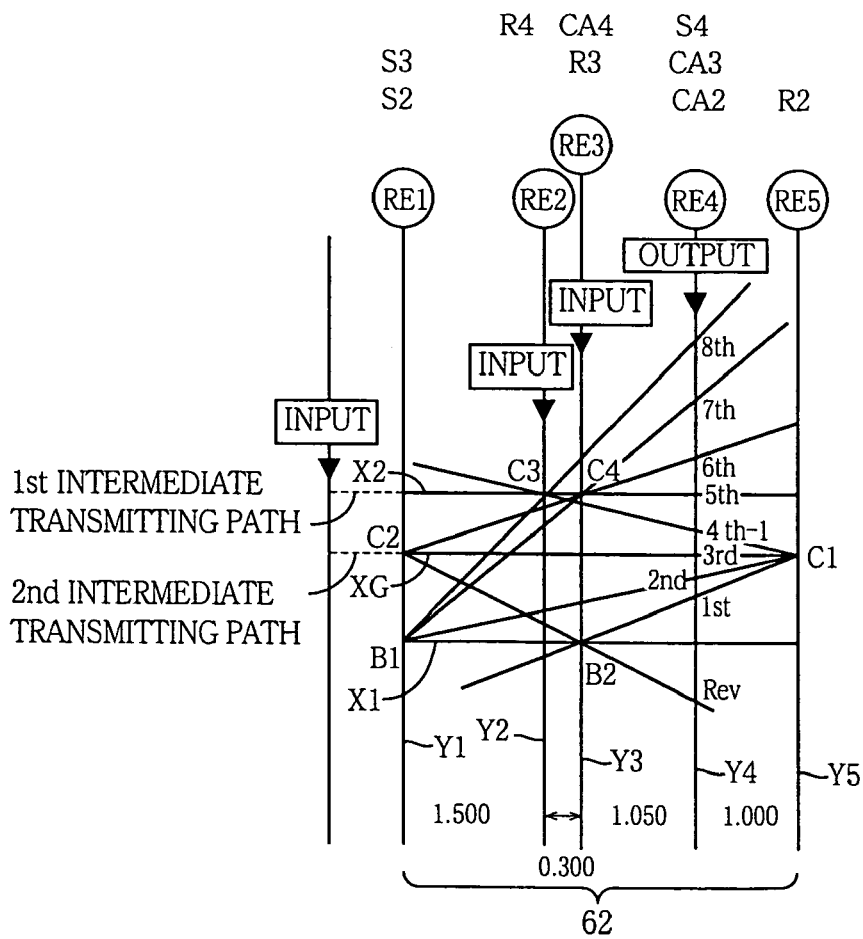
FIG. 37 is a table corresponding to that of FIG. 26, indicating a relationship between operating positions of the multiple-step transmission of FIG. 36 and combinations of operating states of hydraulically operated frictional coupling devices to establish the respective operating positions.
FIG. 38 is a collinear chart corresponding to that of FIG. 27, showing relative rotational speeds of a plurality of rotary elements incorporated in the multiple-step transmission of FIG. 36.

FIG. 36 is a schematic view illustrating a basic arrangement of a transmission 140 constructed according to a twelfth embodiment of the present invention. FIG. 37 is a table indicating a relationship between operating positions of the transmission 140 and combinations of operating states of hydraulically operated frictional coupling devices to establish the respective operating positions. FIG. 38 is a collinear chart showing relative rotational speeds of a plurality of rotary elements incorporated in the multiple-step transmission 140. The transmission 140 is identical with the above-described transmission 110 shown in FIG. 25, except for construction of its second transmission unit 62, and provides substantially the same advantages as the transmission 110 in the arrangement of FIGS. 25–27.

The second transmission unit 62 of the present transmission 140 is identical with the second transmission unit 62 of the transmission 60 of FIG. 7, except in that the second, third and fourth planetary gear sets 20, 22, 24 and the output gear 26 of the second transmission unit 62 of the present transmission 140 are arranged in this order of description as viewed in the direction from the right toward the left in FIG. 36, while the second, third and fourth planetary gear sets 20, 22, 24 and the output gear 26 of the second transmission unit 62 of the transmission 60 are arranged in this order of description as viewed in the direction from the left toward the right in FIG. 7.

In the transmission 140 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 37 (which is identical with that of FIG. 26). The eight forward drive positions have respective speed ratios γ (=rotational speed $N_{in}$ of input shaft/rotational speed $N_{out}$ of output gear) that change in geometric progression. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 38, five vertical straight lines Y1, Y2, Y3, Y4 and Y5 of the second transmission unit 62 respectively represent: a first rotary element RE1 consisting of the second and third sun gears S2, S3 that are connected to each other; a second rotary element RE2 consisting of the fourth ring gear R4; a third rotary element RE3 consisting of the third ring gear R3 and the fourth carrier CA4 that are connected to each other; a fourth rotary element RE4 consisting of the second and third carriers CA2, CA3 and the fourth sun gear S4 that are connected to each other; and a fifth rotary element RE5 consisting of the second ring gear R2. The collinear chart of FIG. 38 is identical with that of FIG. 27, except for the components of each of the rotary elements.

Figures 39, 40:
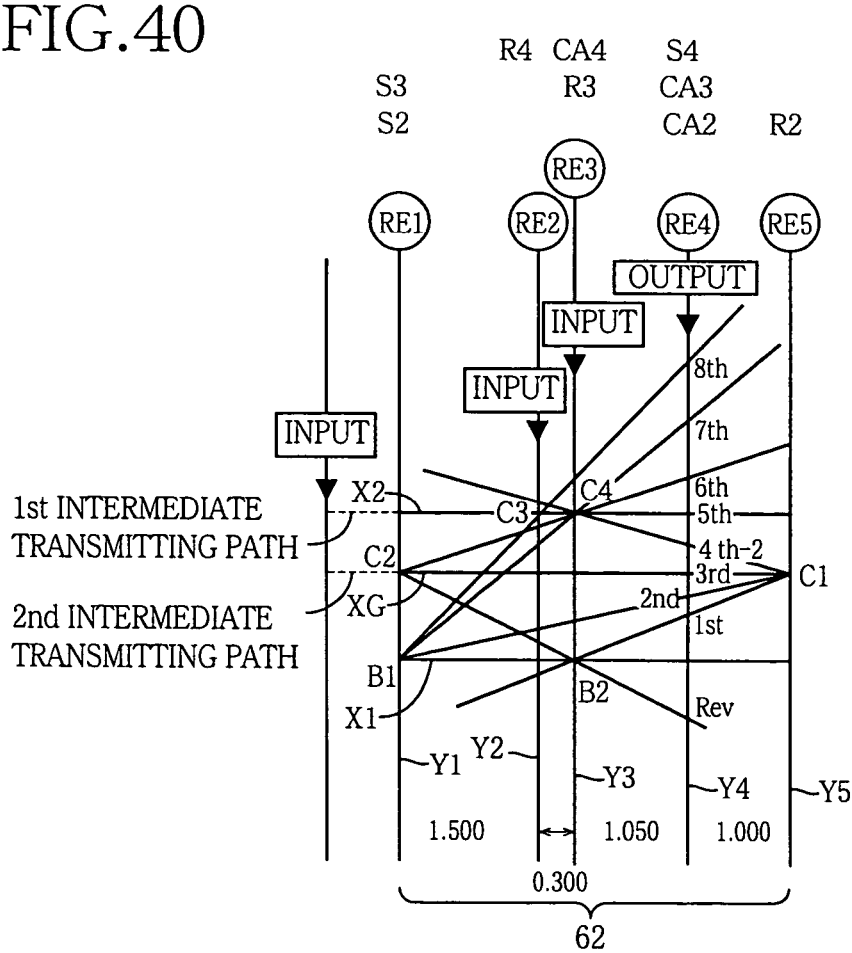
FIG. 39 is a table corresponding to that of FIG. 28, indicating a modified arrangement for the operating position establishment in the multiple-step transmission of FIG. 36.
FIG. 40 is a collinear chart corresponding to that of FIG. 29, showing relative rotational speeds of the plurality of rotary elements in the modified arrangement indicated in FIG. 39.

FIG. 39 is a table corresponding to that of FIG. 37, and indicating a modified arrangement for the operating position establishment in the transmission 140 of FIG. 36. FIG. 40 is a collinear chart showing relative rotational speeds of the rotary elements in the modified arrangement indicated in the table of FIG. 39. A difference between the arrangements of FIG. 39 and FIG. 37 is the same as the difference between the arrangements of FIG. 28 and FIG. 26, and description as to the difference is not provided herein. Similarly, a difference between the arrangements of FIG. 40 and FIG. 38 is the same as the difference between the arrangements of FIG. 29 and FIG. 27, and description as to the difference is not provided herein, either.

Figure 41:
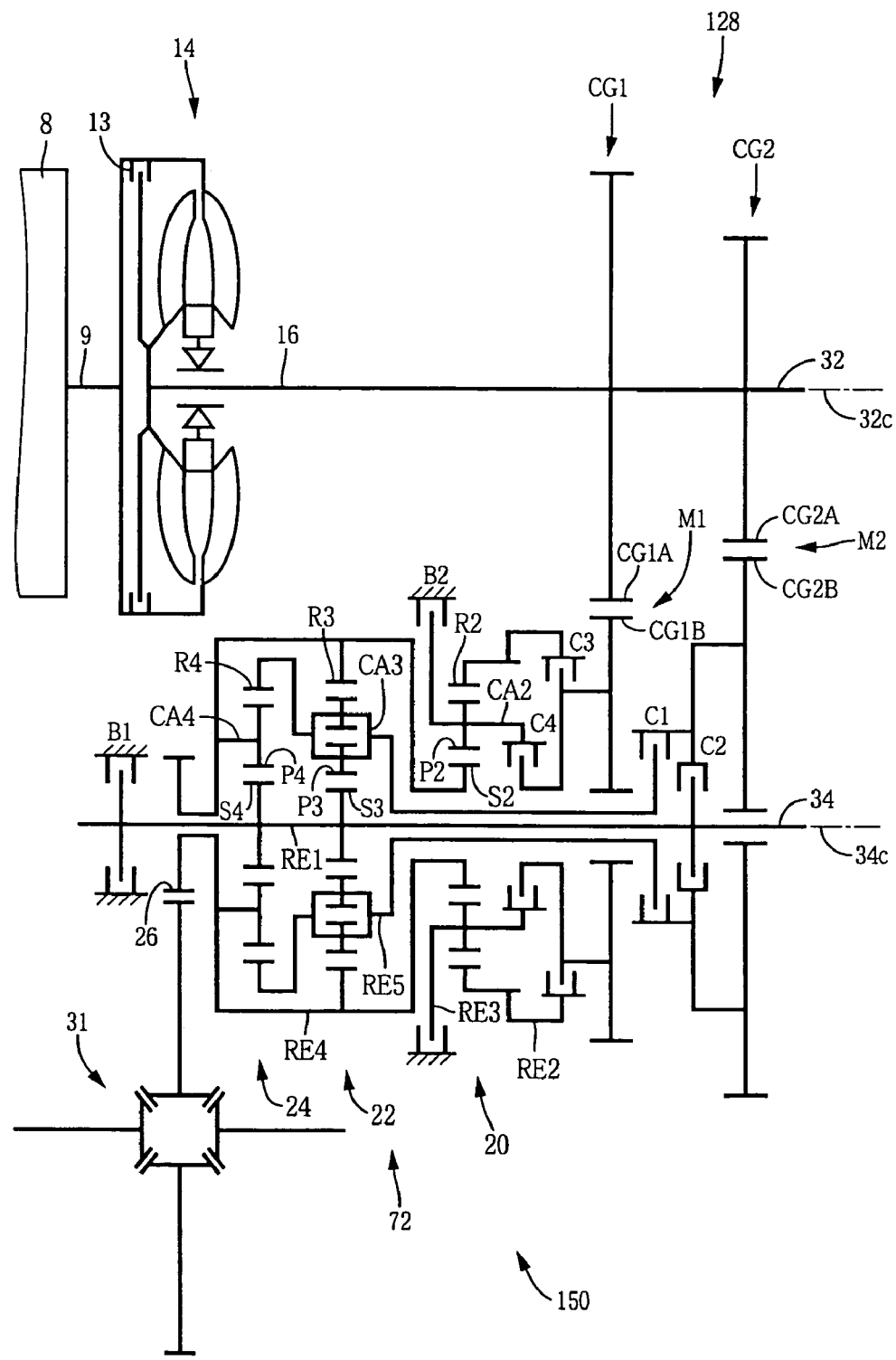
FIG. 41 is a schematic view corresponding to that of FIG. 25, illustrating a basic arrangement of a vehicle planetary-gear-type multiple-step transmission according to a thirteenth embodiment -of the present invention.
Figures 42, 43:
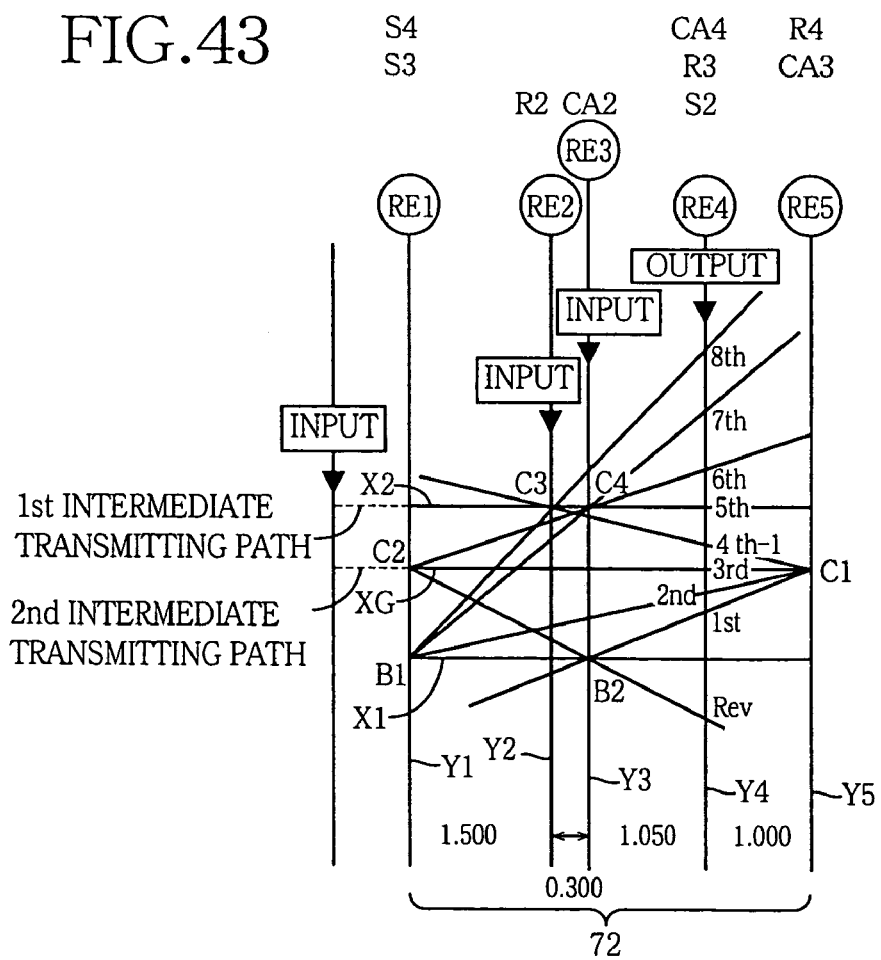
FIG. 42 is a table corresponding to that of FIG. 26, indicating a relationship between operating positions of the multiple-step transmission of FIG. 41 and combinations of operating states of hydraulically operated frictional coupling devices to establish the respective operating positions.
FIG. 43 is a collinear chart corresponding to that of FIG. 27, showing relative rotational speeds of a plurality of rotary elements incorporated in the multiple-step transmission of FIG. 41.

FIG. 41 is a schematic view illustrating a basic arrangement of a transmission 150 constructed according to a thirteenth embodiment of the present invention. FIG. 42 is a table indicating a relationship between operating positions of the transmission 150 and combinations of operating states of hydraulically operated frictional coupling devices to establish the respective operating positions. FIG. 43 is a collinear chart showing relative rotational speeds of a plurality of rotary elements incorporated in the multiple-step transmission 150. The transmission 150 is identical with the above-described transmission 110 shown in FIG. 25, except for construction of its second transmission unit 72, and provides substantially the same advantages as the transmission 110 in the arrangement of FIGS. 25–27.

The second transmission unit 72 of the present transmission 150 is identical with the second transmission unit 72 of the transmission 70 of FIG. 10, except in that the second, third and fourth planetary gear sets 20, 22, 24 and the output gear 26 of the second transmission unit 62 of the present transmission 150 are arranged in this order of description as viewed in the direction from the right toward the left in FIG. 41, while the second, third and fourth planetary gear sets 20, 22, 24 and the output gear 26 of the second transmission unit 62 of the transmission 70 are arranged in this order of description as viewed in the direction from the left toward the right in FIG. 10.

In the transmission 150 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 42 (which is identical with that of FIG. 26). The eight forward drive positions have respective speed ratios γ (=rotational speed $N_{in}$ of input shaft/rotational speed $N_{out}$ of output gear) that change in geometric progression. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 43, five vertical straight lines Y1, Y2, Y3, Y4 and Y5 of the second transmission unit 72 respectively represent: a first rotary element RE1 consisting of the third and fourth sun gears S3, S4 that are connected to each other; a second rotary element RE2 consisting of the second ring gear R2; a third rotary element RE3 consisting of the second carrier CA2; a fourth rotary element RE4 consisting of the second sun gear S2, the third ring gear R3 and the fourth carrier CA4 that are connected to each other; and a fifth rotary element RE5 consisting of the third carrier CA3 and the fourth ring gear R4. The collinear chart of FIG. 43 is identical with that of FIG. 27, except for the components of each of the rotary elements.

Figures 44, 45:
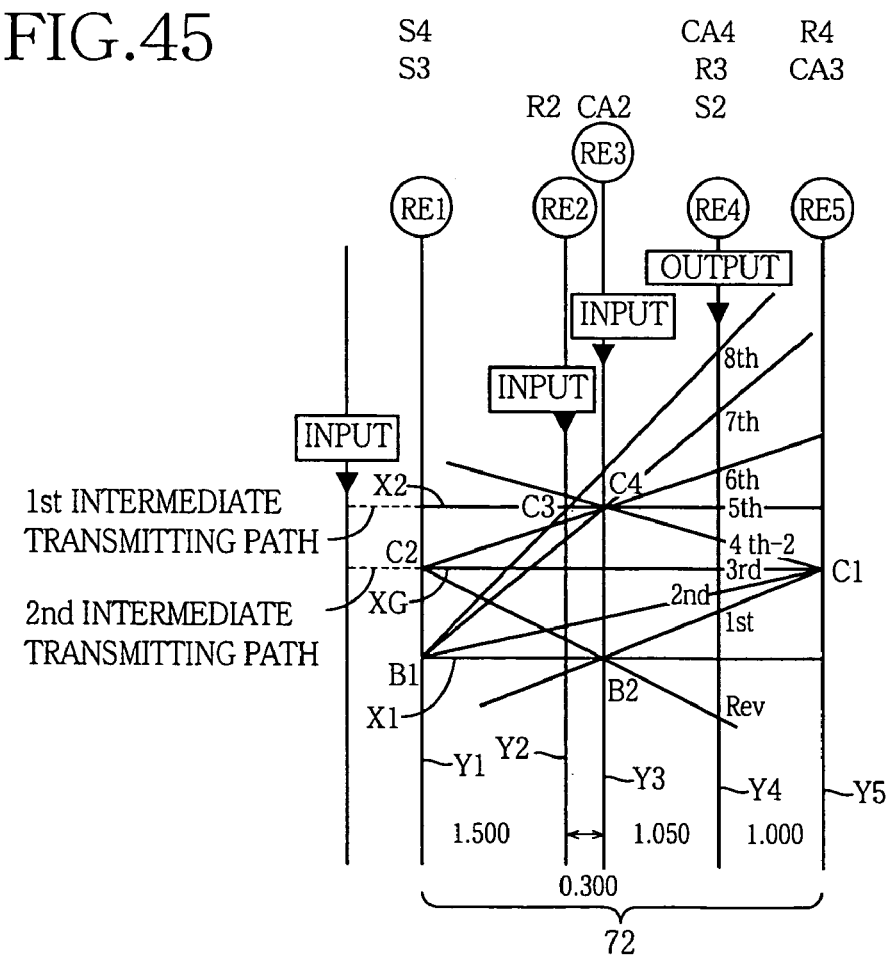
FIG. 44 is a table corresponding to that of FIG. 28, indicating a modified arrangement for the operating position establishment in the multiple-step transmission of FIG. 41.
FIG. 45 is a collinear chart corresponding to that of FIG. 29, showing relative rotational speeds of the plurality of rotary elements in the modified arrangement indicated in FIG. 44.

FIG. 44 is a table corresponding to that of FIG. 42, and indicating a modified arrangement for the operating position establishment in the transmission 150 of FIG. 41. FIG. 45 is a collinear chart showing relative rotational speeds of the rotary elements in the modified arrangement indicated in the table of FIG. 44. A difference between the arrangements of FIG. 44 and FIG. 42 is the same as the difference between the arrangements of FIG. 28 and FIG. 26, and description as to the difference is not provided herein. Similarly, a difference between the arrangements of FIG. 45 and FIG. 43 is the same as the difference between the arrangements of FIG. 29 and FIG. 27, and description as to the difference is not provided herein, either.

Figure 46:
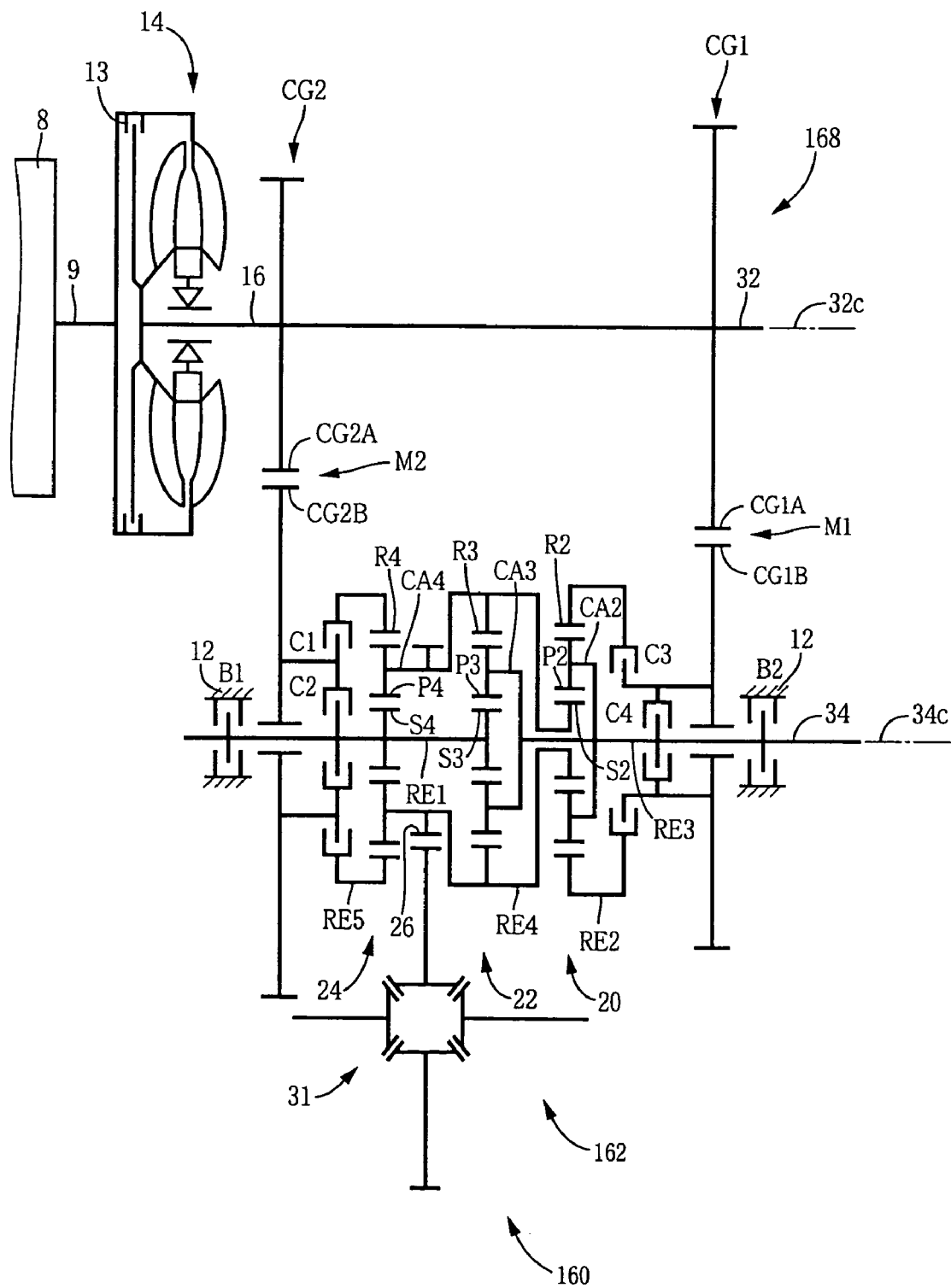
FIG. 46 is a schematic view corresponding to that of FIG. 25, illustrating a basic arrangement of a vehicle planetary-gear-type multiple-step transmission according to a fourteenth embodiment of the present invention.
Figures 47, 48:
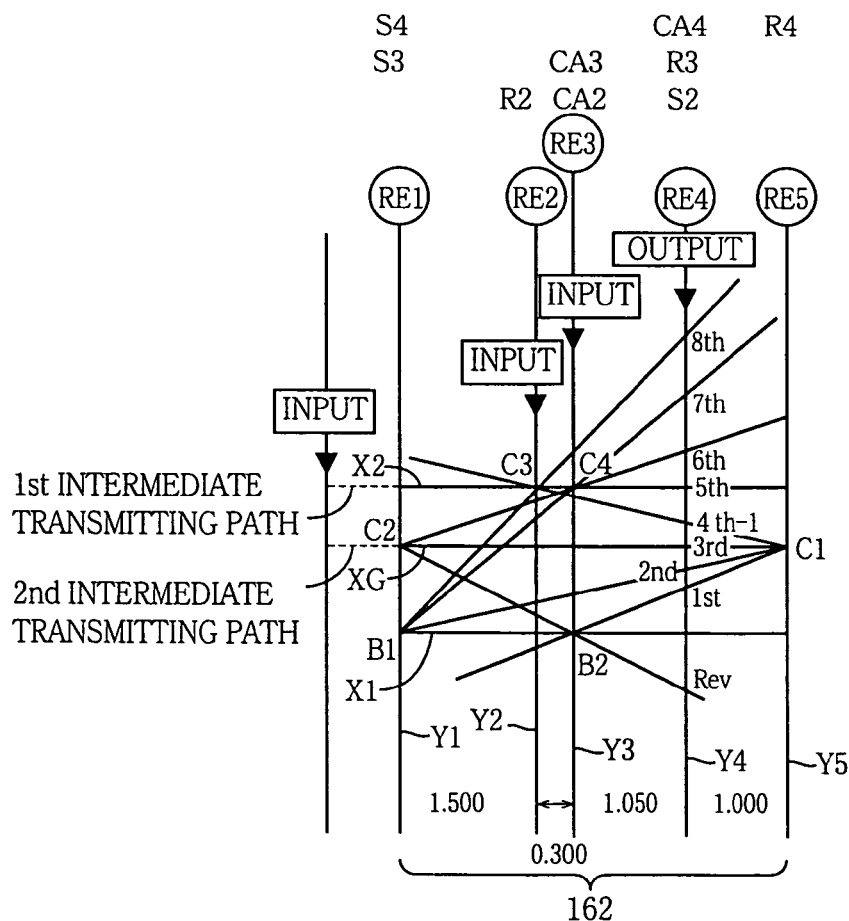
FIG. 47 is a table corresponding to that of FIG. 26, indicating a relationship between operating positions of the multiple-step transmission of FIG. 46 and combinations of operating states of hydraulically operated frictional coupling devices to establish the respective operating positions.
FIG. 48 is a collinear chart corresponding to that of FIG. 27, showing relative rotational speeds of a plurality of rotary elements incorporated in the multiple-step transmission of FIG. 46.

FIG. 46 is a schematic view illustrating a basic arrangement of a transmission 160 constructed according to a fourteenth embodiment of the present invention. FIG. 47 is a table indicating a relationship between operating positions of the transmission 160 and combinations of operating states of hydraulically operated frictional coupling devices to establish the respective operating positions. FIG. 48 is a collinear chart showing relative rotational speeds of a plurality of rotary elements incorporated in the multiple-step transmission 160. The transmission 160 is identical with the above-described transmission 110 shown in FIG. 25, except for construction of its second transmission unit 162 and first transmission unit 168, and provides substantially the same advantages as the transmission 110 in the arrangement of FIGS. 25–27.

In the present transmission 160, as shown in FIG. 46, the first pair of counter gears CG1 and the second pair of counter gears CG2 of the first transmission unit 168 are positioned on respective opposite sides of the second transmission unit 162 as viewed in the direction of the axes 32c, 34c. This arrangement permits the transmission 160 to have a space formed along the first axis 32c between the first pair of counter gears CG1 and the second pair of counter gears CG2, in spite of its axial length which is as small as the axial length of the transmission 110. Therefore, various elements of the hydraulically operating system such as an oil pump and valve bodies can be disposed within this space, thereby facilitating arrangement of a hydraulic circuit required for the transmission 160.

In this fourteenth embodiment, all of the second, third and fourth planetary gear sets 20, 22, 24 of the second transmission unit 162 are of single-pinion type. The second planetary gear set 20 includes a second sun gear S2, a plurality of second planetary gears P2, a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.286. The third planetary gear set 22 includes a third sun gear S3, a plurality of third planetary gears P3, a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.583. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.351.

In the second transmission unit 162, the third and fourth sun gears S3, S4 integrally connected to each other are selectively connected to the second driven gear CG2B through a second clutch C2, while being selectively connected to the transmission casing 12 as the stationary member through a first brake B1. The second ring gear R2 is selectively connected to the first driven gear CG1B through a third clutch C3. The second and third carriers CA2, CA3 integrally connected to each other are selectively connected to the first driven gear CG1B through a fourth clutch C4, while being selectively connected to the transmission casing 12 through a second brake B2. The second sun gear S2, the third ring gear R3 and the fourth carrier CA4 integrally connected to each other are connected to the output gear 26 as the output rotary member. The fourth ring gear R4 is selectively connected to the second driven gear CG2B through a first clutch C1.

In the transmission 160 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 47 (which is identical with that of FIG. 26). The eight forward drive positions have respective speed ratios $\gamma$ (=rotational speed $N_{in}$ of input shaft/rotational speed $N_{out}$ of output gear) that change in geometric progression. Further, a ratio spread, i.e., a ratio ($\gamma_1/\gamma_8$) of the speed ratio $\gamma_1$ of the first-speed position to the speed ratio $\gamma_8$ of the eighth-speed position is comparatively high. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 48, five vertical straight lines Y1, Y2, Y3, Y4 and Y5 of the second transmission unit 162 respectively represent: a first rotary element RE1 consisting of the third and fourth sun gears S3, S4 that are connected to each other; a second rotary element RE2 consisting of the second ring gear R2; a third rotary element RE3 consisting of the second and third carriers CA2, CA3 that are connected to each other; a fourth rotary element RE4 consisting of the second sun gear S2, the third ring gear R3 and the fourth carrier CA4 that are connected to each other; and a fifth rotary element RE5 consisting of the fourth ring gear R4. The collinear chart of FIG. 48 is identical with that of FIG. 27, except for the components of each of the rotary elements.

Figures 49, 50:
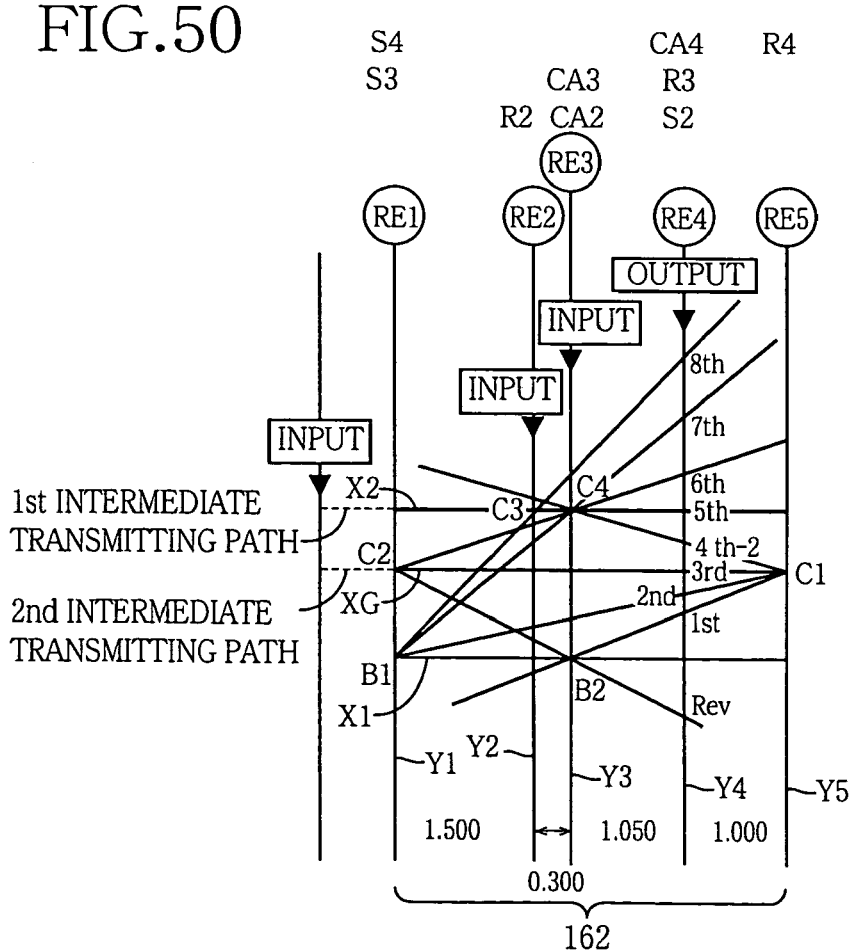
FIG. 49 is a table corresponding to that of FIG. 28, indicating a modified arrangement for the operating position establishment in the multiple-step transmission of FIG. 46.
FIG. 50 is a collinear chart corresponding to that of FIG. 29, showing relative rotational speeds of the plurality of rotary elements in the modified arrangement indicated in FIG. 49.

FIG. 49 is a table corresponding to that of FIG. 47, and indicating a modified arrangement for the operating position establishment in the transmission 160 of FIG. 46. FIG. 50 is a collinear chart showing relative rotational speeds of the rotary elements in the modified arrangement indicated in the table of FIG. 49. A difference between the arrangements of FIG. 49 and FIG. 47 is the same as the difference between the arrangements of FIG. 28 and FIG. 26, and description as to the difference is not provided herein. Similarly, a difference between the arrangements of FIG. 50 and FIG. 48 is the same as the difference between the arrangements of FIG. 29 and FIG. 27, and description as to the difference is not provided herein, either.

Figure 51:
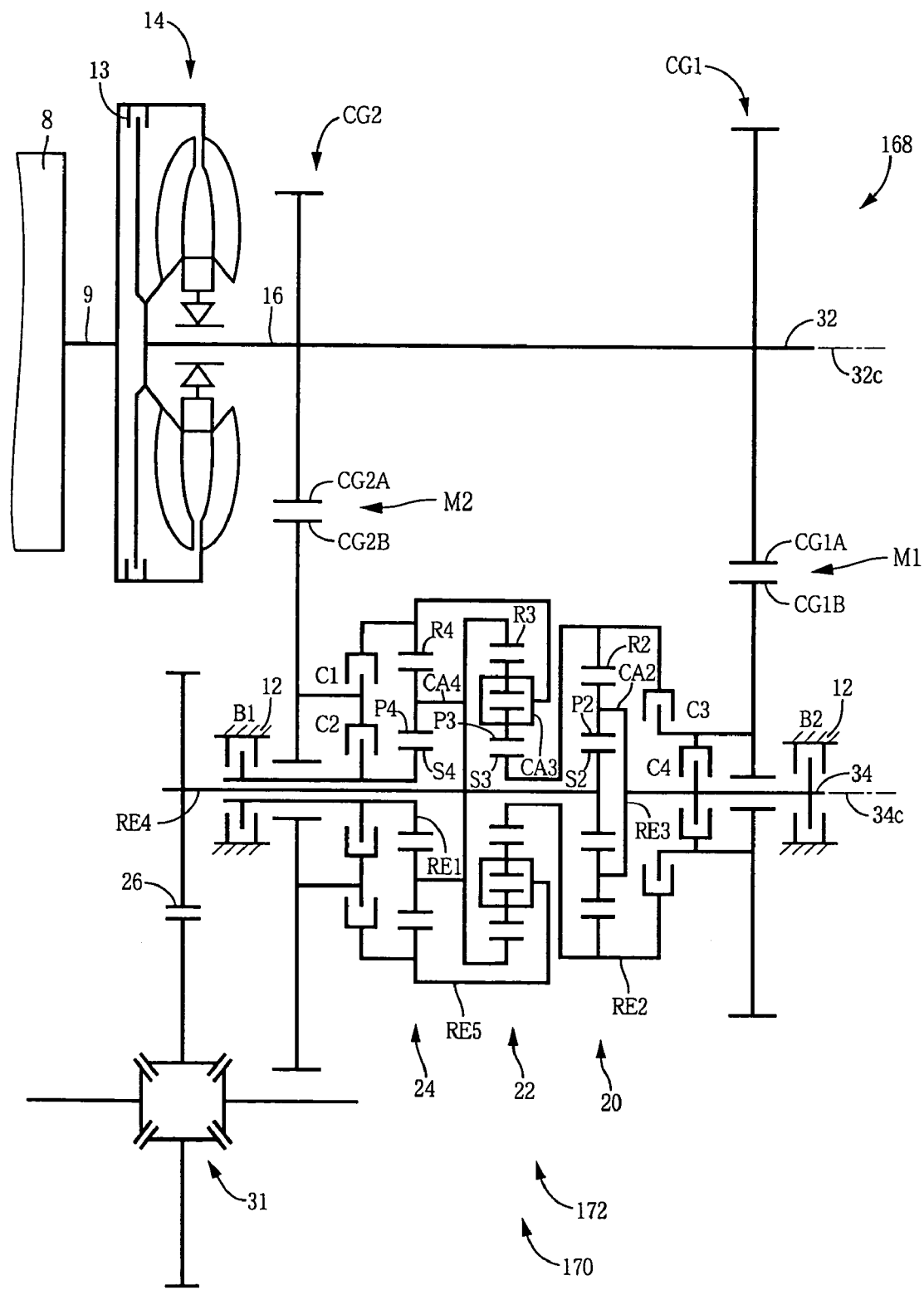
FIG. 51 is a schematic view corresponding to that of FIG. 25, illustrating a basic arrangement of a vehicle planetary-gear-type multiple-step transmission according to a fifteenth embodiment of the present invention.
Figures 52, 53:
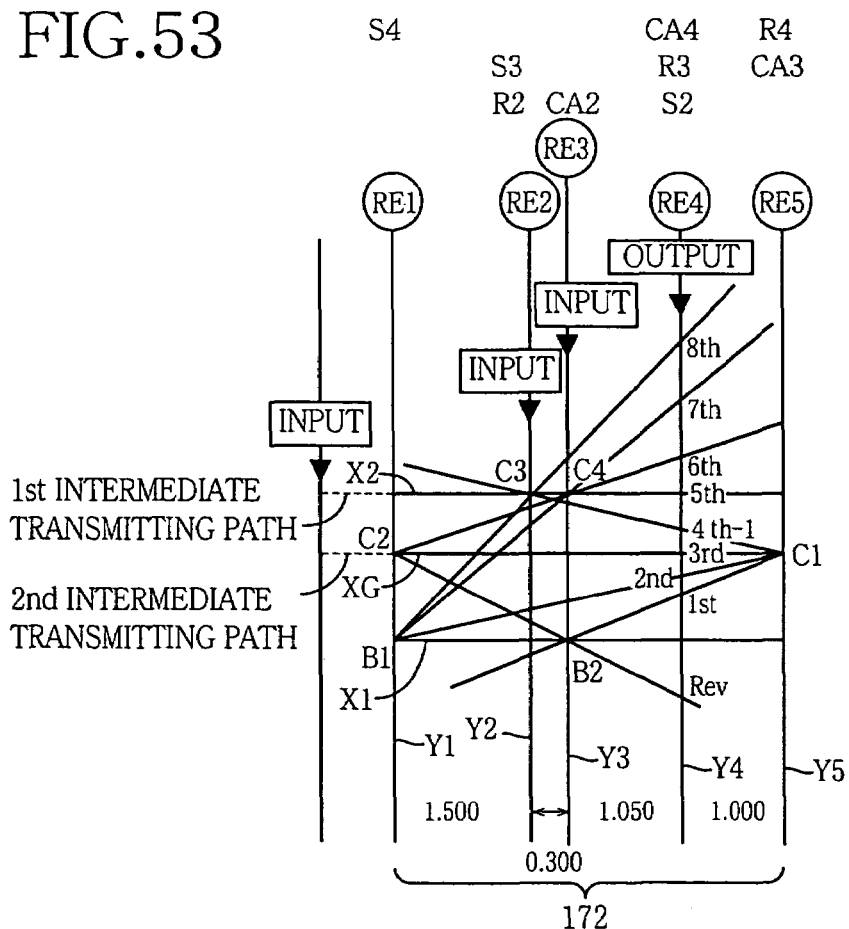
FIG. 52 is a table corresponding to that of FIG. 26, indicating a relationship between operating positions of the multiple-step transmission of FIG. 51 and combinations of operating states of hydraulically operated frictional coupling devices to establish the respective operating positions.
FIG. 53 is a collinear chart corresponding to that of FIG. 27, showing relative rotational speeds of a plurality of rotary elements incorporated in the multiple-step transmission of FIG. 51.

FIG. 51 is a schematic view illustrating a basic arrangement of a transmission 170 constructed according to a fifteenth embodiment of the present invention. FIG. 52 is a table indicating a relationship between operating positions of the transmission 170 and combinations of operating states of hydraulically operated frictional coupling devices to establish the respective operating positions. FIG. 53 is a collinear chart showing relative rotational speeds of a plurality of rotary elements incorporated in the multiple-step transmission 170. The transmission 170 is identical with the above-described transmission 110 shown in FIG. 25, except for construction of its second transmission unit 172 and first transmission unit 168, and provides substantially the same advantages as the transmission 110 in the arrangement of FIGS. 25–27.

In the present transmission 170, as shown in FIG. 51, the first pair of counter gears CG1 and the second pair of counter gears CG2 of the first transmission unit 168 are positioned on respective opposite sides of the second transmission unit 172 as viewed in the direction of the axes 32c, 34c. This arrangement permits the transmission 170 to have a space formed along the first axis 32c between the first pair of counter gears CG1 and the second pair of counter gears CG2, in spite of its axial length which is as small as the axial length of the transmission 110. Therefore, various elements of the hydraulically operating system such as an oil pump and valve bodies can be disposed within this space, thereby facilitating arrangement of a hydraulic circuit required for the transmission 170.

In this fifteenth embodiment, the second and fourth planetary gear sets 20, 24 are of single-pinion type, while the third planetary gear set 22 is of double-pinion type. The second planetary gear set 20 includes a second sun gear S2, a plurality of second planetary gears P2, a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.286. The third planetary gear set 22 includes a third sun gear S3, plural pairs of third planetary gears P3 (each pair of gears P3 mesh with each other), a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.426. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.351.

In the second transmission unit 172, the fourth sun gear S4 is selectively connected to the second driven gear CG2B through a second clutch C2, while being selectively connected to the transmission casing 12 as the stationary member through a first brake B1. The second ring gear R2 and the third sun gear S3 integrally connected to each other are selectively connected to the first driven gear CG1B through a third clutch C3. The second carrier CA2 is selectively connected to the first driven gear CG1B through a fourth clutch C4, while being selectively connected to the transmission casing 12 through a second brake B2. The second sun gear S2, the third ring gear R3 and the fourth carrier CA4 integrally connected to each other are connected to the output gear 26 as the output rotary member. The third carrier CA3 and the fourth ring gear R4 integrally connected to each other are selectively connected to the second driven gear CG2B through a first clutch C1.

In the transmission 170 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 52 (which is identical with that of FIG. 26). The eight forward drive positions have respective speed ratios $\gamma$ (=rotational speed $N_{in}$ of input shaft/ rotational speed $N_{out}$ of output gear) that change in geometric progression. Further, a ratio spread, i.e., a ratio ($\gamma_1/\gamma_8$) of the speed ratio $\gamma_1$ of the first-speed position to the speed ratio $\gamma_8$ of the eighth-speed position is comparatively high. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 53, five vertical straight lines Y1, Y2, Y3, Y4 and Y5 of the second transmission unit 172 respectively represent: a first rotary element RE1 consisting of the fourth sun gear S4; a second rotary element RE2 consisting of the second ring gear R2 and the third sun gear S3 that are connected to each other; a third rotary element RE3 consisting of the second carrier CA2; a fourth rotary element RE4 consisting of the second sun gear S2, the third ring gear R3 and the fourth carrier CA4 that are connected to each other; and a fifth rotary element RE5 consisting of the third carrier CA3 and the fourth ring gear R4 that are connected to each other. The collinear chart of FIG. 53 is identical with that of FIG. 27, except for the components of each of the rotary elements.

Figures 54, 55:
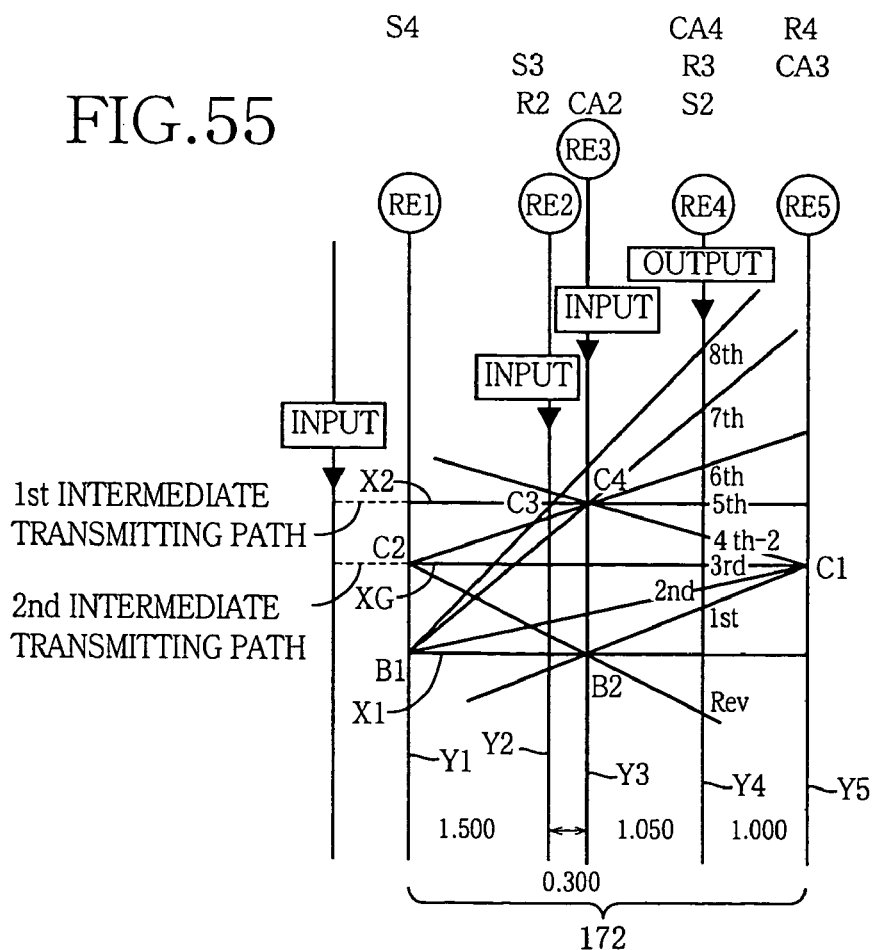
FIG. 54 is a table corresponding to that of FIG. 28, indicating a modified arrangement for the operating position establishment in the multiple-step transmission of FIG. 51.
FIG. 55 is a collinear chart corresponding to that of FIG. 29, showing relative rotational speeds of the plurality of rotary elements in the modified arrangement indicated in FIG. 54.

FIG. 54 is a table corresponding to that of FIG. 52, and indicating a modified arrangement for the operating position establishment in the transmission 170 of FIG. 51. FIG. 55 is a collinear chart showing relative rotational speeds of the rotary elements in the modified arrangement indicated in the table of FIG. 54. A difference between the arrangements of FIG. 54 and FIG. 52 is the same as the difference between the arrangements of FIG. 28 and FIG. 26, and description as to the difference is not provided herein. Similarly, a difference between the arrangements of FIG. 55 and FIG. 53 is the same as the difference between the arrangements of FIG. 29 and FIG. 27, and description as to the difference is not provided herein, either.

Figure 56:
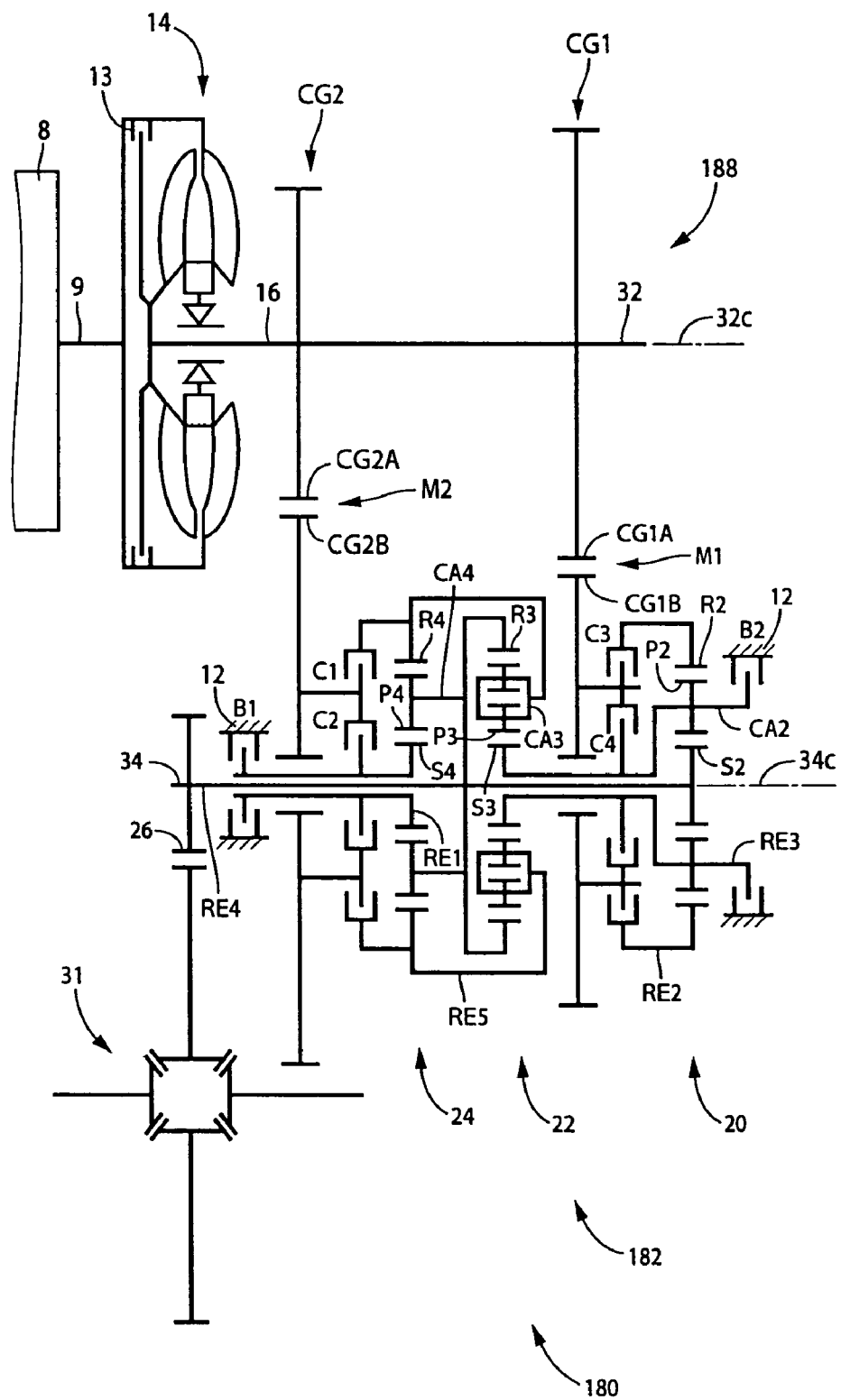
FIG. 56 is a schematic view corresponding to that of FIG. 25, illustrating a basic arrangement of a vehicle planetary-gear-type multiple-step transmission according to a sixteenth embodiment of the present invention.
Figures 57, 58:
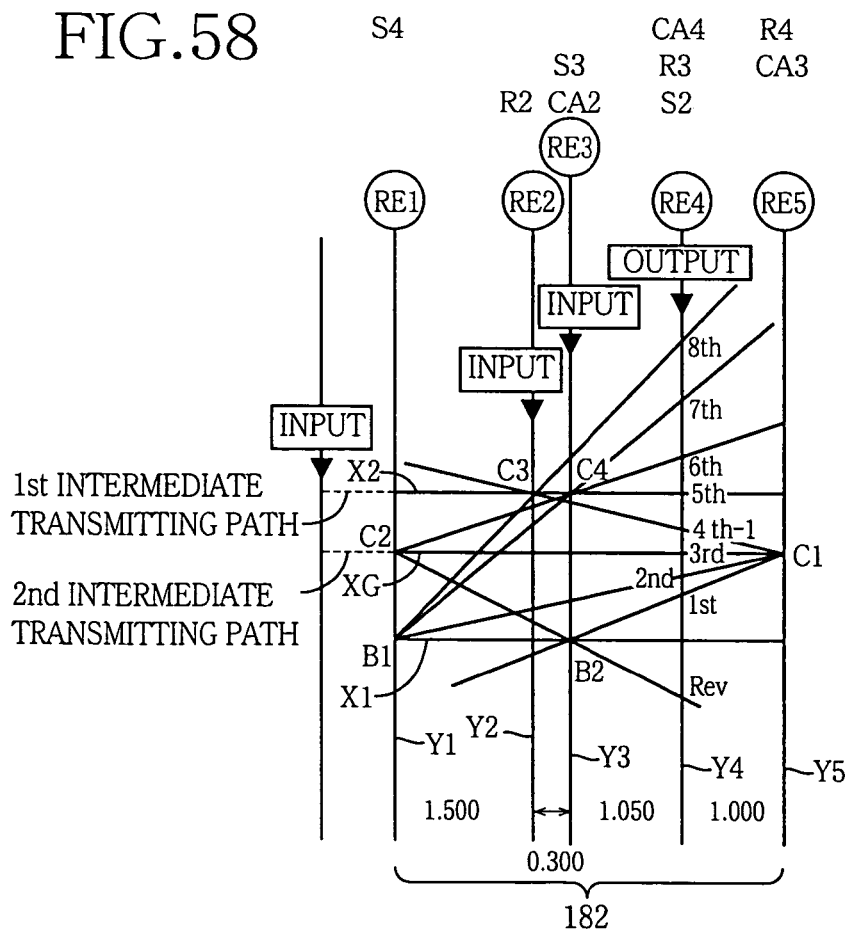
FIG. 57 is a table corresponding to that of FIG. 26, indicating a relationship between operating positions of the multiple-step transmission of FIG. 56 and combinations of operating states of hydraulically operated frictional coupling devices to establish the respective operating positions.
FIG. 58 is a collinear chart corresponding to that of FIG. 27, showing relative rotational speeds of a plurality of rotary elements incorporated in the multiple-step transmission of FIG. 56.

FIG. 56 is a schematic view illustrating a basic arrangement of a transmission 180 constructed according to a sixteenth embodiment of the present invention. FIG. 57 is a table indicating a relationship between operating positions of the transmission 180 and combinations of operating states of hydraulically operated frictional coupling devices to establish the respective operating positions. FIG. 58 is a collinear chart showing relative rotational speeds of a plurality of rotary elements incorporated in the multiple-step transmission 180. The transmission 180 is identical with the above-described transmission 110 shown in FIG. 25, except for construction of its second transmission unit 182 and first transmission unit 188, and provides substantially the same advantages as the transmission 110 in the arrangement of FIGS. 25–27.

In the present transmission 180, as shown in FIG. 56, the first pair of counter gears CG1 and the second pair of counter gears CG2 of the first transmission unit 188 are positioned on respective opposite sides of the second transmission unit 182 as viewed in the direction of the axes 32c, 34c. This arrangement permits the transmission 180 to have a space formed along the first axis 32c between the first pair of counter gears CG1 and the second pair of counter gears CG2, in spite of its axial length which is as small as the axial length of the transmission 110. Therefore, various elements of the hydraulically operating system such as an oil pump and valve bodies can be disposed within this space, thereby facilitating arrangement of a hydraulic circuit required for the transmission 180.

In this sixteenth embodiment, the second and fourth planetary gear sets 20, 24 are of single-pinion type, while the third planetary gear set 22 is of double-pinion type. The second planetary gear set 20 includes a second sun gear S2, a plurality of second planetary gears P2, a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.286. The third planetary gear set 22 includes a third sun gear S3, plural pairs of third planetary gears P3 (each pair of gears P3 mesh with each other), a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.488. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.351.

In the second transmission unit 182, the fourth sun gear S4 is selectively connected to the second driven gear CG2B through a second clutch C2, while being selectively connected to the transmission casing 12 as the stationary member through a first brake B1. The second ring gear R2 is selectively connected to the first driven gear CG1B through a third clutch C3. The second carrier CA2 and the third sun gear S3 integrally connected to each other are selectively connected to the first driven gear CG1B through a fourth clutch C4, while being selectively connected to the transmission casing 12 through a second brake B2. The second sun gear S2, the third ring gear R3 and the fourth carrier CA4 integrally connected to each other are connected to the output gear 26 as the output rotary member. The third carrier CA3 and the fourth ring gear R4 integrally connected to each other are selectively connected to the second driven gear CG2B through a first clutch C1.

In the transmission 180 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 57 (which is identical with that of FIG. 26). The eight forward drive positions have respective speed ratios $\gamma$ (=rotational speed $N_{in}$ of input shaft/rotational speed $N_{out}$ of output gear) that change in geometric progression, as in the arrangement of the ninth embodiment of FIGS. 25–27. Further, a ratio spread, i.e., a ratio ($\gamma_1/\gamma_8$) of the speed ratio $\gamma_1$ of the first-speed position to the speed ratio $\gamma_8$ of the eighth-speed position is comparatively high. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 58, five vertical straight lines Y1, Y2, Y3, Y4 and Y5 of the second transmission unit 182 respectively represent: a first rotary element RE1 consisting of the fourth sun gear S4; a second rotary element RE2 consisting of the second ring gear R2; a third rotary element RE3 consisting of the second carrier CA2 and the third sun gear S3 that are connected to each other; a fourth rotary element RE4 consisting of the second sun gear S2, the third ring gear R3 and the fourth carrier CA4 that are connected to each other; and a fifth rotary element RE5 consisting of the third carrier CA3 and the fourth ring gear R4 that are connected to each other. The collinear chart of FIG. 58 is identical with that of FIG. 27, except for the components of each of the rotary elements.

Figures 59, 60:
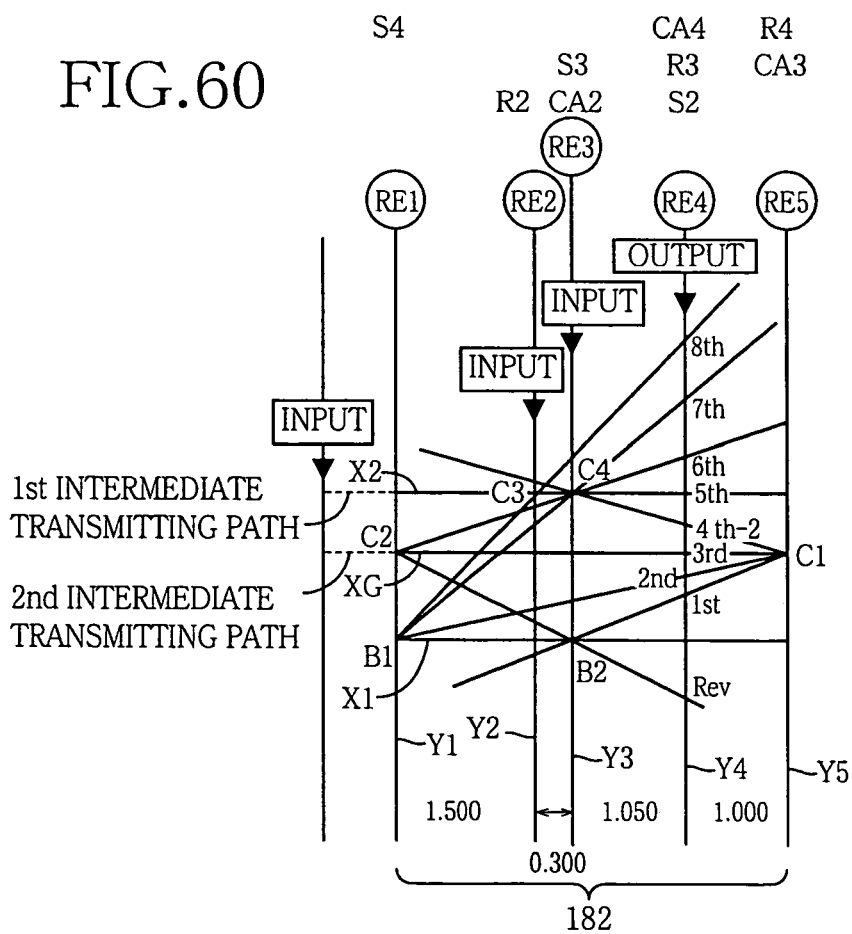
FIG. 59 is a table corresponding to that of FIG. 28, indicating a modified arrangement for the operating position establishment in the multiple-step transmission of FIG. 56.
FIG. 60 is a collinear chart corresponding to that of FIG. 29, showing relative rotational speeds of the plurality of rotary elements in the modified arrangement indicated in FIG. 59.

FIG. 59 is a table corresponding to that of FIG. 57, and indicating a modified arrangement for the operating position establishment in the transmission 180 of FIG. 56. FIG. 60 is a collinear chart showing relative rotational speeds of the rotary elements in the modified arrangement indicated in the table of FIG. 59. A difference between the arrangements of FIG. 59 and FIG. 57 is the same as the difference between the arrangements of FIG. 28 and FIG. 26, and description as to the difference is not provided herein. Similarly, a difference between the arrangements of FIG. 60 and FIG. 58 is the same as the difference between the arrangements of FIG. 29 and FIG. 27, and description as to the difference is not provided herein, either.

Figure 61:
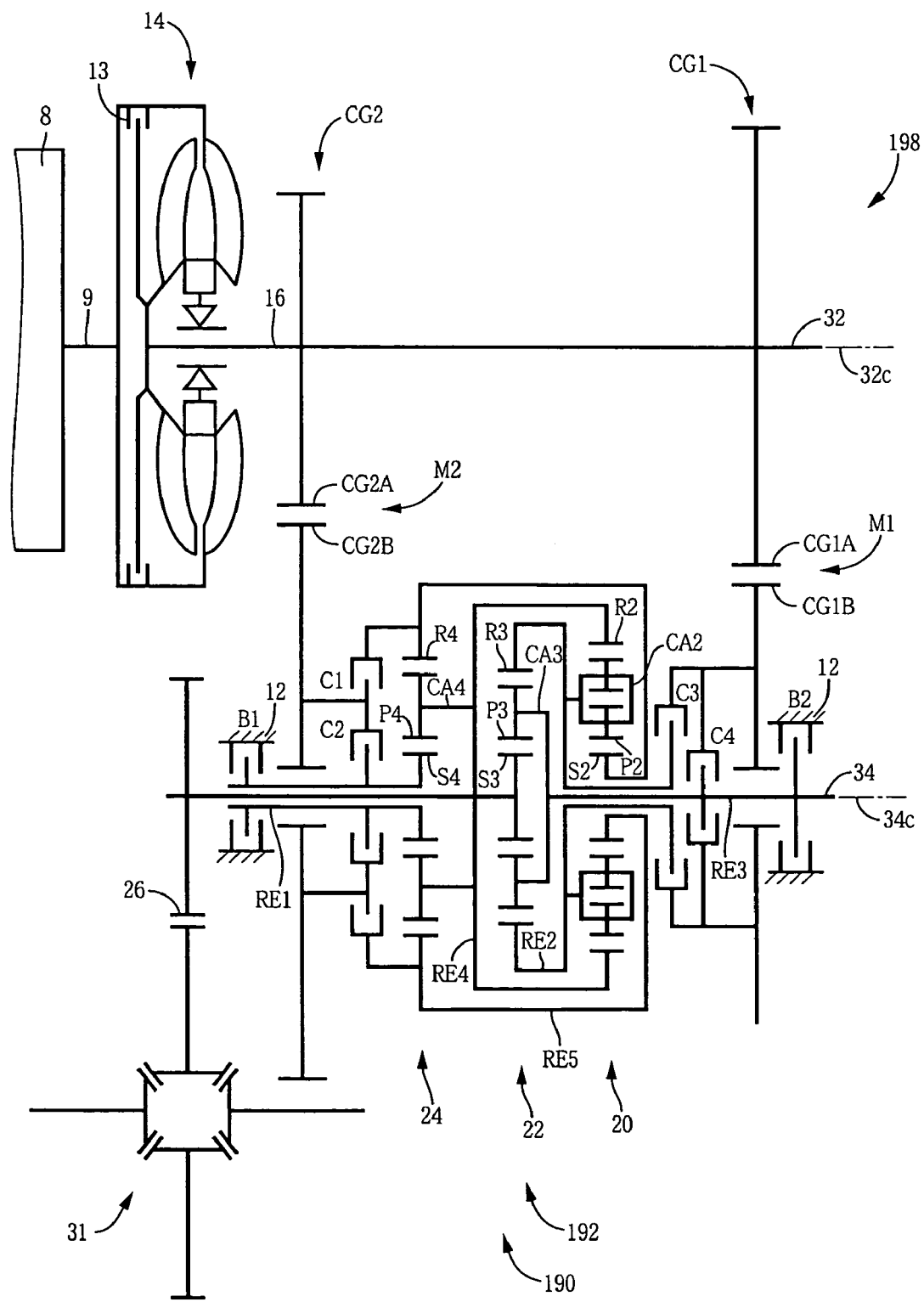
FIG. 61 is a schematic view corresponding to that of FIG. 25, illustrating a basic arrangement of a vehicle planetary-gear-type multiple-step transmission according to a seventeenth embodiment of the present invention.
Figures 62, 63:
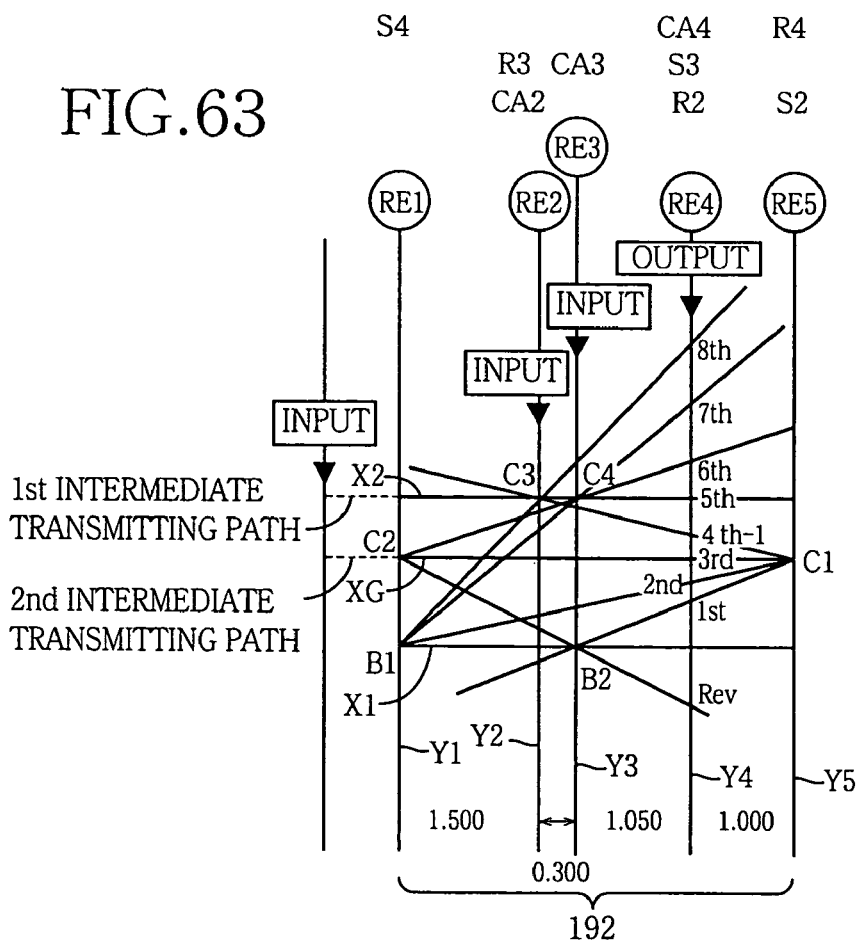
FIG. 62 is a table corresponding to that of FIG. 26, indicating a relationship between operating positions of the multiple-step transmission of FIG. 61 and combinations of operating states of hydraulically operated frictional coupling devices to establish the respective operating positions.
FIG. 63 is a collinear chart corresponding to that of FIG. 27, showing relative rotational speeds of a plurality of rotary elements incorporated in the multiple-step transmission of FIG. 61.

FIG. 61 is a schematic view illustrating a basic arrangement of a transmission 190 constructed according to a seventeenth embodiment of the present invention. FIG. 62 is a table indicating a relationship between operating positions of the transmission 190 and combinations of operating states of hydraulically operated frictional coupling devices to establish the respective operating positions. FIG. 63 is a collinear chart showing relative rotational speeds of a plurality of rotary elements incorporated in the multiple-step transmission 190. The transmission 190 is identical with the above-described transmission 110 shown in FIG. 25, except for construction of its second transmission unit 192 and first transmission unit 198, and provides substantially the same advantages as the transmission 110 in the arrangement of FIGS. 25–27.

In the present transmission 190, as shown in FIG. 61, the first pair of counter gears CG1 and the second pair of counter gears CG2 of the first transmission unit 198 are positioned on respective opposite sides of the second transmission unit 192 as viewed in the direction of the axes 32c, 34c. This arrangement permits the transmission 190 to have a space formed along the first axis 32c between the first pair of counter gears CG1 and the second pair of counter gears CG2, in spite of its axial length which is as small as the axial length of the transmission 110. Therefore, various elements of the hydraulically operating system such as an oil pump and valve bodies can be disposed within this space, thereby facilitating arrangement of a hydraulic circuit required for the transmission 190.

In this seventeenth embodiment, the second planetary gear set 20 is of double-pinion type, while the third and fourth planetary gear sets 22, 24 are of single-pinion type. The second planetary gear set 20 includes a second sun gear S2, plural pairs of second planetary gears P2 (each pair of gears P2 mesh with each other), a second carrier CA2 supporting the second planetary gears P2 (such that the second planetary gears P2 are rotatable about their respective axes and are rotatable about the axis of the second sun gear S2), and a second ring gear R2 meshing with the second sun gear S2 through the second planetary gears P2. The second planetary gear set 20 has a predetermined gear ratio $\rho_2$, for instance, about 0.574. The third planetary gear set 22 includes a third sun gear S3, a plurality of third planetary gears P3, a third carrier CA3 supporting the third planetary gears P3 (such that the third planetary gears P3 are rotatable about their respective axes and are rotatable about the axis of the third sun gear S3), and a third ring gear R3 meshing with the third sun gear S3 through the third planetary gears P3. The third planetary gear set 22 has a predetermined gear ratio $\rho_3$, for instance, about 0.286. The fourth planetary gear set 24 includes a fourth sun gear S4, a plurality of fourth planetary gears P4, a fourth carrier CA4 supporting the fourth planetary gears P4 (such that the fourth planetary gears P4 are rotatable about their respective axes and are rotatable about the axis of the fourth sun gear S4), and a fourth ring gear R4 meshing with the fourth sun gear S4 through the fourth planetary gears P4. The fourth planetary gear set 24 has a predetermined gear ratio $\rho_4$, for instance, about 0.351.

In the second transmission unit 192, the fourth sun gear S4 is selectively connected to the second driven gear CG2B through a second clutch C2, while being selectively connected to the transmission casing 12 as the stationary member through a first brake B1. The second carrier CA2 and the third ring gear R3 integrally connected to each other are selectively connected to the first driven gear CG1B through a third clutch C3. The third carrier CA3 is selectively connected to the first driven gear CG1B through a fourth clutch C4, while being selectively connected to the transmission casing 12 through a second brake B2. The second ring gear R2, the third sun gear S3 and the fourth carrier CA4 integrally connected to each other are connected to the output gear 26 as the output rotary member. The second sun gear S2 and the fourth ring gear R4 integrally connected to each other are selectively connected to the second driven gear CG2B through a first clutch C1.

In the transmission 190 constructed as described above, a selected one of eight forward drive positions and a rear drive position is established by simultaneous engaging actions of a corresponding combination of two frictional coupling devices selected from the first, second, third and fourth clutches C1–C4 and the first and second brakes B1, B2, as shown in the table of FIG. 67 (which is identical with that of FIG. 26). The eight forward drive positions have respective speed ratios $\gamma$ (=rotational speed $N_{in}$ of input shaft/rotational speed $N_{out}$ of output gear) that change in geometric progression, as in the arrangement of the ninth embodiment of FIGS. 25–27. Further, a ratio spread, i.e., a ratio ($\gamma_1/\gamma_8$) of the speed ratio $\gamma_1$ of the first-speed position to the speed ratio $\gamma_8$ of the eighth-speed position is comparatively high. The reduction gear ratio of the first pair of counter gears CG1, the reduction gear ratio of the second pair of counter gears CG2, the gear ratio $\rho_2$ of the second planetary gear set 20, the gear ratio $\rho_3$ of the third planetary gear set 22 and the gear ratio $\rho_4$ of the fourth planetary gear set 24 are determined to establish the above-indicated speed ratios of the forward drive positions and the rear drive position.

In the collinear chart of FIG. 63, five vertical straight lines Y1, Y2, Y3, Y4 and Y5 of the second transmission unit 192 respectively represent: a first rotary element RE1 consisting of the fourth sun gear S4; a second rotary element RE2 consisting of the second carrier CA2 and the third ring gear R3 that are connected to each other; a third rotary element RE3 consisting of the third carrier CA3; a fourth rotary element RE4 consisting of the second ring gear R2, the third sun gear R3 and the fourth carrier CA4 that are connected to each other; and a fifth rotary element RE5 consisting of the second sun gear S2 and the fourth ring gear R4 that are connected to each other. The collinear chart of FIG. 63 is identical with that of FIG. 27, except for the components of each of the rotary elements.

Figures 64, 65:
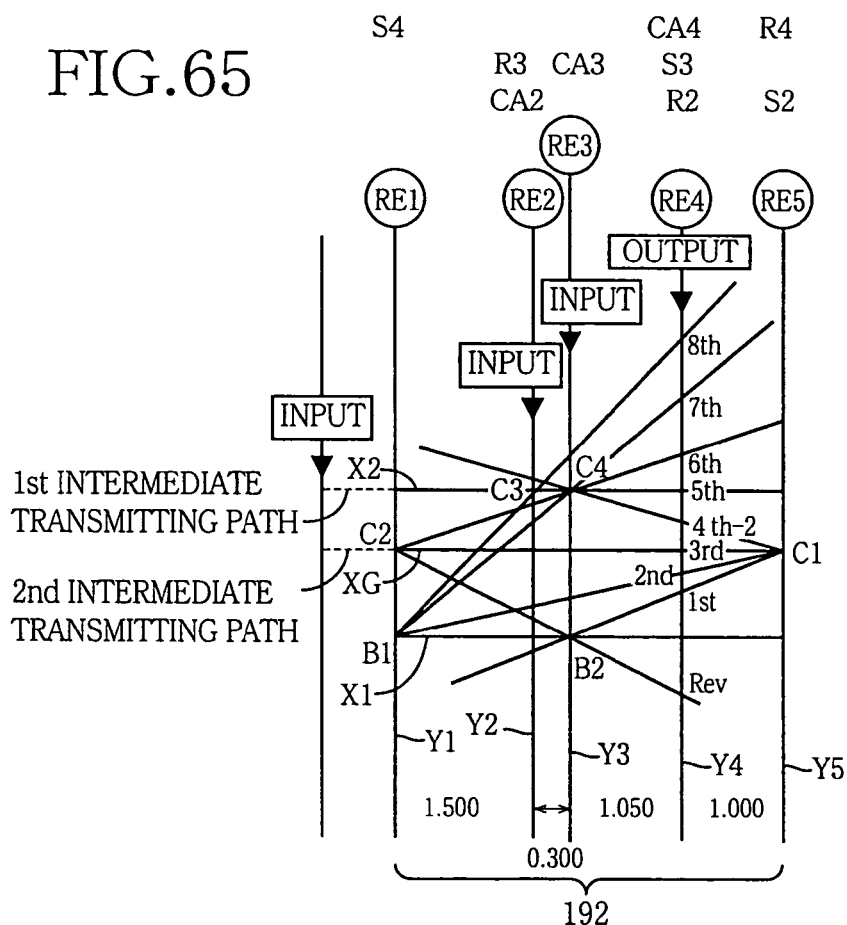
FIG. 64 is a table corresponding to that of FIG. 28, indicating a modified arrangement for the operating position establishment in the multiple-step transmission of FIG. 61.
FIG. 65 is a collinear chart corresponding to that of FIG. 29, showing relative rotational speeds of the plurality of rotary elements in the modified arrangement indicated in FIG. 64.

FIG. 64 is a table corresponding to that of FIG. 62, and indicating a modified arrangement for the operating position establishment in the transmission 190 of FIG. 61. FIG. 65 is a collinear chart showing relative rotational speeds of the rotary elements in the modified arrangement indicated in the table of FIG. 64. A difference between the arrangements of FIG. 64 and FIG. 62 is the same as the difference between the arrangements of FIG. 28 and FIG. 26, and description as to the difference is not provided herein. Similarly, a difference between the arrangements of FIG. 65 and FIG. 63 is the same as the difference between the arrangements of FIG. 29 and FIG. 27, and description as to the difference is not provided herein, either.

While the preferred embodiments of this invention have been described above in detail by reference to the drawings, for illustrative purpose only, it is to be understood that the present invention may be otherwise embodied.

In the illustrated embodiments described above, each of the transmissions 10, 50, 60, 70, 110, 120, 130, 140, 150, 160, 170, 180, 190 has the eight forward drive positions consisting of the first-speed, second-speed, third-speed, fourth-speed, fifth-speed, sixth-speed, seventh-speed and eighth-speed positions. However, the number of the forward drive positions does not necessarily have to be eight, but may be seven. The seven forward drive positions may consist of the first-speed through seven-speed positions, or the second-speed through eighth-speed positions.

In the illustrated embodiments described above, the torque converter 14 of each of the transmissions 10, 50, 60, 70, 110, 120, 130, 140, 150, 160, 170, 180, 190 is constantly connected to the engine 8 through the crankshaft 9. However, the torque converter 14 may be operatively connected to the engine 8, for example, through suitable gears or belts. Further, the torque converter 14 does not have to be disposed coaxially with the engine 8. Still further, the engine 8 may be replaced with an electric motor or other power drive source.

Although the power transmitting members of each of the first transmission units 128, 168, 188, 198 are constituted by the counter gears CG1, CG2 in the illustrated embodiments described above, the power transmitting members may be constituted by pulleys mounted on the first and second shafts 32, 34, and belts connecting the pulleys.

In each of the transmissions 10, 50, 60, 70, 110, 120, 130, 140, 150, 160, 170, 180, 190, a one-way clutch may be disposed in series with or in parallel with one of the first through fourth clutches C1–C4 and first and second brakes B1, B2. The provision of the one-way clutch permits easier control of shifting actions of the transmission. For example, the one-way clutch may be disposed in parallel with the second brake B2, so that the first-speed position is established by engaging only the first clutch C1. Further, the one-way clutch may be provided in place of one of the first through fourth clutches C1–C4 and first and second brakes B1, B2. In this arrangement, too, the control of shifting actions of the transmission can be made.

In the illustrated embodiments, the torque converter 14 as the hydraulic transmission unit, which is disposed between the engine 8 and the input shaft 16, is equipped with the lock-up clutch 13. However, the torque converter 14 does not have to be equipped with the lock-up clutch 13. Further, the torque converter 14 may be replaced by a fluid coupling, an electromagnetic clutch of magnetic particle type, or a hydraulically operated clutch of multiple- or single-disc type.

In the collinear charts used to explain the illustrated embodiments, the vertical straight lines Y1, Y2, Y3, Y4 and Y5 corresponding to the respective rotary elements RE1, RE2, RE3, RE4 and RE5 are arranged in a spaced-apart relationship in the direction from the left toward the right. However, these vertical straight lines may be arranged in the direction from the right toward the left. While the horizontal straight line X2 corresponding to the rotating speed of "1.0" is located above the horizontal straight line X1 corresponding to the rotating speed of "0", the horizontal straight line X2 may be located below the horizontal straight line X1.

In the illustrated embodiments, the first planetary gear set 18 is of double-pinion type, and includes the first sun gear S1, the first carrier CA1 and the first ring gear R1, such that the first carrier CA1 is connected to the input shaft 16 and the first intermediate transmitting path M1, such that the first sun gear S1 is fixed to the transmission casing 12 so as to be unrotatable, and such that the first ring gear R1 is connected to the second intermediate transmitting path M2, whereby the rotary motion of the input shaft 16 is transmitted to the second transmission unit 30, 52, 62, 72 through the two different intermediate transmitting paths M1, M2. However, the connections may be modified such that the first sun gear S1 is connected to the input shaft 16 and the first intermediate transmitting path M1, such that the first carrier CA1 is fixed to the transmission casing 12 so as to be unrotatable, and such that the first ring gear R1 is connected to the second intermediate transmitting path M2.

While the first planetary gear set 18 is of double-pinion type in the illustrated embodiments, the first planetary gear set 18 may of single-pinion type. Where the first planetary gear set 18 is of single-pinion type, one of the sun gear and ring gear S1, R1 is connected to the input shaft 16 and the first intermediate transmitting path M1, the other of the sun gear and ring gear S1, R1 is fixed to the transmission casing 12 so as to be unrotatable, and the carrier CA1 is connected to the second intermediate transmitting path M2, whereby the rotary motion of the input shaft 16 is transmitted to the second transmission unit 30, 52, 62, 72 through the two different intermediate transmitting paths M1, M2. Further, a planetary gear P1 supported by the carrier CA1 of the first planetary gear set 18 of single-pinion type may be provided by a stepped pinion having a large diameter portion and a small diameter portion.

In the illustrated embodiments, the clutches C1–C4 and the brakes B1, B2 as the coupling devices of each of the transmissions 10, 50, 60, 70, 110, 120, 130, 140, 150, 160, 170, 180, 190 are provided by the hydraulically operated frictional coupling devices. However, the coupling devices may be provided by magnetically operated coupling devices such as electromagnetic clutches and magnetic particle type clutches.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A planetary-gear-type multiple-step transmission for a vehicle, having a plurality of drive positions which are selectively established, said transmission comprising:
    a stationary member;
    an input rotary member;
    an output rotary member;
    a first transmission unit which is connected to said input rotary member; and
    a second transmission unit which is connected to said output rotary member,
    wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path,
    wherein said second transmission unit includes three planetary gear sets each having a sun gear, a carrier and a ring gear, said second transmission unit further including first and second brakes, and first, second, third and fourth clutches,
    wherein said second transmission unit constitutes first, second, third, fourth and fifth rotary elements, each of which is provided by at least one of the sun gears, carriers and ring gears of said three planetary gear sets,
    wherein said first rotary element is selectively connected to said second intermediate transmitting path through said second clutch, while being selectively connected to said stationary member through said first brake,
    wherein said second rotary element is selectively connected to said first intermediate transmitting path through said third clutch,
    wherein said third rotary element is selectively connected to said first intermediate transmitting path through said fourth clutch, while being selectively connected to said stationary member through said second brake,
    wherein said fourth rotary element is connected to said output rotary member,
    wherein said fifth rotary element is selectively connected to said second intermediate transmitting path through said first clutch,
    and wherein said plurality of drive positions are established by selectively engaging and releasing said brakes and said clutches.

2. The planetary-gear-type multiple-step transmission according to claim 1, having at least seven forward drive positions, which are established by selectively engaging and releasing said brakes and said clutches.

3. The planetary-gear-type multiple-step transmission according to claim 1, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position,
    wherein said first-speed position is established by engaging said first clutch and said second brake,
    wherein said second-speed position is established by engaging said first clutch and said first brake,
    wherein said third-speed position is established by engaging said first clutch and said second clutch,
    wherein said fourth-speed position is established by engaging said first clutch and one of said third and fourth clutches,
    wherein said fifth-speed position is established by engaging said third clutch and said fourth clutch,
    wherein said sixth-speed position is established by engaging said second clutch and said fourth clutch,
    wherein said seventh-speed position is established by engaging said fourth clutch and said first brake,
    and wherein said eighth-speed position is established by engaging said third clutch and said first brake.

4. The planetary-gear-type multiple-step transmission according to claim 1,
    wherein said three planetary gear sets consist of second, third and fourth planetary gear sets which are disposed coaxially with each other, such that said third planetary gear set is disposed between said second and fourth planetary gear sets,
    wherein said second planetary gear set is a double-pinion type planetary gear set, and includes a second sun gear, a second carrier, a second ring gear and at least one pair of planetary gears which are rotatably held by said second carrier and which mesh with each other, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said first rotary element includes said second sun gear and said fourth sun gear, wherein said second rotary element includes said third ring gear, wherein said third rotary element includes said second ring gear, said third carrier and said fourth carrier, wherein said fourth rotary element includes said third sun gear and said fourth ring gear, and wherein said fifth rotary element includes said second carrier.

5. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a double-pinion type planetary gear set, and includes a second sun gear, a second carrier, a second ring gear and at least one pair of planetary gears which are rotatably held by said second carrier and which mesh with each other, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said first rotary element includes said second carrier and said fourth sun gear, wherein said second rotary element includes said third ring gear, wherein said third rotary element includes said second ring gear, said third carrier and said fourth carrier, wherein said fourth rotary element includes said third sun gear and said fourth ring gear, and wherein said fifth rotary element includes said second sun gear.

6. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said third carrier and which mesh with each other, wherein said fourth planetary gear set is a single-pinion type planetary gear set, and includes a fourth sun gear, a fourth carrier and a fourth ring gear, wherein said first rotary element includes said second sun gear and said third sun gear, wherein said second rotary element includes said fourth ring gear, wherein said third rotary element includes said third ring gear and said fourth carrier, wherein said fourth rotary element includes said second carrier, said third carrier and said fourth sun gear, and wherein said fifth rotary element includes said second ring gear.

7. The planetary-gear-type multiple-step transmission according to claim 6, wherein said three planetary gear sets of said second transmission unit has a common carrier, a common sun gear and a common planetary gear, wherein said common carrier constitutes said second carrier and said third carrier, wherein said common sun gear constitutes said second sun gear and said third sun gear, and wherein said common planetary gear constitutes one of each pair of said at least one pair of planetary gears, and a planetary gear held by said second carrier.

8. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said third carrier and which mesh with each other, wherein said fourth planetary gear set is a single-pinion type planetary gear set, and includes a fourth sun gear, a fourth carrier and a fourth ring gear, wherein said first rotary element includes said third sun gear and said fourth sun gear, wherein said second rotary element includes said second ring gear, wherein said third rotary element includes said second carrier, wherein said fourth rotary element includes said second sun gear, said third ring gear and said fourth carrier, and wherein said fifth rotary element includes said third carrier and said fourth ring gear.

9. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a single-pinion type planetary gear set, and includes a second sun gear, a second carrier and a second ring gear, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said first rotary element includes said third sun gear and said fourth sun gear, wherein said second rotary element includes said second ring gear, wherein said third rotary element includes said second carrier and said third carrier, wherein said fourth rotary element includes said second sun gear, said third ring gear and said fourth carrier, and wherein said fifth rotary element includes said fourth ring gear.

10. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said third carrier and which mesh with each other, wherein said fourth planetary gear set is a single-pinion type planetary gear set, and includes a fourth sun gear, a fourth carrier and a fourth ring gear, wherein said first rotary element includes said fourth sun gear, wherein said second rotary element includes said second ring gear and said third sun gear, wherein said third rotary element includes said second carrier, wherein said fourth rotary element includes said second sun gear, said third ring gear and said fourth carrier, and wherein said fifth rotary element includes said third carrier and said fourth ring gear.

11. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said third carrier and which mesh with each other, wherein said fourth planetary gear set is a single-pinion type planetary gear set, and includes a fourth sun gear, a fourth carrier and a fourth ring gear, wherein said first rotary element includes said fourth sun gear, wherein said second rotary element includes said second ring gear, wherein said third rotary element includes said second carrier and said third sun gear, wherein said fourth rotary element includes said second sun gear, said third ring gear and said fourth carrier, and wherein said fifth rotary element includes said third carrier and said fourth ring gear.

12. The planetary-gear-type multiple-step transmission according to claim 1, wherein said three planetary gear sets consist of second, third and fourth planetary gear sets which are disposed coaxially with each other, such that said third planetary gear set is disposed between said second and fourth planetary gear sets, wherein said second planetary gear set is a double-pinion type planetary gear set, and includes a second sun gear, a second carrier, a second ring gear and at least one pair of planetary gears which are rotatably held by said second carrier and which mesh with each other, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said first rotary element includes said fourth sun gear, wherein said second rotary element includes said second carrier and said third ring gear, wherein said third rotary element includes said third carrier, wherein said fourth rotary element includes said second ring gear, said third sun gear and said fourth carrier, and wherein said fifth rotary element includes said second sun gear and said fourth ring gear.

13. The planetary-gear-type multiple-step transmission according to claim 1, wherein said first transmission unit has a first planetary gear set including a first sun gear, a first carrier and a first ring gear, wherein one of said first sun gear, carrier and ring gear is connected to said input rotary member and said first intermediate transmitting path, wherein another of said first sun gear, carrier and ring gear is fixed to said stationary member so as to be unrotatable, and wherein still another of said first sun gear, carrier and ring gear is connected to said second intermediate transmitting path.

14. The planetary-gear-type multiple-step transmission according to claim 13, wherein said first planetary gear set is a double-pinion type planetary gear set, and further includes at least one pair of planetary gears which are rotatably held by said first carrier and which mesh with each other, wherein said first carrier is connected to said input rotary member and said first intermediate transmitting path, wherein said first sun gear is fixed to said stationary member so as to be unrotatable, and wherein said first ring gear is connected to said second intermediate transmitting path.

15. A planetary-gear-type multiple-step transmission for a vehicle, having a plurality of drive positions which are selectively established, said transmission comprising:

a stationary member;

an input rotary member;

an output rotary member;

a first transmission unit which is connected to said input rotary member; and a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a double-pinion type planetary gear set, and includes a second sun gear, a second carrier, a second ring gear and at least one pair of planetary gears which are rotatably held by said second carrier and which mesh with each other, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said second sun gear and said fourth sun gear are selectively connected to said second intermediate transmitting path through said second clutch, while being selectively connected to said stationary member through said first brake, wherein said third ring gear is selectively connected to said first intermediate transmitting path through said third clutch, wherein said second ring gear, said third carrier and said fourth carrier are selectively connected to said first intermediate transmitting path through said fourth clutch, while being selectively connected to said stationary member through said second brake, wherein said third sun gear and said fourth ring gear are connected to said output rotary member, wherein said second carrier is selectively connected to said second intermediate transmitting path through said first clutch, and wherein said plurality of drive positions are established by selectively engaging and releasing said brakes and said clutches.

16. A planetary-gear-type multiple-step transmission for a vehicle, having a plurality of drive positions which are selectively established, said transmission comprising:
a stationary member;
an input rotary member;
an output rotary member;
a first transmission unit which is connected to said input rotary member; and
a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a double-pinion type planetary gear set, and includes a second sun gear, a second carrier, a second ring gear and at least one pair of planetary gears which are rotatably held by said second carrier and which mesh with each other, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said second carrier and said fourth sun gear are selectively connected to said second intermediate transmitting path through said second clutch, while being selectively connected to said stationary member through said first brake, wherein said third ring gear is selectively connected to said first intermediate transmitting path through said third clutch, wherein said second ring gear, said third carrier and said fourth carrier are selectively connected to said first intermediate transmitting path through said fourth clutch, while being selectively connected to said stationary member through said second brake, wherein said third sun gear and said fourth ring gear are connected to said output rotary member, wherein said second sun gear is selectively connected to said second intermediate transmitting path through said first clutch, and wherein said plurality of drive positions are established by selectively engaging and releasing said brakes and said clutches.

17. A planetary-gear-type multiple-step transmission for a vehicle, having a plurality of drive positions which are selectively established, said transmission comprising:
a stationary member;
an input rotary member;
an output rotary member;
a first transmission unit which is connected to said input rotary member; and
a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said second carrier and which mesh with each other, wherein said fourth planetary gear set is a single-pinion type planetary gear set, and includes a fourth sun gear, a fourth carrier and a fourth ring gear, wherein said second sun gear and said third sun gear are selectively connected to said second intermediate transmitting path through said second clutch, while being selectively connected to said stationary member through said first brake, wherein said fourth ring gear is selectively connected to said first intermediate transmitting path through said third clutch, wherein said third ring gear and said fourth carrier are selectively connected to said first intermediate transmitting path through said fourth clutch, while being selectively connected to said stationary member through said second brake, wherein said second carrier, said third carrier and said fourth sun gear are connected to said output rotary member, wherein said second ring gear is selectively connected to said second intermediate transmitting path through said first clutch, and wherein said plurality of drive positions are established by selectively engaging and releasing said brakes and said clutches.

18. The planetary-gear-type multiple-step transmission according to claim 17, wherein said three planetary gear sets of said second transmission unit has a common carrier, a common sun gear and a common planetary gear, wherein said common carrier constitutes said second carrier and said third carrier, wherein said common sun gear constitutes said second sun gear and said third sun gear, and wherein said common planetary gear constitutes one of each pair of said at least one pair of planetary gears, and a planetary gear held by said second carrier.

19. A planetary-gear-type multiple-step transmission for a vehicle, having a plurality of drive positions which are selectively established, said transmission comprising:

a stationary member;

an input rotary member;

an output rotary member;

a first transmission unit which is connected to said input rotary member; and a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said second carrier and which mesh with each other, wherein said fourth planetary gear set is a single-pinion type planetary gear set, and includes a fourth sun gear, a fourth carrier and a fourth ring gear, wherein said third sun gear and said fourth sun gear are selectively connected to said second intermediate transmitting path through said second clutch, while being selectively connected to said stationary member through said first brake, wherein said second ring gear is selectively connected to said first intermediate transmitting path through said third clutch, wherein said second carrier is selectively connected to said first intermediate transmitting path through said fourth clutch, while being selectively connected to said stationary member through said second brake, wherein said second sun gear, said third ring gear and said fourth carrier are connected to said output rotary member, wherein said third carrier and said fourth ring gear are selectively connected to said second intermediate transmitting path through said first clutch, and wherein said plurality of drive positions are established by selectively engaging and releasing said brakes and said clutches.

20. A planetary-gear-type multiple-step transmission for a vehicle, having a plurality of drive positions which are selectively established, said transmission comprising:

a stationary member;

an input rotary member;

an output rotary member;

a first transmission unit which is connected to said input rotary member; and a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a single-pinion type planetary gear set, and includes a second sun gear, a second carrier and a second ring gear, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said third sun gear and said fourth sun gear are selectively connected to said second intermediate transmitting path through said second clutch, while being selectively connected to said stationary member through said first brake, wherein said second ring gear is selectively connected to said first intermediate transmitting path through said third clutch, wherein said second carrier and said third carrier are selectively connected to said first intermediate transmitting path through said fourth clutch, while being selectively connected to said stationary member through said second brake, wherein said second sun gear, said third ring gear and said fourth carrier are connected to said output rotary member, wherein said fourth ring gear is selectively connected to said second intermediate transmitting path through said first clutch, and wherein said plurality of drive positions are established by selectively engaging and releasing said brakes and said clutches.

21. A planetary-gear-type multiple-step transmission for a vehicle, having a plurality of drive positions which are selectively established, said transmission comprising:

a stationary member;

an input rotary member;

an output rotary member;

a first transmission unit which is connected to said input rotary member; and a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said second carrier and which mesh with each other, wherein said fourth planetary gear set is a single-pinion type planetary gear set, and includes a fourth sun gear, a fourth carrier and a fourth ring gear, wherein said fourth sun gear is selectively connected to said second intermediate transmitting path through said second clutch, while being selectively connected to said stationary member through said first brake, wherein said second ring gear and said third sun gear are selectively connected to said first intermediate transmitting path through said third clutch, wherein said second carrier is selectively connected to said first intermediate transmitting path through said fourth clutch, while being selectively connected to said stationary member through said second brake, wherein said second sun gear, said third ring gear and said fourth carrier are connected to said output rotary member, wherein said third carrier and said fourth ring gear are selectively connected to said second intermediate transmitting path through said first clutch, and wherein said plurality of drive positions are established by selectively engaging and releasing said brakes and said clutches.

22. A planetary-gear-type multiple-step transmission for a vehicle, having a plurality of drive positions which are selectively established, said transmission comprising:

a stationary member;

an input rotary member;

an output rotary member;

a first transmission unit which is connected to said input rotary member; and a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a single-pinion type planetary gear set, and includes a second sun gear, a second carrier and a second ring gear, wherein said third planetary gear set is a double-pinion type planetary gear set, and includes a third sun gear, a third carrier, a third ring gear and at least one pair of planetary gears which are rotatably held by said second carrier and which mesh with each other, wherein said fourth planetary gear set is a single-pinion type planetary gear set, and includes a fourth sun gear, a fourth carrier and a fourth ring gear, wherein said fourth sun gear is selectively connected to said second intermediate transmitting path through said second clutch, while being selectively connected to said stationary member through said first brake, wherein said second ring gear is selectively connected to said first intermediate transmitting path through said third clutch, wherein said second carrier and said third sun gear are selectively connected to said first intermediate transmitting path through said fourth clutch, while being selectively connected to said stationary member through said second brake, wherein said second sun gear, said third ring gear and said fourth carrier are connected to said output rotary member, wherein said third carrier and said fourth ring gear are selectively connected to said second intermediate transmitting path through said first clutch, and wherein said plurality of drive positions are established by selectively engaging and releasing said brakes and said clutches.

23. A planetary-gear-type multiple-step transmission for a vehicle, having a plurality of drive positions which are selectively established, said transmission comprising:

a stationary member;

an input rotary member;

an output rotary member;

a first transmission unit which is connected to said input rotary member; and a second transmission unit which is connected to said output rotary member, wherein said first transmission unit is capable of transmitting a rotary motion from said input rotary member to said second transmission unit through first and second intermediate transmitting paths such that a speed of said rotary motion transmitted through said second intermediate transmitting path is lower than a speed of said rotary motion transmitted through said first intermediate transmitting path, wherein said second transmission unit includes three planetary gear sets consisting of second, third and fourth planetary gear sets which are disposed coaxially with each other, such that said third planetary gear set is disposed between said second and fourth planetary gear sets, said second transmission unit further including first and second brakes, and first, second, third and fourth clutches, wherein said second planetary gear set is a double-pinion type planetary gear set, and includes a second sun gear, a second carrier, a second ring gear and at least one pair of planetary gears which are rotatably held by said second carrier and which mesh with each other, wherein said third planetary gear set is a single-pinion type planetary gear set, and includes a third sun gear, a third carrier and a third ring gear, wherein said fourth planetary gear set is a single-pinion type planetary gear set, and includes a fourth sun gear, a fourth carrier and a fourth ring gear, wherein said fourth sun gear is selectively connected to said second intermediate transmitting path through said second clutch, while being selectively connected to said stationary member through said first brake, wherein said second carrier and said third ring gear are selectively connected to said first intermediate transmitting path through said third clutch, wherein said third carrier is selectively connected to said first intermediate transmitting path through said fourth clutch, while being selectively connected to said stationary member through said second brake, wherein said second ring gear, said third sun gear and said fourth carrier are connected to said output rotary member, wherein said second sun gear and said fourth ring gear are selectively connected to said second intermediate transmitting path through said first clutch, and wherein said plurality of drive positions are established by selectively engaging and releasing said brakes and said clutches.

24. The planetary-gear-type multiple-step transmission according to claim 15, wherein said first transmission unit has a first planetary gear set of double-pinion type including a first sun gear, a first carrier, a first ring gear and at least one pair of planetary gears which are rotatably held by said first carrier and which mesh with each other, wherein said first carrier is connected to said input rotary member and said first intermediate transmitting path, wherein said first sun gear is fixed to said stationary member so as to be unrotatable, and wherein said first ring gear is connected to said second intermediate transmitting path.

25. The planetary-gear-type multiple-step transmission according to claim 16, wherein said first transmission unit has a first planetary gear set of double-pinion type including a first sun gear, a first carrier, a first ring gear and at least one pair of planetary gears which are rotatably held by said first carrier and which mesh with each other, wherein said first carrier is connected to said input rotary member and said first intermediate transmitting path, wherein said first sun gear is fixed to said stationary member so as to be unrotatable, and wherein said first ring gear is connected to said second intermediate transmitting path.

26. The planetary-gear-type multiple-step transmission according to claim 17, wherein said first transmission unit has a first planetary gear set of double-pinion type including a first sun gear, a first carrier, a first ring gear and at least, one pair of planetary gears which are rotatably held by said first carrier and which mesh with each other, wherein said first carrier is connected to said input rotary member and said first intermediate transmitting path, wherein said first sun gear is fixed to said stationary member so as to be unrotatable, and wherein said first ring gear is connected to said second intermediate transmitting path.

27. The planetary-gear-type multiple-step transmission according to claim 19, wherein said first transmission unit has a first planetary gear set of double-pinion type including a first sun gear, a first carrier, a first ring gear and at least one pair of planetary gears which are rotatably held by said first carrier and which mesh with each other, wherein said first carrier is connected to said input rotary member and said first intermediate transmitting path, wherein said first sun gear is fixed to said stationary member so as to be unrotatable, and wherein said first ring gear is connected to said second intermediate transmitting path.

28. The planetary-gear-type multiple-step transmission according to claim 15, having at least seven forward drive positions, which are established by selectively engaging and releasing said brakes and said clutches.

29. The planetary-gear-type multiple-step transmission according to claim 16, having at least seven forward drive positions, which are established by selectively engaging and releasing said brakes and said clutches.

30. The planetary-gear-type multiple-step transmission according to claim 17, having at least seven forward drive positions, which are established by selectively engaging and releasing said brakes and said clutches.

31. The planetary-gear-type multiple-step transmission according to claim 19, having at least seven forward drive positions, which are established by selectively engaging and releasing said brakes and said clutches.

32. The planetary-gear-type multiple-step transmission according to claim 20, having at least seven forward drive positions, which are established by selectively engaging and releasing said brakes and said clutches.

33. The planetary-gear-type multiple-step transmission according to claim 21, having at least seven forward drive positions, which are established by selectively engaging and releasing said brakes and said clutches.

34. The planetary-gear-type multiple-step transmission according to claim 22, having at least seven forward drive positions, which are established by selectively engaging and releasing said brakes and said clutches.

35. The planetary-gear-type multiple-step transmission according to claim 23, having at least seven forward drive positions, which are established by selectively engaging and releasing said brakes and said clutches.

36. The planetary-gear-type multiple-step transmission according to claim 15, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position,
   wherein said first-speed position is established by engaging said first clutch and said second brake,
   wherein said second-speed position is established by engaging said first clutch and said first brake,
   wherein said third-speed position is established by engaging said first clutch and said second clutch,
   wherein said fourth-speed position is established by engaging said first clutch and one of said third and fourth clutches,
   wherein said fifth-speed position is established by engaging said third clutch and said fourth clutch,
   wherein said sixth-speed position is established by engaging said second clutch and said fourth clutch,
   wherein said seventh-speed position is established by engaging said fourth clutch and said first brake,
   and wherein said eighth-speed position is established by engaging said third clutch and said first brake.

37. The planetary-gear-type multiple-step transmission according to claim 16, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position,
   wherein said first-speed position is established by engaging said first clutch and said second brake,
   wherein said second-speed position is established by engaging said first clutch and said first brake,
   wherein said third-speed position is established by engaging said first clutch and said second clutch,
   wherein said fourth-speed position is established by engaging said first clutch and one of said third and fourth clutches,
   wherein said fifth-speed position is established by engaging said third clutch and said fourth clutch,
   wherein said sixth-speed position is established by engaging said second clutch and said fourth clutch,
   wherein said seventh-speed position is established by engaging said fourth clutch and said first brake,
   and wherein said eighth-speed position is established by engaging said third clutch and said first brake.

38. The planetary-gear-type multiple-step transmission according to claim 17, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position,
   wherein said first-speed position is established by engaging said first clutch and said second brake,
   wherein said second-speed position is established by engaging said first clutch and said first brake,
   wherein said third-speed position is established by engaging said first clutch and said second clutch,
   wherein said fourth-speed position is established by engaging said first clutch and one of said third and fourth clutches,
   wherein said fifth-speed position is established by engaging said third clutch and said fourth clutch,
   wherein said sixth-speed position is established by engaging said second clutch and said fourth clutch,
   wherein said seventh-speed position is established by engaging said fourth clutch and said first brake,
   and wherein said eighth-speed position is established by engaging said third clutch and said first brake.

39. The planetary-gear-type multiple-step transmission according to claim 19, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position,
   wherein said first-speed position is established by engaging said first clutch and said second brake,
   wherein said second-speed position is established by engaging said first clutch and said first brake,
   wherein said third-speed position is established by engaging said first clutch and said second clutch,
   wherein said fourth-speed position is established by engaging said first clutch and one of said third and fourth clutches,
   wherein said fifth-speed position is established by engaging said third clutch and said fourth clutch,
   wherein said sixth-speed position is established by engaging said second clutch and said fourth clutch,
   wherein said seventh-speed position is established by engaging said fourth clutch and said first brake,
   and wherein said eighth-speed position is established by engaging said third clutch and said first brake.

40. The planetary-gear-type multiple-step transmission according to claim 20, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position, wherein said first-speed position is established by engaging said first clutch and said second brake,
wherein said second-speed position is established by engaging said first clutch and said first brake,
wherein said third-speed position is established by engaging said first clutch and said second clutch,
wherein said fourth-speed position is established by engaging said first clutch and one of said third and fourth clutches,
wherein said fifth-speed position is established by engaging said third clutch and said fourth clutch,
wherein said sixth-speed position is established by engaging said second clutch and said fourth clutch,
wherein said seventh-speed position is established by engaging said fourth clutch and said first brake,
and wherein said eighth-speed position is established by engaging said third clutch and said first brake.

41. The planetary-gear-type multiple-step transmission according to claim 21, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position, wherein said first-speed position is established by engaging said first clutch and said second brake,
wherein said second-speed position is established by engaging said first clutch and said first brake,
wherein said third-speed position is established by engaging said first clutch and said second clutch,
wherein said fourth-speed position is established by engaging said first clutch and one of said third and fourth clutches,
wherein said fifth-speed position is established by engaging said third clutch and said fourth clutch,
wherein said sixth-speed position is established by engaging said second clutch and said fourth clutch,
wherein said seventh-speed position is established by engaging said fourth clutch and said first brake,
and wherein said eighth-speed position is established by engaging said third clutch and said first brake.

42. The planetary-gear-type multiple-step transmission according to claim 22, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position, wherein said first-speed position is established by engaging said first clutch and said second brake,
wherein said second-speed position is established by engaging said first clutch and said first brake,
wherein said third-speed position is established by engaging said first clutch and said second clutch,
wherein said fourth-speed position is established by engaging said first clutch and one of said third and fourth clutches,
wherein said fifth-speed position is established by engaging said third clutch and said fourth clutch,
wherein said sixth-speed position is established by engaging said second clutch and said fourth clutch,
wherein said seventh-speed position is established by engaging said fourth clutch and said first brake,
and wherein said eighth-speed position is established by engaging said third clutch and said first brake.

43. The planetary-gear-type multiple-step transmission according to claim 23, having at least eight drive positions consisting of a first-speed position, a second-speed position having a speed ratio smaller than that of said first-speed position, a third-speed position having a speed ratio smaller than that of said second-speed position, a fourth-speed position having a speed ratio smaller than that of said third-speed position, a fifth-speed position having a speed ratio smaller than that of said fourth-speed position, a sixth-speed position having a speed ratio smaller than that of said fifth-speed position, a seventh-speed position having a speed ratio smaller than that of said sixth-speed position, and an eighth-speed position having a speed ratio smaller than that of said seventh-speed position, wherein said first-speed position is established by engaging said first clutch and said second brake,
wherein said second-speed position is established by engaging said first clutch and said first brake,
wherein said third-speed position is established by engaging said first clutch and said second clutch,
wherein said fourth-speed position is established by engaging said first clutch and one of said third and fourth clutches,
wherein said fifth-speed position is established by engaging said third clutch and said fourth-clutch,
wherein said sixth-speed position is established by engaging said second clutch and said fourth clutch,
wherein said seventh-speed position is established by engaging said fourth clutch and said first brake,
and wherein said eighth-speed position is established by engaging said third clutch and said first brake.

44. The planetary-gear-type multiple-step transmission according to claim 1, having a rear drive position, which is established by engaging said second clutch and said second brake.

45. The planetary-gear-type multiple-step transmission according to claim 1, further comprising a hydraulic transmission unit through which an output of a drive power source is transmitted to said input rotary member.

* * * * *